US006751587B2

(12) United States Patent
Thyssen et al.

(10) Patent No.: US 6,751,587 B2
(45) Date of Patent: Jun. 15, 2004

(54) EFFICIENT EXCITATION QUANTIZATION IN NOISE FEEDBACK CODING WITH GENERAL NOISE SHAPING

(75) Inventors: Jes Thyssen, Laguna Niguel, CA (US); Juin-Hwey Chen, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 37 days.

(21) Appl. No.: 10/216,442

(22) Filed: Aug. 12, 2002

(65) Prior Publication Data

US 2003/0135365 A1 Jul. 17, 2003

Related U.S. Application Data

(60) Provisional application No. 60/344,375, filed on Jan. 4, 2002.

(51) Int. Cl.[7] .............................................. G01L 21/02

(52) U.S. Cl. ........................ 704/228; 704/226; 704/230

(58) Field of Search ................................ 704/200, 201, 704/203, 219, 221, 222, 226, 227, 228, 230, 262, 269

(56) References Cited

U.S. PATENT DOCUMENTS

| | | | | |
|---|---|---|---|---|
| 2,927,982 A | | 3/1960 | Cutler | 375/243 |
| 4,220,819 A | | 9/1980 | Atal | 704/219 |
| 4,317,208 A | | 2/1982 | Araseki et al. | 375/245 |
| 4,393,272 A | | 7/1983 | Itakura et al. | 704/269 |
| 4,776,015 A | | 10/1988 | Takeda et al. | 704/220 |
| 4,791,654 A | | 12/1988 | De Marca et al. | 375/241 |
| 4,811,396 A | | 3/1989 | Yatsuzuka | 704/230 |
| 4,815,132 A | * | 3/1989 | Minami | 381/1 |
| 4,860,355 A | | 8/1989 | Copperi | 704/213 |
| 4,896,361 A | | 1/1990 | Gerson | 704/222 |
| 4,918,729 A | | 4/1990 | Kudoh | 704/226 |
| 4,963,034 A | | 10/1990 | Cuperman et al. | 704/222 |
| 4,969,192 A | | 11/1990 | Chen et al. | 704/222 |

(List continued on next page.)

FOREIGN PATENT DOCUMENTS

| | | |
|---|---|---|
| EP | 0 573 216 A2 | 12/1993 |
| JP | H10-173744 | 6/1998 |
| JP | H11-55363 | 2/1999 |
| JP | H11-122375 | 4/1999 |

OTHER PUBLICATIONS

Bishnu S. Atal et al., "Predictive Coding of Speech Signals and Subjective Error Criteria," *IEEE Transactions on Acoustics, Speech, and Signal Processing*, vol. ASSP–27, No. 3, Jun. 1979.

John Makhoul et al., "Adaptive Noise Spectral Shaping and Entropy Coding in Predictive Coding of Speech," *IEEE Transactions on Acoustics, Speech, and Signal Processing*, vol. ASSP–27, No. 1, Feb. 1979.

E.G. Kimme and F.F. Kuo, "Synthesis of Optimal Filters for a Feedback Quantization System", IEEE Transactions on Circuit Theory, The Institute of Electrical and Electronics Engineers, Inc., vol. CT–10, No. 3, Sep. 1963, pp. 405–413.

(List continued on next page.)

*Primary Examiner*—Huy Mai
(74) *Attorney, Agent, or Firm*—Sterne Kessler Goldstein & Fox P.L.L.C.

(57) ABSTRACT

In a Noise Feedback Coding (NFC) system having a corresponding ZERO-STATE filter structure, the first ZERO-STATE filter structure including multiple filters, a method of producing a ZERO-STATE response error vector. The method includes: (a) transforming the first ZERO-STATE filter structure to a second ZERO-STATE filter structure including only an all-zero filter, the all-zero filter having a filter response substantially equivalent to a filter response of the ZERO-STATE filter structure including multiple filters; and (b) filtering a VQ codevector with the all-zero filter to produce the ZERO-STATE response error vector corresponding to the VQ codevector.

15 Claims, 47 Drawing Sheets

Noise Feedback Coding with short-term and long-term prediction but only short-term noise spectral shaping

U.S. PATENT DOCUMENTS

| | | | | | |
|---|---|---|---|---|---|
| 5,007,092 A | | 4/1991 | Galand et al. | ............. | 704/222 |
| 5,060,269 A | | 10/1991 | Zinser | ........................ | 704/220 |
| 5,204,677 A | | 4/1993 | Akagiri et al. | ............. | 341/118 |
| 5,313,554 A | | 5/1994 | Ketchum | .................... | 704/219 |
| 5,487,086 A | | 1/1996 | Bhaskar | ...................... | 375/243 |
| 5,493,296 A | | 2/1996 | Sugihara | ...................... | 341/76 |
| 5,511,093 A | * | 4/1996 | Edler et al. | ................ | 375/240 |
| 5,812,971 A | * | 9/1998 | Herre | ........................ | 704/230 |
| 5,963,898 A | | 10/1999 | Navarro et al. | ............ | 704/220 |
| 6,014,618 A | | 1/2000 | Patel et al. | ................ | 704/207 |
| 6,055,496 A | | 4/2000 | Heidari et al. | ............. | 704/222 |
| 6,073,092 A | * | 6/2000 | Kwon | ........................ | 704/219 |
| 6,131,083 A | | 10/2000 | Miseki et al. | .............. | 704/217 |
| 6,188,980 B1 | | 2/2001 | Thyssen | ..................... | 704/230 |
| 6,360,200 B1 | * | 3/2002 | Edler et al. | ................ | 704/219 |
| 2002/0069052 A1 | * | 6/2002 | Chen | .......................... | 704/230 |
| 2002/0072904 A1 | * | 6/2002 | Chen | .......................... | 704/230 |
| 2003/0036901 A1 | * | 2/2003 | Chen | .......................... | 704/230 |
| 2003/0078773 A1 | | 4/2003 | Thyssen | ..................... | 704/230 |
| 2003/0083865 A1 | | 5/2003 | Thyssen | ..................... | 704/230 |
| 2003/0083869 A1 | * | 5/2003 | Thyssen et al. | ............ | 704/222 |
| 2003/0135367 A1 | | 7/2003 | Thyssen et al. | ............ | 704/230 |

OTHER PUBLICATIONS

Ira A. Gerson and Mark A. Jasiuk, "Techniques for Improving the Performance of CELP–Type Speech Coders," IEEE Journal on Selected Areas in Communications, IEEE, vol. 10, No. 5, Jun. 1992, pp. 858–865.

Cheng–Chieh Lee, "An Enhanced ADPCM Coder for Voice Over Packet Networks," International Journal of Speech Technology, Kluwer Academic Publishers, 1999, pp. 343–357.

Marcellin, M.W. et al., "Predictive Trellis Coded Quantization of Speech," *IEEE Transactions on Acoustics, Speech, And Signal Processing*, vol. 38, No. 1, IEEE, pp. 46–55 (Jan. 1990).

Hayashi, S. et al., "Low Bit–Rate CELP Speech Coder with Low Delay," *Signal Processing*, Elsevier Science B.V., vol. 72, 1999, pp. 97–105.

Tokuda, K. et al., "Speech Coding Based on Adaptive Met–Cepstral Analysis," IEEE, 1994, pp. 1–197–1–200.

Marcellin, M.W. and Fischer, T.R., "A Trellis–Searched 16 KBIT/SEC Speech Coder with Low–Delay," *Proceedings of the Workshop on Speech Coding for Telecommunications*, Kluwer Publishers, 1989, pp. 47–56.

Watts, L. and Cuperman, V., "A Vector ADPCM Analysis–By–Synthesis Configuration for 16 kbit/s Speech Coding," *Proceedings of the Global Telecommunications Conference and Exhibition (Globecom)*, IEEE, 1988, pp. 275–279.

Itakura, F., "Line Spectrum representation of linear predictor coefficients of speech signals", *The Journal of the Acoustical Society of America*, American Institute of Physics for the Acoustical Society of America, Spring 1975, vol. 57, Supplement No. 1, p. S35.

Kabal, P. and Ramachandran, R.P., "The Computation of Line Spectral Frequencies Using Chebyshev Polynominals", *IEEE Transactions on Acoustics, Speech and Signal Processing*, IEEE, Dec. 1986, vol. ASSP–34, No. 6, pp. 1419–1426.

Rabiner, L.R. and Schafer, R.W., "Digital Processing of Speech Signals", Prentice Hall, 1978, pp. 401–403 and 411–413.

* cited by examiner

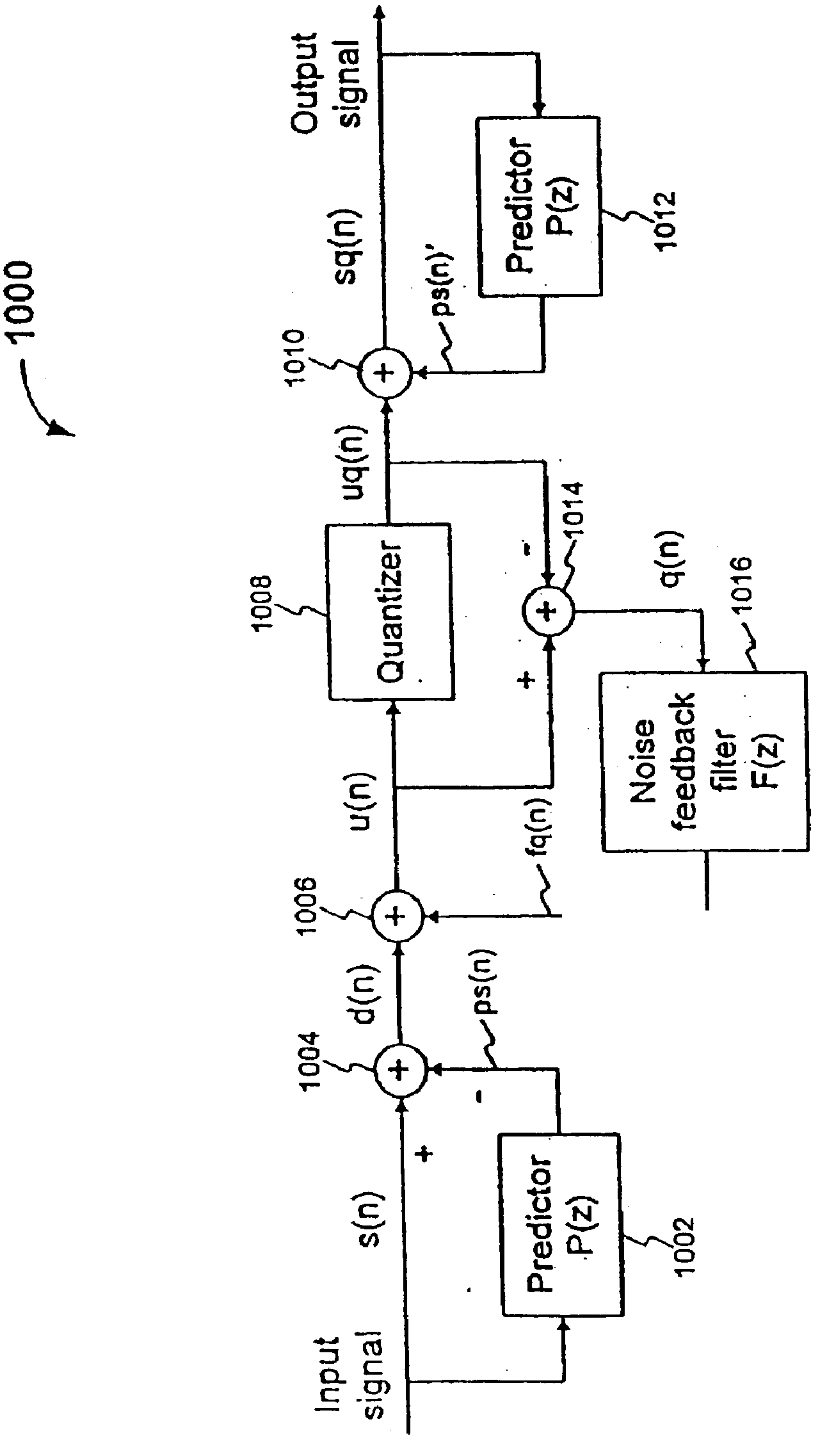
Figure 1 Conventional Noise Feedback Coding

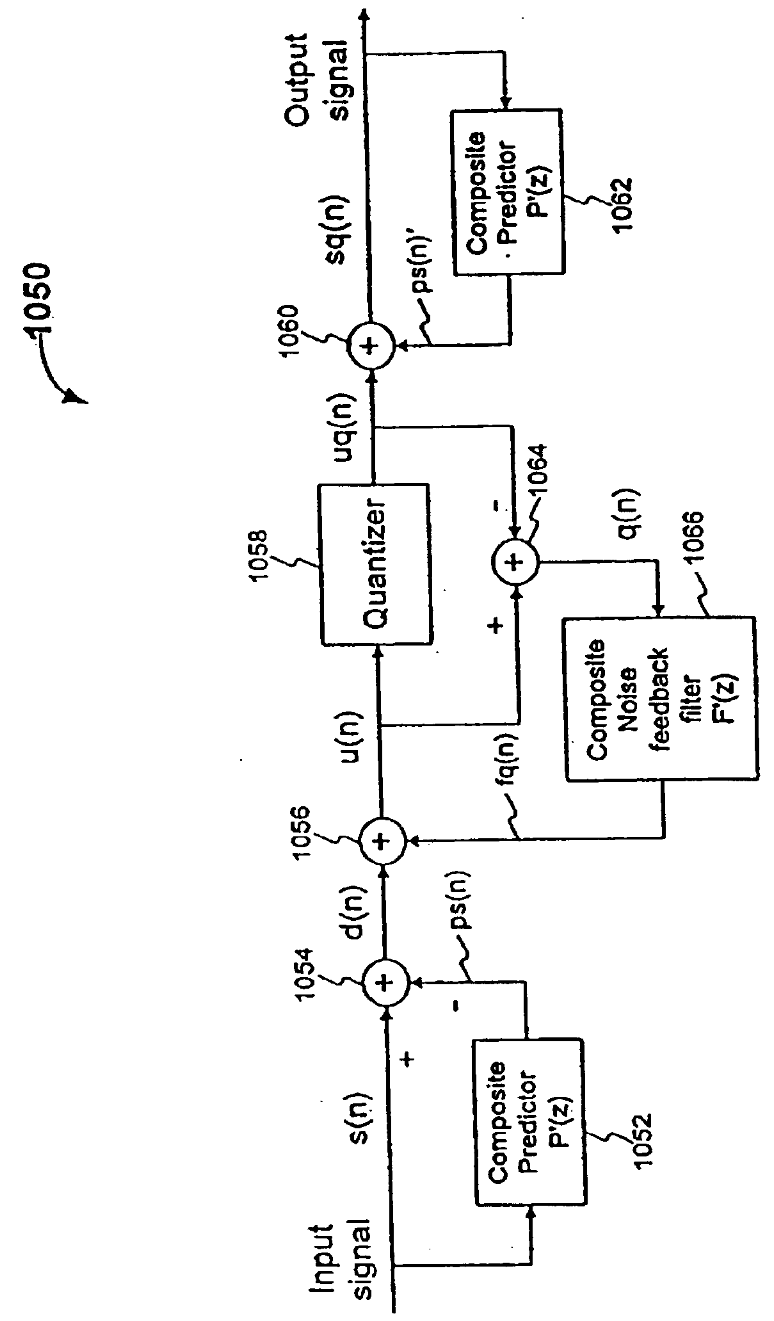
Figure 1A Noise Feedback Coding Using Composite Short-Term and Long-Term Predictors and Composite Short-Term and Long-Term Filter

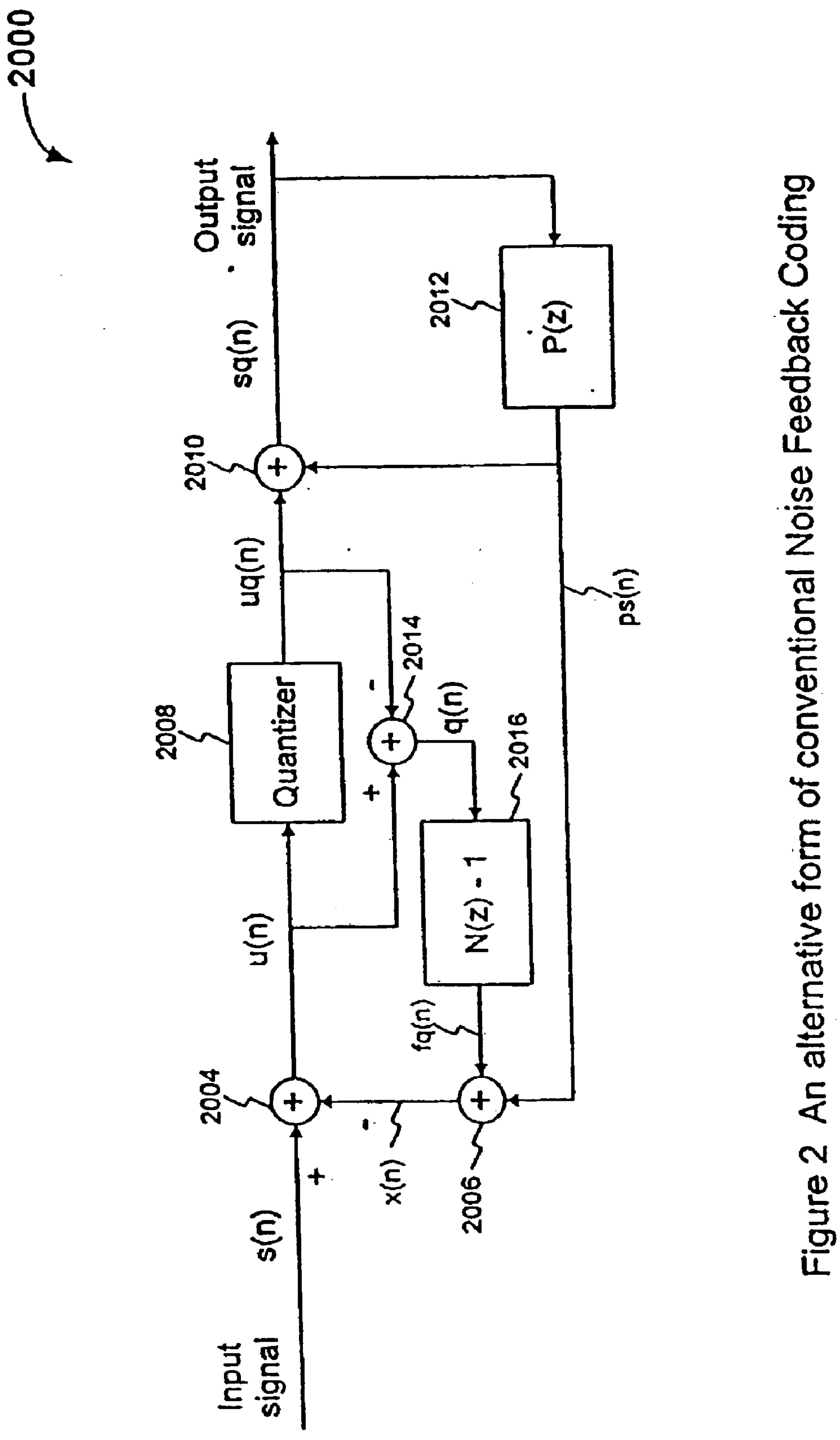
Figure 2 An alternative form of conventional Noise Feedback Coding

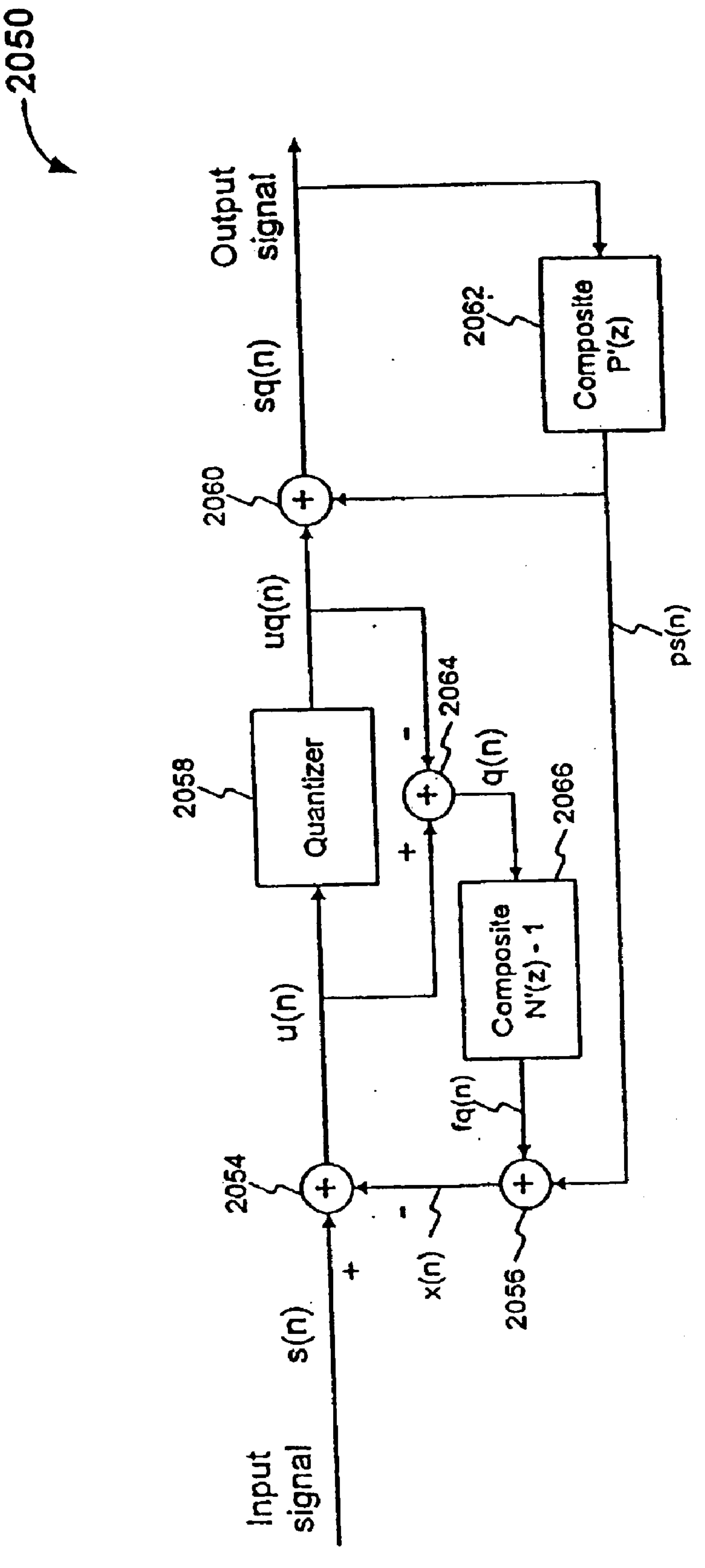
Figure 2A Noise-Feedback Coding Using Composite-Predictor and Composite Noise Filter

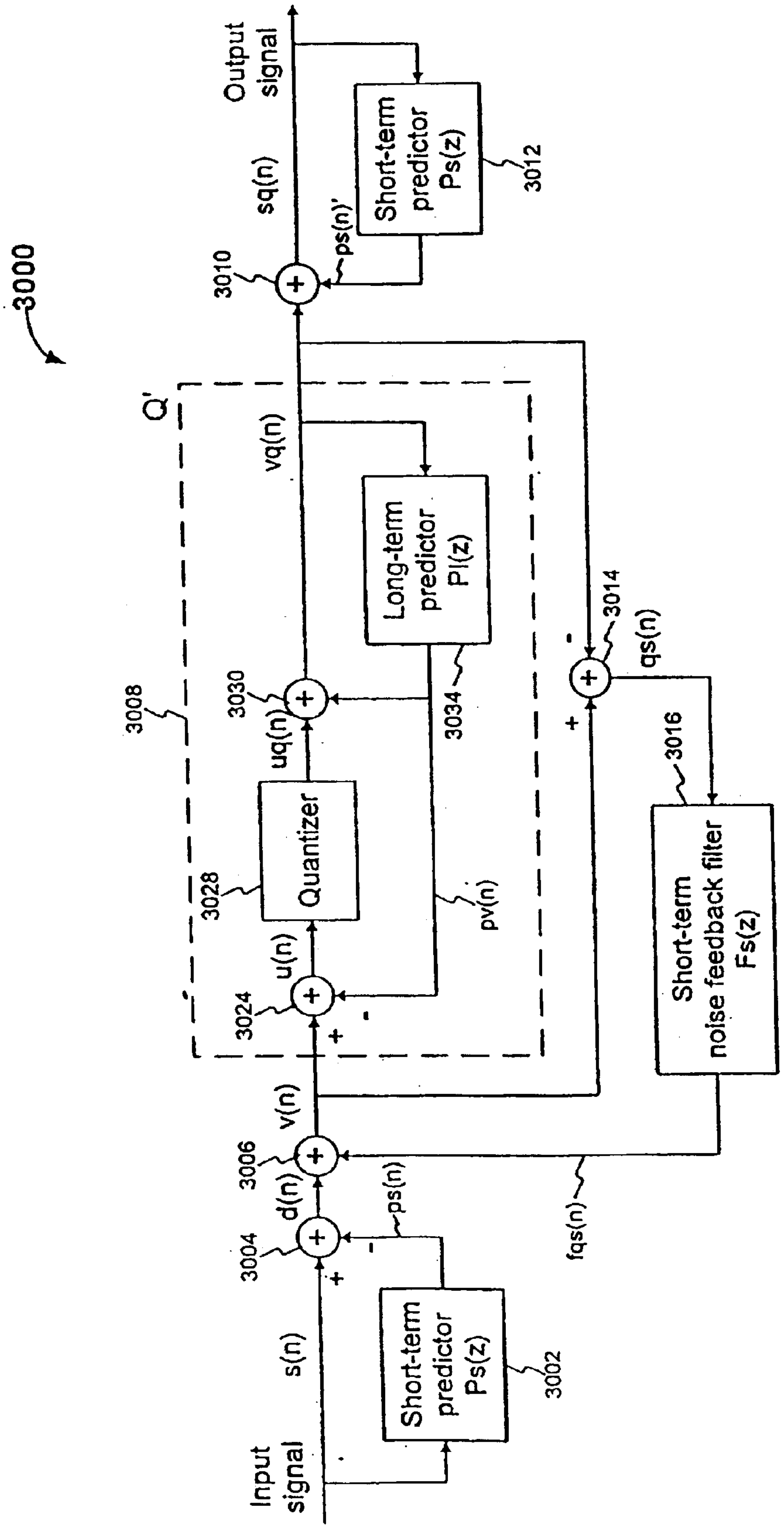
Figure 3 Noise Feedback Coding with short-term and long-term prediction but only short-term noise spectral shaping

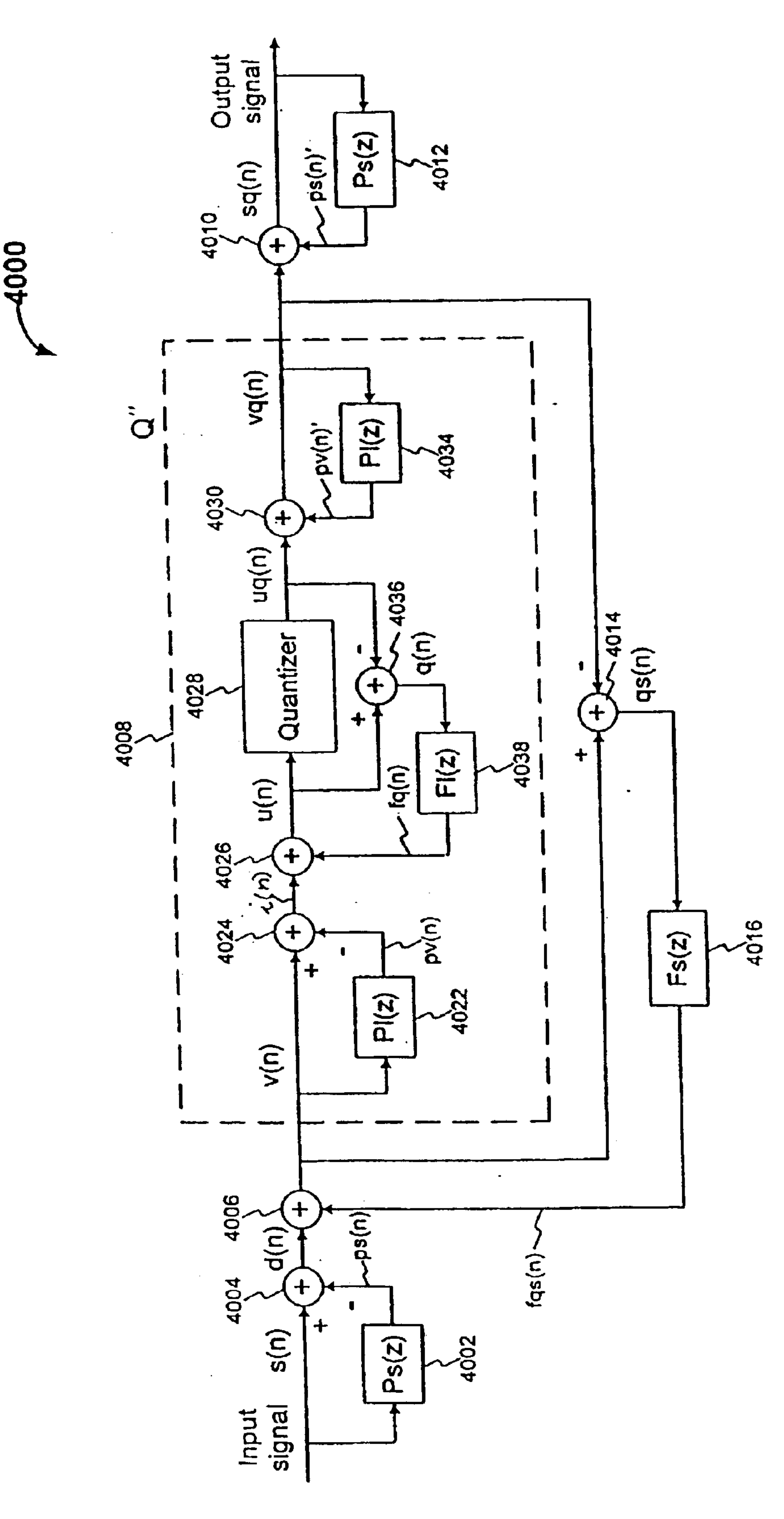
Figure 4 Nested two-stage Noise Feedback Coding structure with short-term and long-term prediction and short-term and long-term noise spectral shaping

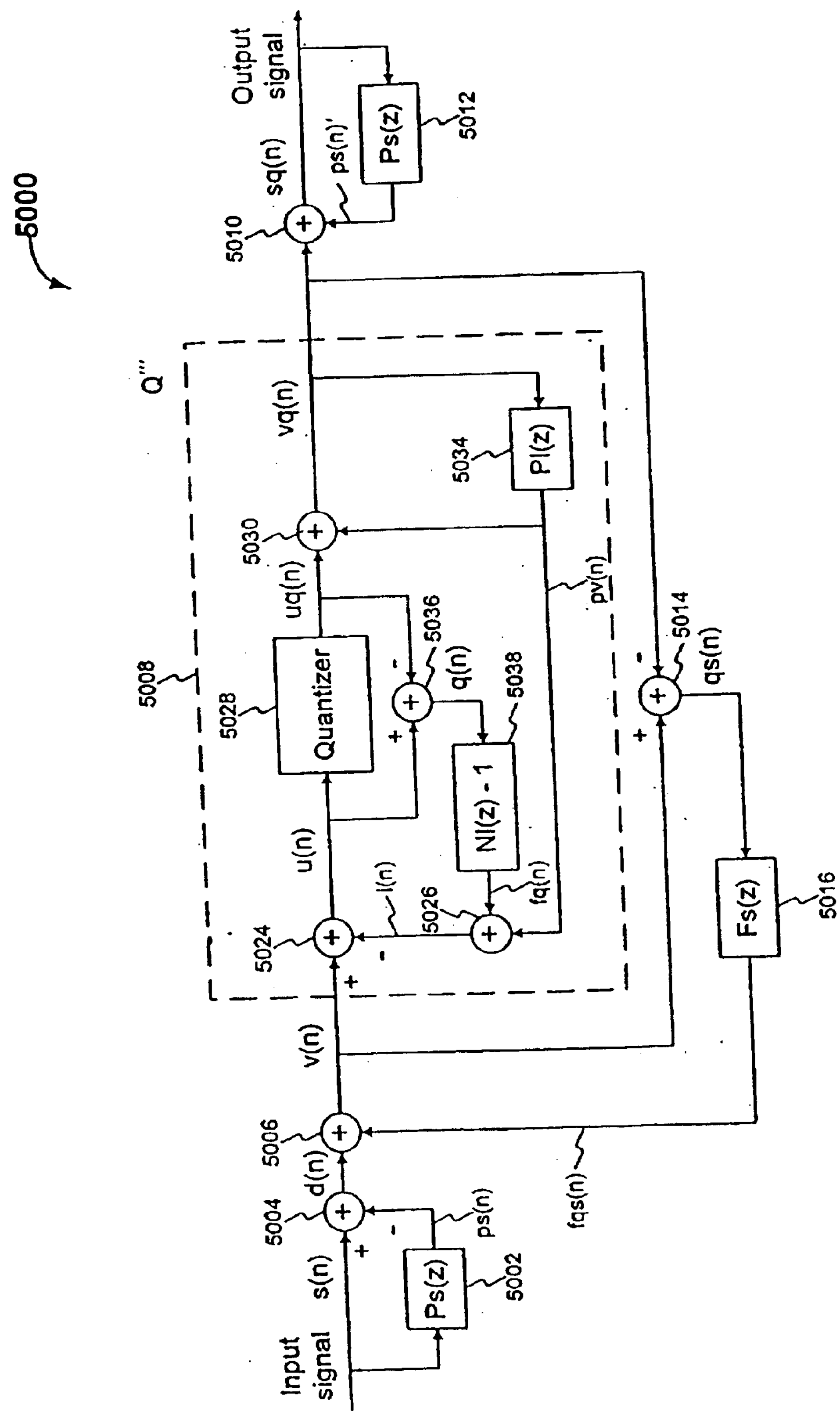
Figure 5 An alternative nested two-stage Noise Feedback Coding structure with short-term and long-term prediction and short-term and long-term noise spectral shaping

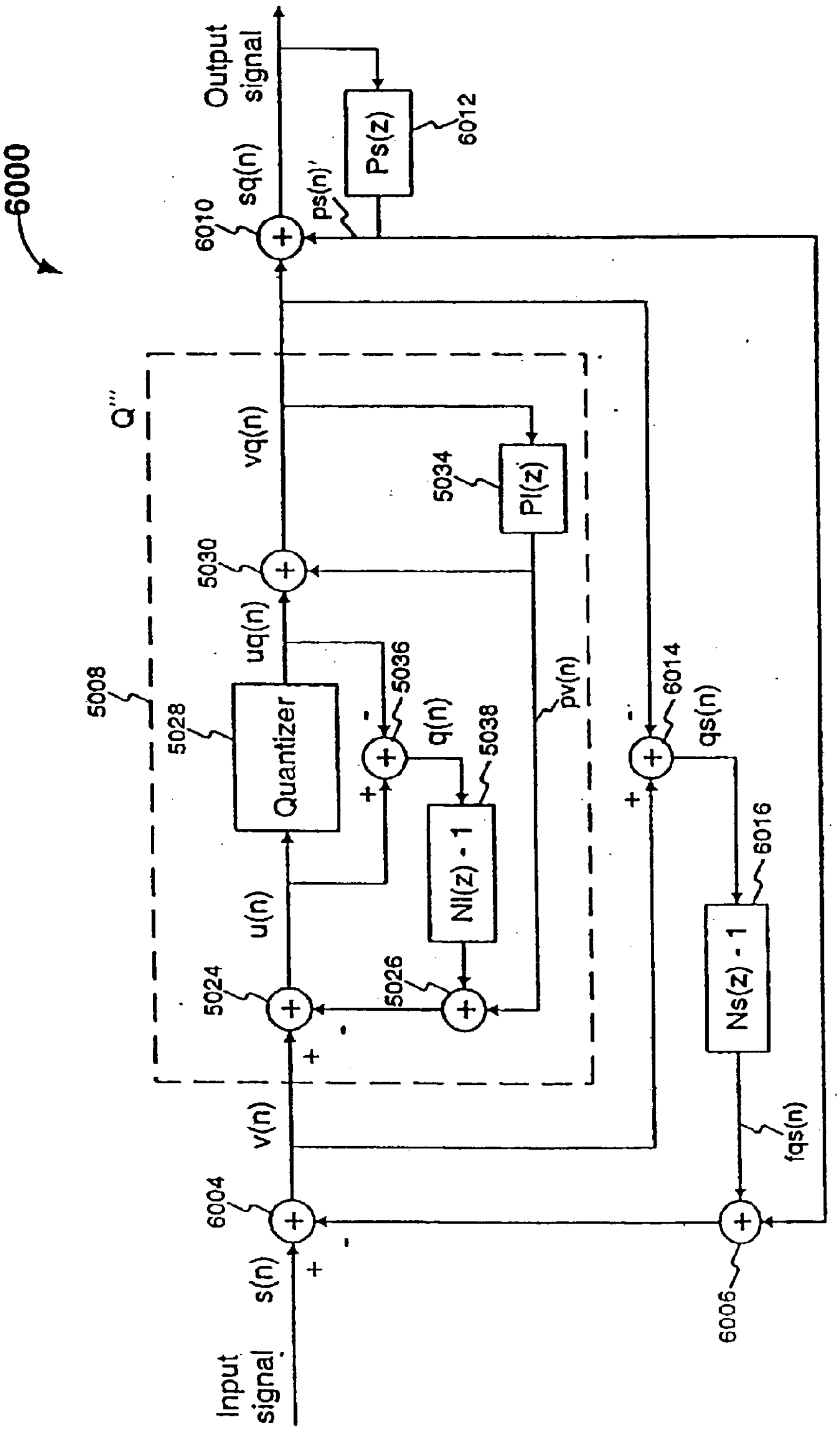
Figure 6 Another alternative nested two-stage Noise Feedback Coding structure with short-term and long-term prediction and short-term and long-term noise spectral shaping

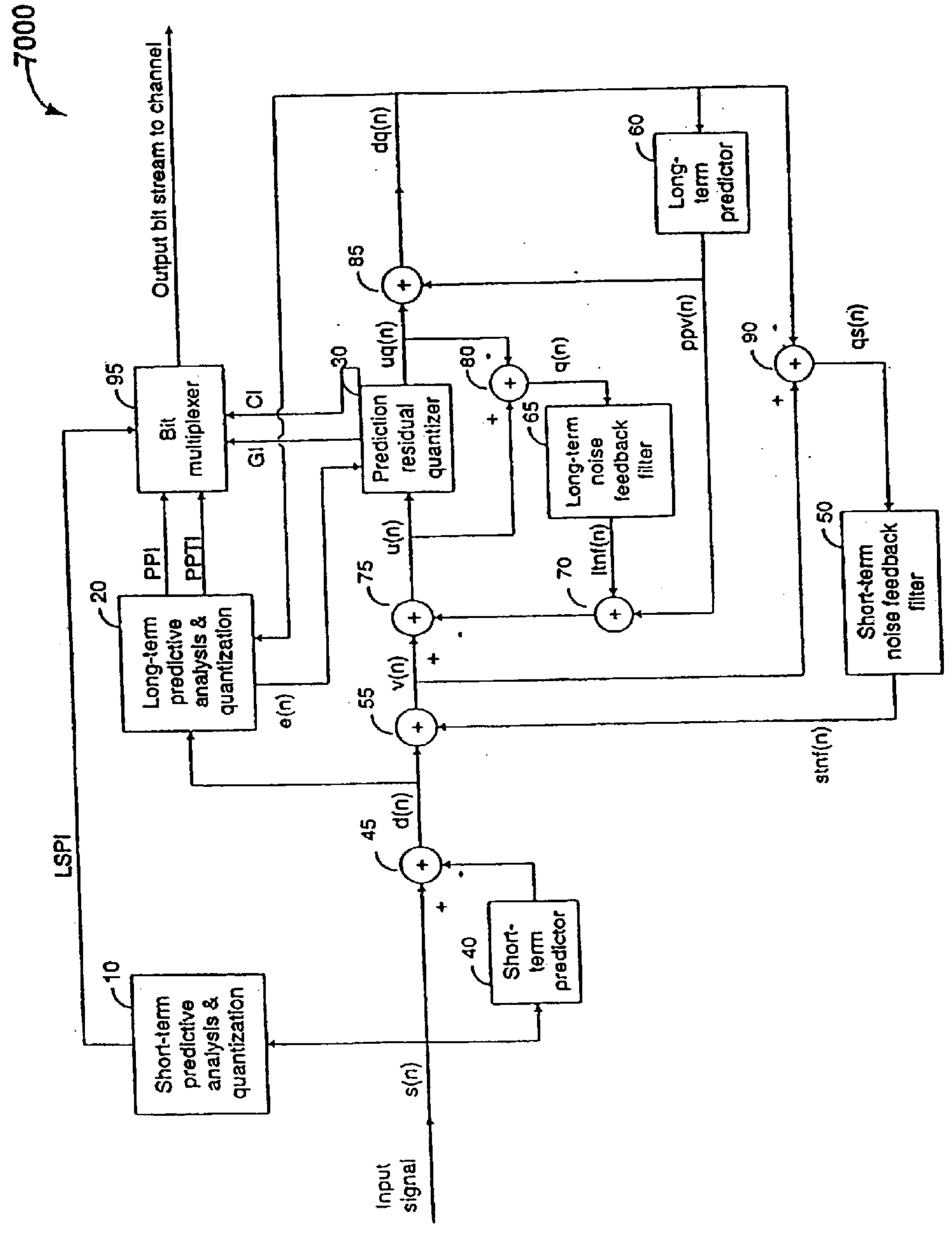
Figure 7 Encoder of a nested two-stage noise feedback codec (TSNFC)

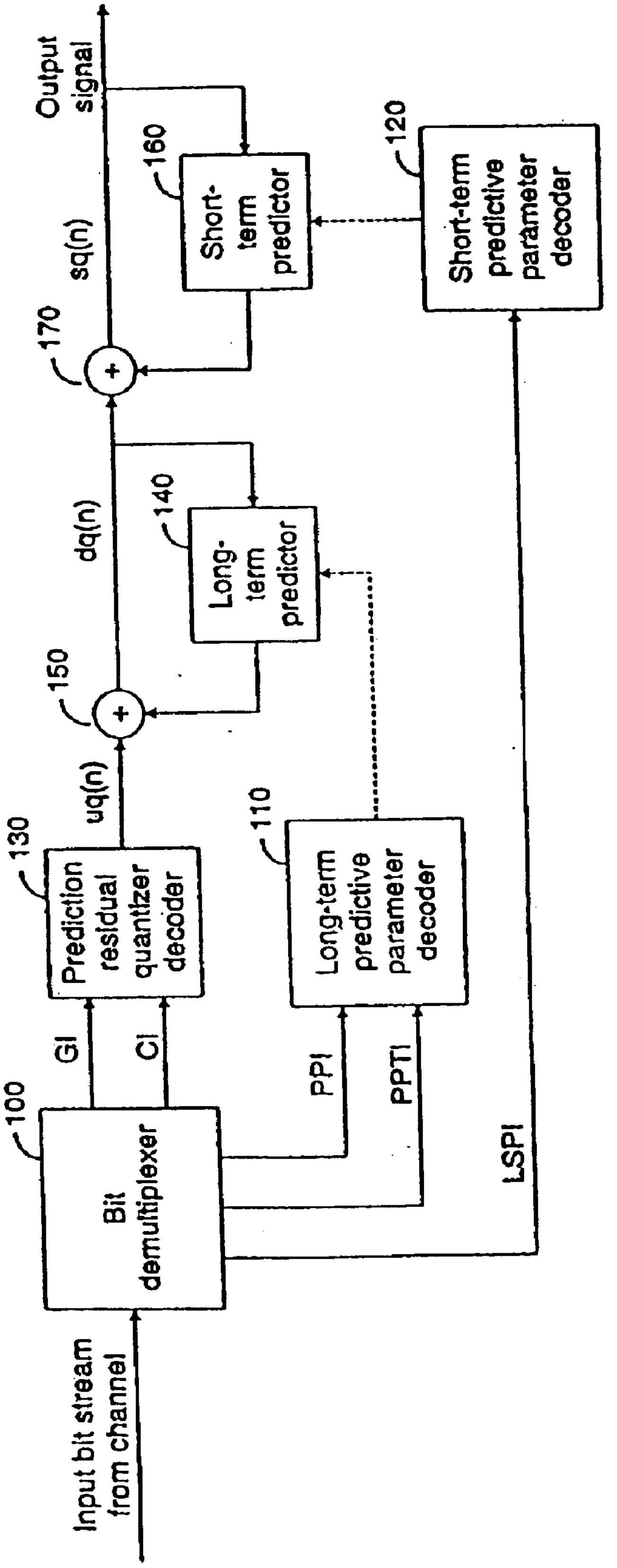
Figure 8 Decoder corresponding to the TSNFC encoder in Fig. 7

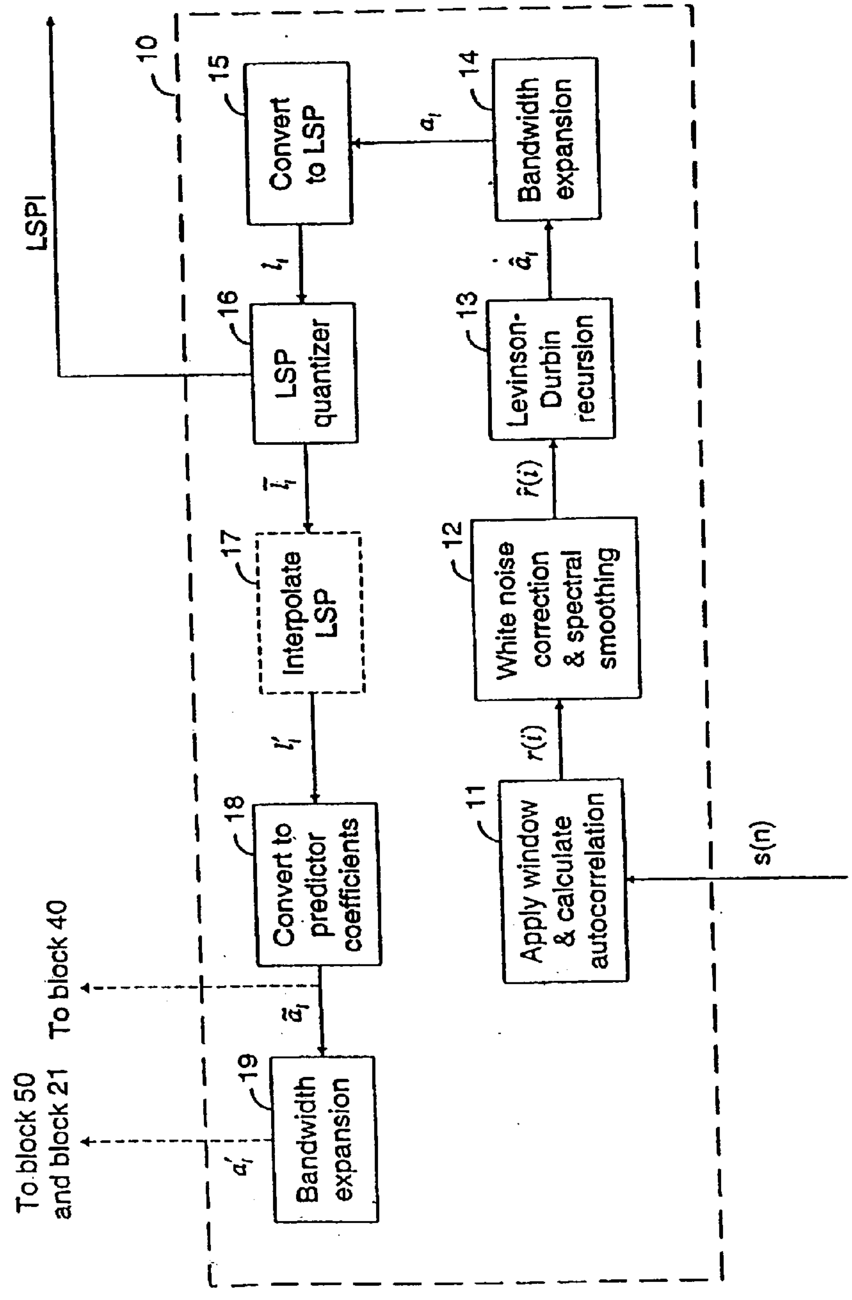
Figure 9 Short-term predictive analysis and quantization (block 10)

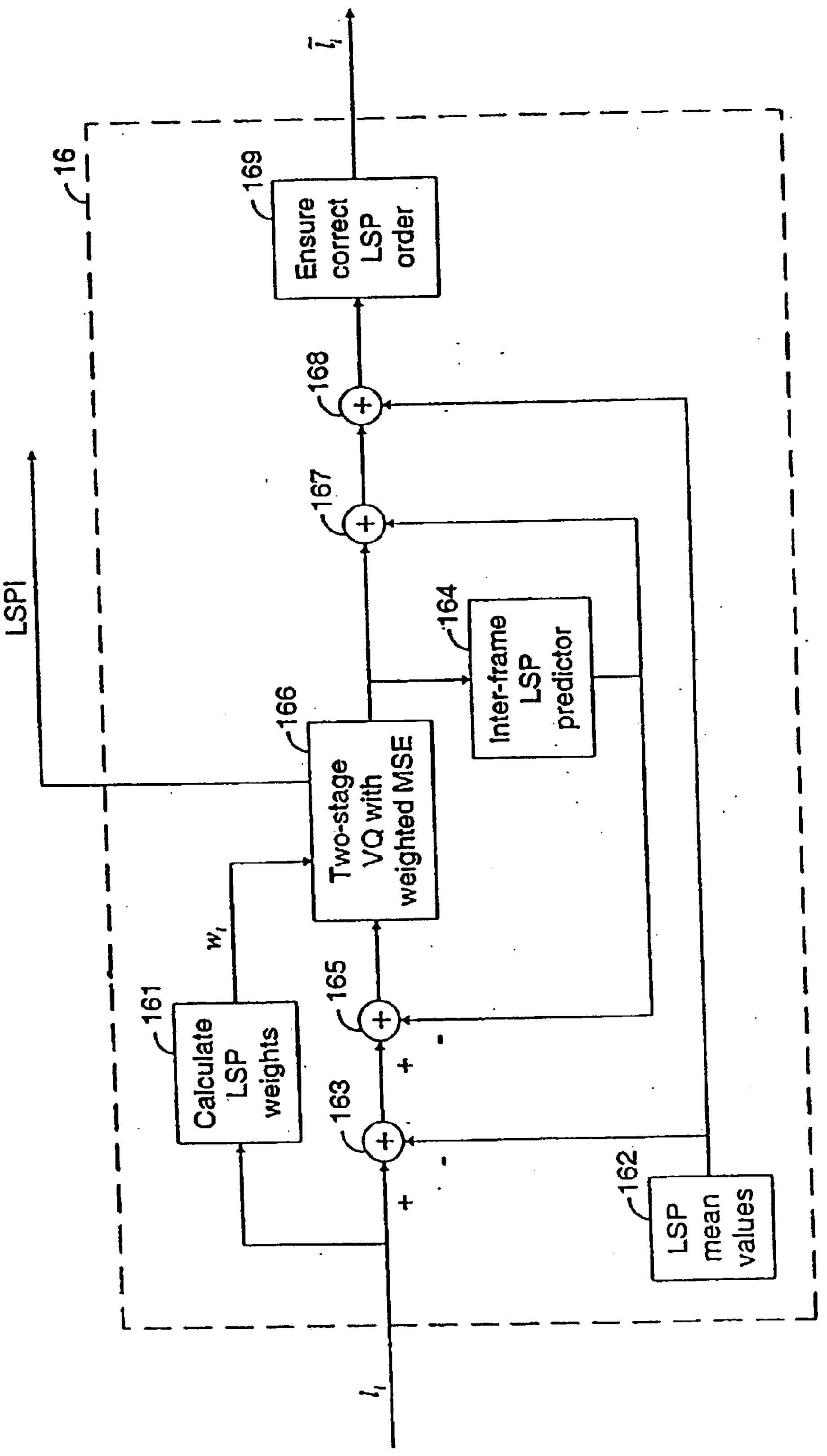
Figure 10 LSP quantizer (block 16)

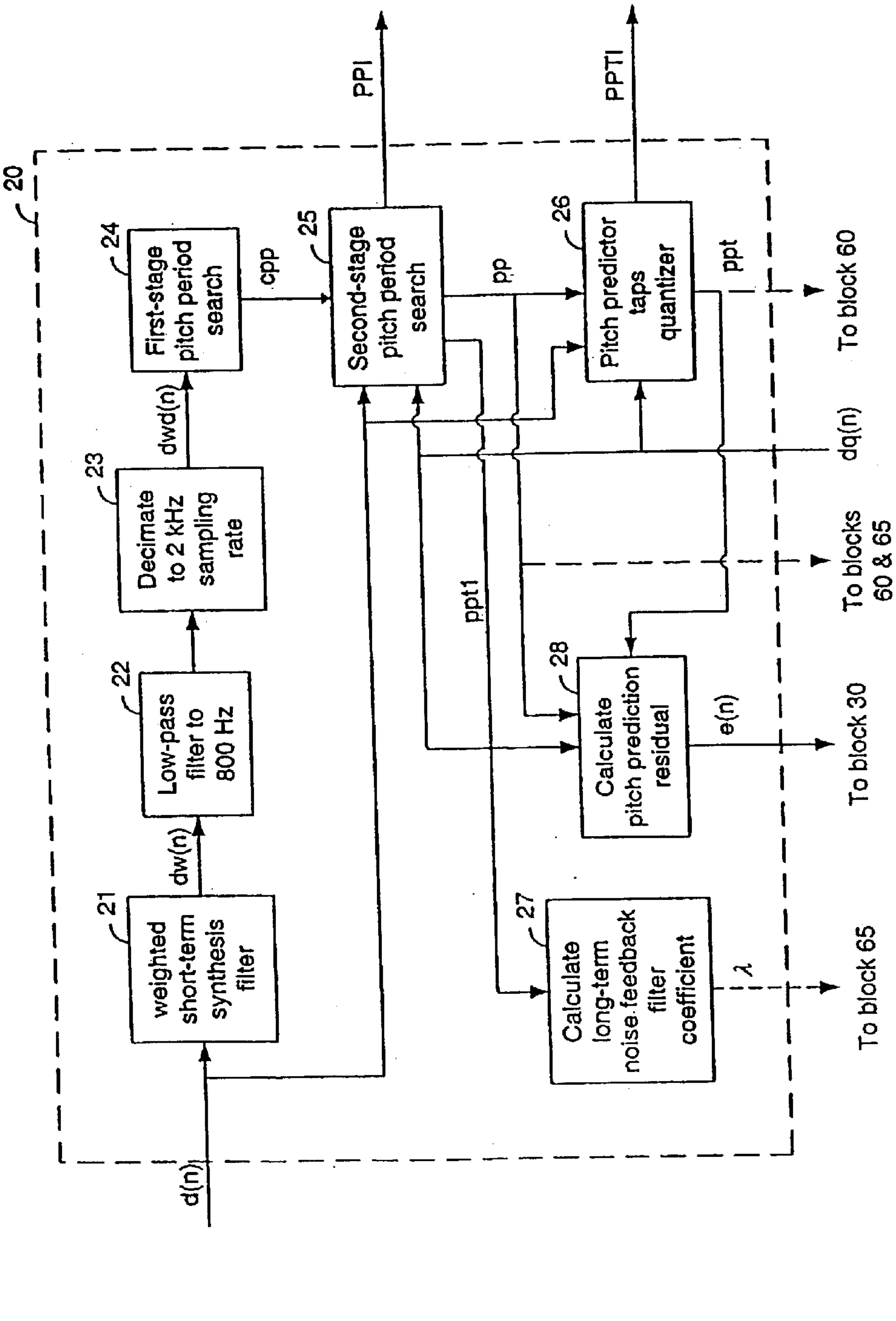
Figure 11 Long-term predictive analysis and quantization (block 20)

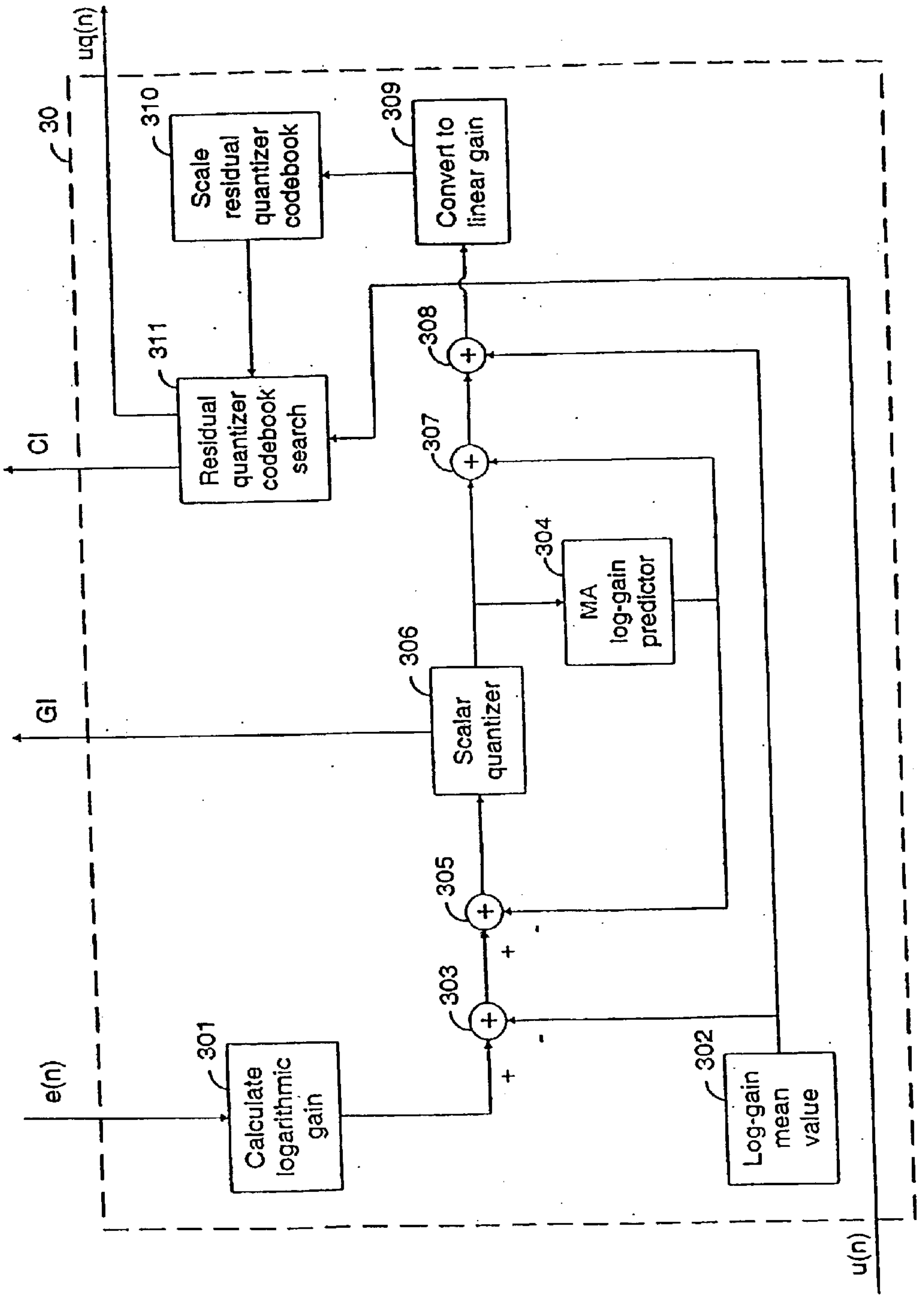
Figure 12 Prediction residual quantizer (block 30)

The portion of the codec structure that is used in prediction residual VQ codebook search of the two-stage noise feedback codec of Fig. 5.

Filter structure during the calculation of the zero-input response of q(n) of Fig. 13C.

Filter structure during the calculation of the zero-state response of q(n) in Fig. 13C.

A filter structure equivalent to the structure in Fig. 15A.

Two-Stage Noise Feedback Coding Structure With Short-Term And Long-Term Prediction And Short-Term And Long-Term Noise Spectral Shaping Two-Stage Noise Feedback Coding Structure With Pole-Zero Short-Term Noise Feedback Filter Zero-State Response Filter Structure Of Two-Stage Noise Feedback Coding Structure With Pole-Zero Short-Term Noise Feedback Filter Simplified Zero-State Response Filter Structure Of Two-Stage Noise Feedback Coding Structure With Pole-Zero Short-Term Noise Feedback Filter Zero-Input Response Filter Structure Of Two-Stage Noise Feedback Coding Structure With Pole-Zero Short-Term Noise Feedback Filter Filter Memory Update For Two-Stage Noise Feedback Coding Structure With Pole-Zero Short-Term Noise Feedback Filter Filter Memory Update For Two-Stage Noise Feedback Coding Structure With Pole-Zero Short-Term Noise Feedback Filter - Zero-State Contribution Filter Memory Update For Two-Stage Noise Feedback Coding Structure With Pole-Zero Short-Term Noise Feedback Filter - Zero-Input Contribution

EFFICIENT EXCITATION QUANTIZATION IN NOISE FEEDBACK CODING WITH GENERAL NOISE SHAPING

CROSS-REFERENCE TO RELATED APPLICATIONS

This application claims priority to Provisional Application No. 60/344,375, filed Jan. 4, 2002, entitled "Improved Efficient Excitation Quantization in Noise Feedback Coding With General Noise Shaping," which is incorporated herein in its entirety by reference.

BACKGROUND OF THE INVENTION

1. Field of the Invention

This invention relates generally to digital communications, and more particularly, to digital coding (or compression) of speech and/or audio signals.

2. Related Art

In speech or audio coding, the coder encodes the input speech or audio signal into a digital bit stream for transmission or storage, and the decoder decodes the bit stream into an output speech or audio signal. The combination of the coder and the decoder is called a codec.

In the field of speech coding, predictive coding is a very popular technique. Prediction of the input waveform is used to remove redundancy from the waveform, and instead of quantizing an input speech waveform directly, a residual signal waveform is quantized. The predictor(s) used in predictive coding can be either backward adaptive or forward adaptive predictors. Backward adaptive predictors do not require any side information as they are derived from a previously quantized waveform, and therefore can be derived at a decoder. On the other hand, forward adaptive predictor(s) require side information to be transmitted to the decoder as they are derived from the input waveform, which is not available at the decoder.

In the field of speech coding, two types of predictors are commonly used. A first type of predictor is called a short-term predictor. It is aimed at removing redundancy between nearby samples in the input waveform. This is equivalent to removing a spectral envelope of the input waveform. A second type of predictor is often referred as a long-term predictor. It removes redundancy between samples further apart, typically spaced by a time difference that is constant for a suitable duration. For speech, this time difference is typically equivalent to a local pitch period of the speech signal, and consequently the long-term predictor is often referred as a pitch predictor. The long-term predictor removes a harmonic structure of the input waveform. A residual signal remaining after the removal of redundancy by the predictor(s) is quantized along with any information needed to reconstruct the predictor(s) at the decoder.

This quantization of the residual signal provides a series of bits representing a compressed version of the residual signal. This compressed version of the residual signal is often denoted the excitation signal and is used to reconstruct an approximation of the input waveform at the decoder in combination with the predictor(s). Generating the series of bits representing the excitation signal is commonly denoted excitation quantization and generally requires the search for, and selection of, a best or preferred candidate excitation among a set of candidate excitations with respect to some cost function. The search and selection require a number of mathematical operations to be performed, which translates into a certain computational complexity when the operations are implemented on a signal processing device. It is advantageous to minimize the number of mathematical operations in order to minimize a power consumption, and maximize a processing bandwidth, of the signal processing device.

Excitation quantization in predictive coding can be based on a sample-by-sample quantization of the excitation. This is referred to as Scalar Quantization (SQ). Techniques for performing Scalar Quantization of the excitation are relatively simple, and thus, the computational complexity associated with SQ is relatively manageable.

Alternatively, the excitation can be quantized based on groups of samples. Quantizing groups of samples is often referred to as Vector Quantization (VQ), and when applied to the excitation, simply as excitation VQ. The use of VQ can provide superior performance to SQ, and may be necessary when the number of coding bits per residual signal sample becomes small (typically less than two bits per sample). Also, VQ can provide a greater flexibility in bit-allocation as compared to SQ, since a fractional number of bits per sample can be used. However, excitation VQ can be relatively complex when compared to excitation SQ. Therefore, there is need to reduce the complexity of excitation VQ as used in a predictive coding environment.

One type of predictive coding is Noise Feedback Coding (NFC), wherein noise feedback filtering is used to shape coding noise, in order to improve a perceptual quality of quantized speech. Therefore, it would be advantageous to use excitation VQ with noise feedback coding, and further, to do so in a computationally efficient manner.

SUMMARY OF THE INVENTION

Summary

The present invention includes efficient methods related to excitation quantization in noise feedback coding, for example, in NFC systems, where the short-term shaping of the coding noise is generalized. The methods are described primarily in Section IX.D and in connection with FIGS. 21–31. The methods are based in part on separating an NFC quantization error signal into ZERO-STATE and ZERO-INPUT response contributions. The methods accommodate general shaping of the coding noise while providing an efficient excitation quantization. The present invention provides an efficient method of producing a ZERO-STATE response with the generalized noise shaping.

In an embodiment, the method is performed in a Noise Feedback Coding (NFC) system having a corresponding ZERO-STATE filter structure, the ZERO-STATE filter structure including multiple filters. The method includes: (a) transforming the ZERO-STATE filter structure to a second ZERO-STATE filter structure including only an all-zero filter, the all-zero filter having a filter response substantially equivalent to a filter response of the ZERO-STATE filter structure including multiple filters; and (b) filtering a VQ codevector with the all-zero filter to produce the ZERO-STATE response error vector corresponding to the VQ codevector.

Terminology

Predictor:

A predictor P as referred to herein predicts a current signal value (e.g., a current sample) based on previous or past signal values (e.g., past samples). A predictor can be a short-term predictor or a long-term predictor. A short-term signal predictor (e.g., a short tern speech predictor) can predict a current signal sample (e.g., speech sample) based on adjacent signal samples from the immediate past. With respect to speech signals, such "short-term" predicting removes redundancies between, for example, adjacent or close-in signal samples. A long-term signal predictor can predict a current signal sample based on signal samples from the relatively distant past. With respect to a speech signal, such "long-term" predicting removes redundancies between relatively distant signal samples. For example, a long-term speech predictor can remove redundancies between distant speech samples due to a pitch periodicity of the speech signal.

The phrases "a predictor P predicts a signal s(n) to produce a signal ps(n)" means the same as the phrase "a predictor P makes a prediction ps(n) of a signal s(n)." Also, a predictor can be considered equivalent to a predictive filter that predictively filters an input signal to produce a predictively filtered output signal.

Coding Noise and Filtering Thereof:

Often, a speech signal can be characterized in part by spectral characteristics (i.e., the frequency spectrum) of the speech signal. Two known spectral characteristics include 1) what is referred to as a harmonic fine structure or line frequencies of the speech signal, and 2) a spectral envelope of the speech signal. The harmonic fine structure includes, for example, pitch harmonics, and is considered a long-term (spectral) characteristic of the speech signal. On the other hand, the spectral envelope of the speech signal is considered a short-term (spectral) characteristic of the speech signal.

Coding a speech signal can cause audible noise when the encoded speech is decoded by a decoder. The audible noise arises because the coded speech signal includes coding noise introduced by the speech coding process, for example, by quantizing signals in the encoding process. The coding noise can have spectral characteristics (i.e., a spectrum) different from the spectral characteristics (i.e., spectrum) of natural speech (as characterized above). Such audible coding noise can be reduced by spectrally shaping the coding noise (i.e., shaping the coding noise spectrum) such that it corresponds to or follows to some extent the spectral characteristics (i.e., spectrum) of the speech signal. This is referred to as "spectral noise shaping" of the coding noise, or "shaping the coding noise spectrum." The coding noise is shaped to follow the speech signal spectrum only "to some extent" because it is not necessary for the coding noise spectrum to exactly follow the speech signal spectrum. Rather, the coding noise spectrum is shaped sufficiently to reduce audible noise, thereby improving the perceptual quality of the decoded speech.

Accordingly, shaping the coding noise spectrum (i.e. spectrally shaping the coding noise) to follow the harmonic fine structure (i.e., long-term spectral characteristic) of the speech signal is referred to as "harmonic noise (spectral) shaping" or "long-term noise (spectral) shaping." Also, shaping the coding noise spectrum to follow the spectral envelope (i.e., short-term spectral characteristic) of the speech signal is referred to a "short-term noise (spectral) shaping" or "envelope noise (spectral) shaping."

Noise feedback filters can be used to spectrally shape the coding noise to follow the spectral characteristics of the speech signal, so as to reduce the above mentioned audible noise. For example, a short-term noise feedback filter can short-term filter coding noise to spectrally shape the coding noise to follow the short-term spectral characteristic (i.e., the envelope) of the speech signal. On the other hand, a long-term noise feedback filter can long-term filter coding noise to spectrally shape the coding noise to follow the long-term spectral characteristic (i.e., the harmonic fine structure or pitch harmonics) of the speech signal. Therefore, short-term noise feedback filters can effect short-term or envelope noise spectral shaping of the coding noise, while long-term noise feedback filters can effect long-term or harmonic noise spectral shaping of the coding noise, in the present invention.

BRIEF DESCRIPTION OF THE DRAWINGS

The present invention is described with reference to the accompanying drawings. In the drawings, like reference numbers indicate identical or functionally similar elements.

FIG. 1 is a block diagram of a first conventional noise feedback coding structure or codec.

FIG. 1A is a block diagram of an example NFC structure or codec using composite short-term and long-term predictors and a composite short-term and long-term noise feedback filter, according to a first embodiment of the present invention.

FIG. 2 is a block diagram of a second conventional noise feedback coding structure or codec.

FIG. 2A is a block diagram of an example NFC structure or codec using a composite short-tern and long-term predictor and a composite short-term and long-term noise feedback filter, according to a second embodiment of the present invention.

FIG. 3 is a block diagram of a first example arrangement of an example NFC structure or codec, according to a third embodiment of the present invention.

FIG. 4 is a block diagram of a first example arrangement of an example nested two-stage NFC structure or codec, according to a fourth embodiment of the present invention.

FIG. 5 is a block diagram of a first example arrangement of an example nested two-stage NFC structure or codec, according to a fifth embodiment of the present invention.

FIG. 6 is a block diagram of a first example arrangement of an example nested two-stage NFC structure or codec, according to a sixth embodiment of the present invention.

FIG. 7 is a detailed block diagram of an example NFC encoding structure or coder based on the codec of FIG. 5, according to a preferred embodiment of the present invention.

FIG. 8 is a detailed block diagram of an example NFC decoding structure or decoder for decoding encoded speech signals encoded using the coder of FIG. 7.

FIG. 9 is a detailed block diagram of a short-term linear predictive analysis and quantization signal processing block of the coder of FIG. 7. The signal processing block obtains coefficients for a short-term predictor and a short-term noise feedback filter of the coder of FIG. 7.

FIG. 10 is a detailed block diagram of a Line Spectrum Pair (LSP) quantizer and encoder signal processing block of the short-term linear predictive analysis and quantization signal processing block of FIG. 9.

FIG. 11 is a detailed block diagram of a long-term linear predictive analysis and quantization signal processing block of the coder of FIG. 7. The signal processing block obtains coefficients for a long-term predictor and a long-term noise feedback filter of the coder of FIG. 7.

FIG. 12 is a detailed block diagram of a prediction residual quantizer of the coder of FIG. 7.

DETAILED DESCRIPTION OF THE INVENTION

Table of Contents

Figure 5A:
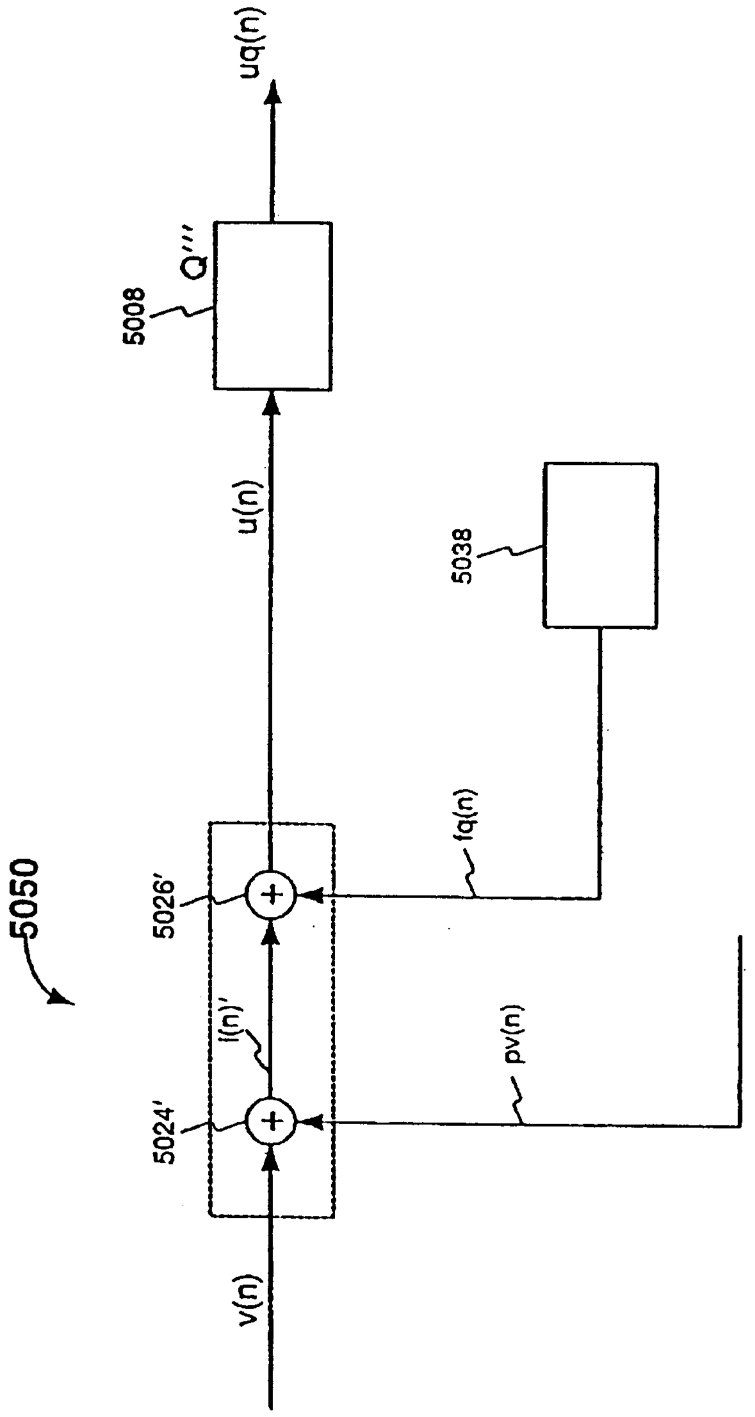
FIG. 5A is a block diagram of an alternative but mathematically equivalent signal combining arrangement corresponding to a signal combining arrangement of FIG. 5.

I. Conventional Noise Feedback Coding
- A. First Conventional Codec
- B. Second Conventional Codec II. Two-Stage Noise Feedback Coding
- A. Composite Codec Embodiments
  1. First Codec Embodiment—Composite Codec
  2. Second Codec Embodiment Alternative Composite Codec
- B. Codec Embodiments Using Separate Short-Term and Long-Term Predictors (Two-Stage Prediction) and Noise Feedback Coding
  1. Third Codec Embodiment—Two Stage Prediction With One Stage Noise Feedback
  2. Fourth Codec Embodiment—Two Stage Prediction With Two Stage Noise Feedback (Nested Two Stage Feedback Coding)
  3. Fifth Codec Embodiment—Two Stag Prediction With Two Stage Noise Feedback (Nested Two Stage Feedback Coding)
  4. Sixth Codec Embodiment Two Stage Prediction With Two Stage Noise Feedback (Nested Two Stage Feedback Coding)
  5. Coding Method III. Overview of Preferred Embodiment (Based on the Fifth Embodiment Above)

IV. Short Term Linear Predictive Analysis and Quantization

V. Short-Term Linear Prediction of input Signal

VI. Long-Term Linear Predictive Analysis and Quantization

VII. Quantization of Residual Gain

VIII. Scalar Quantization of Linear Prediction Residual Signal

IX. Vector Quantization of Linear Prediction Residual Signal
A. General VQ Search
1. High-Level Embodiment
a. System
b. Methods
2. Example Specific Embodiment
a. System
b. Methods
B. Fast VQ Search
1. High-Level Embodiment
a. System
b. Methods
2. Example Specific Embodiment
a. ZERO-INPUT Response
b. ZERO-STATE Response
1. ZERO-STATE Response—First Embodiment
2. ZERO-STATE Response—Second Embodiment
3. Further Reduction in Computational Complexity
C. Further Fast VQ Search Embodiments
1. Fast VQ Search of General (e.g., Unsigned) Excitation Codebook in NFC System
a. Straightforward Method
b. Fast VQ Search of General Excitation Codebook Using Correlation Technique
2. Fast VQ Search of Signed Excitation Codebook in NFC System ZERO-INPUT Response
a. Straightforward Method
b. Fast VQ Search of Signed Excitation Codebook Using Correlation Technique
3. Combination of Efficient Search Methods
4. Method Flow Charts
5. Comparison of Search Method Complexities
D. Further Embodiments Related to VQ Searching in NFC with Generalized Noise Shaping
1. Overview
2. ZERO-STATE Calculation
3. ZERO-INPUT Calculation
4. VQ Search
5. Filter Memory Update Process
6. Method Flow Charts
a. ZERO-STATE Calculation
b. Filter Memory Update Process
X. Decoder Operations
XI. Hardware and Software Implementations
XII. Conclusion

I. Conventional Noise Feedback Coding

Before describing the present invention, it is helpful to first describe the conventional noise feedback coding schemes.

A. First Conventional Coder

FIG. 1 is a block diagram of a first conventional NFC structure or codec 1000. Codec 1000 includes the following functional elements: a first predictor 1002 (also referred to as predictor P(z)); a first combiner or adder 1004; a second combiner or adder 1006; a quantizer 1008; a third combiner or adder 1010; a second predictor 1012 (also referred to as a predictor P(z)); a fourth combiner 1014; and a noise feedback filter 1016 (also referred to as a filter F(z)).

Codec 1000 encodes a sampled input speech or audio signal s(n) to produce a coded speech signal, and then decodes the coded speech signal to produce a reconstructed speech signal sq(n), representative of the input speech signal s(n). Reconstructed output speech signal sq(n) is associated with an overall coding noise r(n)=s(n)−sq(n). An encoder portion of codec 1000 operates as follows. Sampled input speech or audio signal s(n) is provided to a first input of combiner 1004, and to an input of predictor 1002. Predictor 1002 makes a prediction of current speech signal s(n) values (e.g., samples) based on past values of the speech signal to produce a predicted signal ps(n). This process is referred to as predicting signal s(n) to produce predicted signal ps(n). Predictor 1002 provides predicted speech signal ps(n) to a second input of combiner 1004. Combiner 1004 combines signals s(n) and ps(n) to produce a prediction residual signal d(n).

Combiner 1006 combines residual signal d(n) with a noise feedback signal fq(n) to produce a quantizer input signal u(n). Quantizer 1008 quantizes input signal u(n) to produce a quantized signal uq(n). Combiner 1014 combines (that is, differences) signals u(n) and uq(n) to produce a quantization error or noise signal q(n) associated with the quantized signal uq(n). Filter 1016 filters noise signal q(n) to produce feedback noise signal fq(n).

A decoder portion of codec 1000 operates as follows. Exiting quantizer 1008, combiner 1010 combines quantizer output signal uq(n) with a prediction ps(n)' of input speech signal s(n) to produce reconstructed output speech signal sq(n). Predictor 1012 predicts input speech signal s(n) to produce predicted speech signal ps(n)', based on past samples of output speech signal sq(n).

The following is an analysis of codec 1000 described above. The predictor P(z) (1002 or 1012) has a transfer function of $$P(z) = \sum_{i=1}^{M} a_i z^{-i},$$

where M is the predictor order and $a_i$ is the i-th predictor coefficient. The noise feedback filter F(z) (1016) can have many possible forms. One popular form of F(z) is given by $$F(z) = \sum_{i=1}^{L} f_i z^{-i}.$$

This form of noise feedback filter was used by B. S. Atal and M. R. Schroeder in their publication "Predictive Coding of Speech Signals and Subjective Error Criteria," *IEEE Transactions on Acoustics, Speech, and Signal Processing*, pp. 247–254, June 1979, with L=M, and $f_i=\alpha^i a_i$, or $F(z)=P(z/\alpha)$.

With the NFC codec structure 1000 in FIG. 1, it can be shown that the codec reconstruction error, or coding noise, is given by $$r(n) = s(n) - sq(n) = \sum_{i=1}^{M} a_i r(n-i) + q(n) - \sum_{i=1}^{L} f_i q(n-i),$$

or in terms of z-transform representation, $$R(z) = \frac{1 - F(z)}{1 - P(z)} Q(z).$$

If the encoding bit rate of the quantizer 1008 in FIG. 1 is sufficiently high, the quantization error q(n)=u(n)−uq(n) is roughly white. From the equation above, it follows that the magnitude spectrum of the coding noise r(n) will have the same shape as the magnitude of the frequency response of the filter [1−F(z)]/[1−P(z)]. If F(z)=P(z), then R(z)=Q(z), the coding noise is white, and the system 1000 in FIG. 1 is equivalent to a conventional DPCM codec. If F(z)=0, then R(z)=Q(z)/[1−P(z)], the coding noise has the same spectral shape as the input signal spectrum, and the codec system 1000 in FIG. 1 becomes a so-called "open-loop DPCM" codec. If F(z) is somewhere between P(z) and 0, for example, F(z)=P(z/α), where 0<α<1, then the spectrum of the coding noise is somewhere between a white spectrum and the input signal spectrum. Coding noise spectrally shaped this way is indeed less audible than either the white noise or the noise with spectral shape identical to the input signal spectrum.

B. Second Conventional Codec

FIG. 2 is a block diagram of a second conventional NFC structure or codec 2000. Codec 2000 includes the following functional elements: a first combiner or adder 2004; a second combiner or adder 2006; a quantizer 2008; a third combiner or adder 2010; a predictor 2012 (also referred to as a predictor P(z)); a fourth combiner 2014; and a noise feedback filter 2016 (also referred to as a filter N(z)−1).

Codec 2000 encodes a sampled input speech signal s(n) to produce a coded speech signal, and then decodes the coded speech signal to produce a reconstructed speech signal sq(n), representative of the input speech signal s(n). Reconstructed speech signal sq(n) is associated with an overall coding noise r(n)=s(n)−sq(n). Codec 2000 operates as follows. A sampled input speech or audio signal s(n) is provided to a first input of combiner 2004. A feedback signal x(n) is provided to a second input of combiner 2004. Combiner 2004 combines signals s(n) and x(n) to produce a quantizer input signal u(n). Quantizer 2008 quantizes input signal u(n) to produce a quantized signal uq(n) (also referred to as a quantizer output signal uq(n)). Combiner 2014 combines (that is, differences) signals u(n) and uq(n) to produce a quantization error or noise signal q(n) associated with the quantized signal uq(n). Filter 2016 filters noise signal q(n) to produce feedback noise signal fq(n). Combiner 2006 combines feedback noise signal fq(n) with a predicted signal ps(n) (i.e., a prediction of input speech signal s(n)) to produce feedback signal x(n).

Exiting quantizer 2008, combiner 2010 combines quantizer output signal uq(n) with prediction or predicted signal ps(n) to produce reconstructed output speech signal sq(n). Predictor 2012 predicts input speech signal s(n) (to produce predicted speech signal ps(n)) based on past samples of output speech signal sq(n). Thus, predictor 2012 is included in the encoder and decoder portions of codec 2000.

Codec structure 2000 was proposed by J. D. Makhoul and M. Berouti in "Adaptive Noise Spectral Shaping and Entropy Coding in Predictive Coding of Speech," *IEEE Transactions on Acoustics, Speech, and Signal Processing*, pp. 63–73, February 1979. This equivalent, known NFC codec structure 2000 has at least two advantages over codec 1000. First, only one predictor P(z) (2012) is used in the structure. Second, if N(z) is the filter whose frequency response corresponds to the desired noise spectral shape, this codec structure 2000 allows us to use [N(z)−1] directly as the noise feedback filter 2016. Makhoul and Berouti showed in their 1979 paper that very good perceptual speech quality can be obtained by choosing N(z) to be a simple second-order finite-impulse-response (FIR) filter.

The codec structures in FIGS. 1 and 2 described above can each be viewed as a predictive codec with an additional noise feedback loop. In FIG. 1, a noise feedback loop is added to the structure of an "open-loop DPCM" codec, where the predictor in the encoder uses unquantized original input signal as its input. In FIG. 2, on the other hand, a noise feedback loop is added to the structure of a "closed-loop DPCM" codec, where the predictor in the encoder uses the quantized signal as its input. Other than this difference in the signal that is used as the predictor input in the encoder, the codec structures in FIG. 1 and FIG. 2 are conceptually very similar.

II. Two-Stage Noise Feedback Coding

The conventional noise feedback coding principles described above are well-known prior art. Now we will address two-stage noise feedback coding with both short-term and long-term prediction, and both short-term and long-term noise spectral shaping.

A. Composite Codec Embodiments

A first approach is to combine a short-term predictor and a long-term predictor into a single composite short-term and long-term predictor, and then re-use the general structure of codec 1000 in FIG. 1 or that of codec 2000 in FIG. 2 to construct an improved codec corresponding to the general structure of codec 1000 and an improved codec corresponding to the general structure of codec 2000. Note that in FIG. 1, the feedback loop to the right of the symbol uq(n) that includes the adder 1010 and the predictor loop (including predictor 1012) is often called a synthesis filler, and has a transfer function of 1/[1−P(z)]. Also note that in most predictive codecs employing both short-term and long-term prediction, the decoder has two such synthesis filters cascaded: one with the short-term predictor and the other with the long-term predictor in the feedback loop. Let Ps(z) and Pl(z) be the transfer functions of the short-term predictor and the long-term predictor, respectively. Then, the cascaded synthesis filter will have a transfer function of $$\frac{1}{[1-Ps(z)][1-Pl(z)]}=\frac{1}{1-Ps(z)-Pl(z)+Ps(z)Pl(z)}=\frac{1}{1-P'(z)},$$

where P'(z)=Ps(z)+Pl(z) Ps(z)Pl(z) is the composite predictor (for example, the predictor that includes the effects of both short-term prediction and long-term prediction).

Similarly, in FIG. 1, the filter structure to the left of the symbol d(n), including the adder 1004 and the predictor loop (i.e., including predictor 1002), is often called an analysis filter, and has a transfer function of 1−P(z). If we cascade two such analysis filters, one with the short-term predictor and the other with the long-term predictor, then the transfer function of the cascaded analysis filter is $$[1-Ps(z)][1-Pl(z)]=1-Ps(z)-Pl(z)+Ps(z)Pl(z)=1-P'(z).$$

Therefore, one can replace the predictor P(z) (1002 or 1012) in FIG. 1 and the predictor P(z) (2012) in FIG. 2 by the composite predictor P'(z)=Ps(z)+Pl(z)−Ps(z)Pl(z) to get the effect of two-stage prediction. To get both short-term and long-term noise spectral shaping, one can use the general coding structure of codec 1000 in FIG. 1 and choose the filter transfer function F(z)=Ps(z/α)+Pl(z/β)−Ps(z/α)Pl(z/β)=F'(z). Then, the noise spectral shape will follow the frequency response of the filter $$\frac{1-F'(z)}{1-P'(z)}=\frac{1-Ps(z/\alpha)-Pl(z/\beta)+Ps(z/\alpha)Pl(z/\beta)}{1-Ps(z)-Pl(z)+Ps(z)Pl(z)}=\frac{[1-Ps(z/\alpha)]}{[1-Ps(z)]}\frac{[1-Pl(z/\beta)]}{[1-Pl(z)]}$$

Thus, both short-term noise spectral shaping and long-term spectral shaping are achieved, and they can be individually controlled by the parameters α and β, respectively.

1. First Codec Embodiment—Composite Codec

FIG. 1A is a block diagram of an example NFC structure or codec 1050 using composite short-term and long-term predictors P'(z) and a composite short-term and long-term noise feedback filter F'(z), according to a first embodiment of the present invention. Codec 1050 reuses the general structure of known codec 1000 in FIG. 1, but replaces the predictors P(z) and filter of codec 1000 F(z) with the composite predictors P'(z) and the composite filter F'(z), as is further described below.

1050 includes the following functional elements: a first composite short-term and long-term predictor 1052 (also referred to as a composite predictor P'(z)); a first combiner or adder 1054; a second combiner or adder 1056; a quantizer 1058; a third combiner or adder 1060; a second composite short-term and long-term predictor 1062 (also referred to as a composite predictor P'(z)); a fourth combiner 1064; and a composite short-term and long-term noise feedback filter 1066 (also referred to as a filter F'(z)).

The functional elements or blocks of codec 1050 listed above are arranged similarly to the corresponding blocks of codec 1000 (described above in connection with FIG. 1) having reference numerals decreased by "50." Accordingly, signal flow between the functional blocks of codec 1050 is similar to signal flow between the corresponding blocks of codec 1000.

Codec 1050 encodes a sampled input speech signal s(n) to produce a coded speech signal, and then decodes the coded speech signal to produce a reconstructed speech signal sq(n), representative of the input speech signal s(n). Reconstructed speech signal sq(n) is associated with an overall coding noise r(n)=s(n)−sq(n). An encoder portion of codec 1050 operates in the following exemplary manner. Composite predictor 1052 short-term and long-term predicts input speech signal s(n) to produce a short-term and long-term predicted speech signal ps(n). Combiner 1054 combines short-term and long-term predicted signal ps(n) with speech signal s(n) to produce a prediction residual signal d(n).

Combiner 1056 combines residual signal d(n) with a short-term and long-term filtered, noise feedback signal fq(n) to produce a quantizer input signal u(n). Quantizer 1058 quantizes input signal u(n) to produce a quantized signal uq(n) (also referred to as a quantizer output signal) associated with a quantization noise or error signal q(n). Combiner 1064 combines (that is, differences) signals u(n) and uq(n) to produce the quantization error or noise signal q(n). Composite filter 1066 short-term and long-term filters noise signal q(n) to produce short-term and long-term filtered, feedback noise signal fq(n). In codec 1050, combiner 1064, composite short-term and long-term filter 1066, and combiner 1056 together form a noise feedback loop around quantizer 1058. This noise feedback loop spectrally shapes the coding noise associated with codec 1050, in accordance with the composite filter, to follow, for example, the short-term and long-term spectral characteristics of input speech signal s(n).

A decoder portion of coder 1050 operates in the following exemplary manner. Exiting quantizer 1058, combiner 1060 combines quantizer output signal uq(n) with a short-term and long-term prediction ps(n)' of input speech signal s(n) to produce a quantized output speech signal sq(n). Composite predictor 1062 short-term and long-term predicts input speech signal s(n) (to produce short-term and long-term predicted signal ps(n)') based on output signal sq(n).

2. Second Codec Embodiment-Alternative Composite Codec

As an alternative to the above described first embodiment, a second embodiment of the present invention can be constructed based on the general coding structure of codec 2000 in FIG. 2. Using the coding structure of codec 2000 with P(z) replaced by composite function P'(z), one can choose a suitable composite noise feedback filter N'(z)−1 (replacing filter 2016) such that it includes the effects of both short-term and long-term noise spectral shaping. For example, N'(z) can be chosen to contain two FIR filters in cascade: a short-term filter to control the envelope of the noise spectrum, while another, long-term filter, controls the harmonic structure of the noise spectrum.

FIG. 2A is a block diagram of an example NFC structure or codec 2050 using a composite short-term and long-term predictor P'(z) and a composite short-term and long-term noise feedback filter N'(z)−1, according to a second embodiment of the present invention. Codec 2050 includes the following functional elements: a first combiner or adder 2054; a second combiner or adder 2056; a quantizer 2058; a third combiner or adder 2060; a composite short-term and long-term predictor 2062 (also referred to as a predictor P'(z)); a fourth combiner 2064; and a noise feedback filter 2066 (also referred to as a filter N'(z)−1).

The functional elements or blocks of codec 2050 listed above are arranged similarly to the corresponding blocks of codec 2000 (described above in connection with FIG. 2) having reference numerals decreased by "50." Accordingly, signal flow between the functional blocks of codec 2050 is similar to signal flow between the corresponding blocks of codec 2000.

Codec 2050 operates in the following exemplary manner. Combiner 2054 combines a sampled input speech or audio signal s(n) with a feedback signal x(n) to produce a quantizer input signal u(n). Quantizer 2058 quantizes input signal u(n) to produce a quantized signal uq(n) associated with a quantization noise or error signal q(n). Combiner 2064 combines (that is, differences) signals u(n) and uq(n) to produce quantization error or noise signal q(n). Composite filter 2066 concurrently long-term and short-term filters noise signal q(n) to produce short-term and long-term filtered, feedback noise signal fq(n). Combiner 2056 combines short-term and long-term filtered, feedback noise signal fq(n) with a short-term and long-term prediction s(n) of input signal s(n) to produce feedback signal x(n). In codec 2050, combiner 2064, composite short-term and long-term filter 2066, and combiner 2056 together form a noise feedback loop around quantizer 2058. This noise feedback loop spectrally shapes the coding noise associated with codec 2050 in accordance with the composite filter, to follow, for example, the short-term and long-term spectral characteristics of input speech signal s(n).

Exiting quantizer 2058, combiner 2060 combines quantizer output signal uq(n) with the short-term and long-term predicted signal ps(n)' to produce a reconstructed output speech signal sq(n). Composite predictor 2062 short-term an long-term predicts input speech signal s(n) (to produce short-term and long-term predicted signal ps(n)) based on reconstructed output speech signal sq(n).

In this invention, the first approach for two-stage NFC described above achieves the goal by re-using the general codec structure of conventional single-stage noise feedback coding (for example, by re-using the structures of codecs 1000 and 2000) but combining what are conventionally separate short-term and long-term predictors into a single composite short-term and long-term predictor. A second preferred approach, described below, allows separate short-term and long-term predictors to be used, but requires a modification of the conventional codec structures 1000 and 2000 of FIGS. 1 and 2.

B. Codec Embodiments Using Separate Short-Term and Long-Term Predictors (Two-Stage Prediction) and Noise Feedback Coding It is not obvious how the codec structures in FIGS. 1 and 2 should be modified in order to achieve two-stage prediction and two-stage noise spectral shaping at the same time. For example, assuming the filters in FIG. 1 are all short-term filters, then, cascading a long-term analysis filter after the short-term analysis filter, cascading a long-term synthesis filter before the short-term synthesis filter, and cascading a long-term noise feedback filter to the short-term noise feedback filter in FIG. 1 will not give a codec that achieves the desired result.

To achieve two-stage prediction and two-stage noise spectral shaping at the same time without combining the two predictors into one, the key lies in recognizing that the quantizer block in FIGS. 1 and 2 can be replaced by a coding system based on long-term prediction. Illustrations of this concept are provided below.

I. Third Codec Embodiment—Two Stage Prediction with One Stage Noise Feedback

As an illustration of this concept, FIG. 3 shows a codec structure where the quantizer block 1008 in FIG. 1 has been replaced by a DPCM-type structure based on long-term prediction (enclosed by the dashed box and labeled as Q' in FIG. 3). FIG. 3 is a block diagram of a first exemplary arrangement of an example NFC structure or codec 3000, according to a third embodiment of the present invention.

Codec 3000 includes the following functional elements: a first short-term predictor 3002 (also referred to as a short-term predictor Ps(z)); a first combiner or adder 3004; a second combiner or adder 3006; predictive quantizer 3008 (also referred to as predictive quantizer Q'); a third combiner or adder 3010; a second short-term predictor 3012 (also referred to as a short-term predictor Ps(z)); a fourth combiner 3014; and a short-term noise feedback filter 3016 (also referred to as a short-term noise feedback filter Fs(z)).

Predictive quantizer Q' (3008) includes a first combiner 3024, either a scalar or a vector quantizer 3028, a second combiner 3030, and a long-term predictor 3034 (also referred to as a long-term predictor (Pl(z)).

Codec 3000 encodes a sampled input speech signal s(n) to produce a coded speech signal, and then decodes the coded speech signal to produce a reconstructed output speech signal sq(n), representative of the input speech signal s(n). Reconstructed speech signal sq(n) is associated with an overall coding noise r(n)=s(n)−sq(n). Codec 3000 operates in the following exemplary manner. First, a sampled input speech or audio signal s(n) is provided to a first input of combiner 3004, and to an input of predictor 3002. Predictor 3002 makes a short-term prediction of input speech signal s(n) based on past samples thereof to produce a predicted input speech signal ps(n). This process is referred to as short-term predicting input speech signal s(n) to produce predicted signal ps(n). Predictor 3002 provides predicted input speech signal ps(n) to a second input of combiner 3004. Combiner 3004 combines signals s(n) and ps(n) to produce a prediction residual signal d(n).

Combiner 3006 combines residual signal d(n) with a first noise feedback signal fqs(n) to produce a predictive quantizer input signal v(n). Predictive quantizer 3008 predictively quantizes input signal v(n) to produce a predictively quantized output signal vq(n) (also referred to as a predictive quantizer output signal vq(n)) associated with a predictive noise or error signal qs(n). Combiner 3014 combines (that is, differences) signals v(n) and vq(n) to produce the predictive quantization error or noise signal qs(n). Short-term filter 3016 short-term filters predictive quantization noise signal q(n) to produce the feedback noise signal fqs(n). Therefore, Noise Feedback (NF) codec 3000 includes an outer NF loop around predictive quantizer 3008, comprising combiner 3014, short-term noise filter 3016, and combiner 3006. This outer NF loop spectrally shapes the coding noise associated with codec 3000 in accordance with filter 3016, to follow, for example, the short-term spectral characteristics of input speech signal s(n).

Predictive quantizer 3008 operates within the outer NF loop mentioned above to predictively quantize predictive quantizer input signal v(n) in the following exemplary manner. Predictor 3034 long-term predicts (i.e., makes a long-term prediction of) predictive quantizer input signal v(n) to produce a predicted, predictive quantizer input signal pv(n). Combiner 3024 combines signal pv(n) with predictive quantizer input signal v(n) to produce a quantizer input signal u(n). Quantizer 3028 quantizes quantizer input signal u(n) using a scalar or vector quantizing technique, to produce a quantizer output signal uq(n). Combiner 3030 combines quantizer output signal uq(n) with signal pv(n) to produce predictively quantized output signal vq(n).

Exiting predictive quantizer 3008, combiner 3010 combines predictive quantizer output signal vq(n) with a prediction ps(n)' of input speech signal s(n) to produce output speech signal sq(n). Predictor 3012 short-term predicts (i.e., makes a short-term prediction of) input speech signal s(n) to produce signal ps(n)', based on output speech signal sq(n).

In the first exemplary arrangement of NF codec 3000 depicted in FIG. 3, predictors 3002, 3012 are short-term predictors and NF filter 3016 is a short-term noise filter, while predictor 3034 is a long-term predictor. In a second exemplary arrangement of NF codec 3000, predictors 3002, 3012 are long-term predictors and NF filter 3016 is a long-term filter, while predictor 3034 is a short-term predictor. The outer NF loop in this alternative arrangement spectrally shapes the coding noise associated with codec 3000 in accordance with filter 3016, to follow, for example, the long-term spectral characteristics of input speech signal s(n).

In the first arrangement described above, the DPCM structure inside the Q' dashed box (3008) does not perform long-term noise spectral shaping. If everything inside the Q' dashed box (3008) is treated as a black box, then for an observer outside of the box, the replacement of a direct quantizer (for example, quantizer 1008) by a long-term-prediction-based DPCM structure (that is, predictive quantizer Q' (3008)) is an advantageous way to improve the quantizer performance. Thus, compared with FIG. 1, the codec structure of codec 3000 in FIG. 3 will achieve the advantage of a lower coding noise, while maintaining the same kind of noise spectral envelope. In fact, the system 3000 in FIG. 3 is good enough for some applications when the bit rate is high enough and it is simple, because it avoids the additional complexity associated with long-term noise spectral shaping.

2. Fourth Codec Embodiment—Two Stage Prediction with Two Stage Noise Feedback (Nested Two Stage Feedback Coding)

Taking the above concept one step further, predictive quantizer Q' of codec 3000 in FIG. 3 can be replaced by the complete NFC structure (3008) of codec 1000 in FIG. 1. A resulting example "nested" or "layered" two-stage NFC codec structure 4000 is depicted in FIG. 4, and described below.

FIG. 4 is a block diagram of a first exemplary arrangement of the example nested two-stage NF coding structure or codec 4000, according to a fourth embodiment of the present invention. Codec 4000 includes the following functional elements: a first short-term predictor 4002 (also referred to as a short-term predictor Ps(z)); a first combiner or adder 4004; a second combiner or adder 4006; a predictive quantizer 4008 (also referred to as a predictive quantizer Q"); a third combiner or adder 4010; a second short-term predictor 4012 (also referred to as a short-term predictor Ps(z)); a fourth combiner 4014; and a short-term noise feedback filter 4016 (also referred to as a short-term noise feedback filter Fs(z)).

Predictive quantizer Q" (4008) includes a first long-term predictor 4022 (also referred to as a long-term predictor Pl(z)), a first combiner 4024, either a scalar or a vector quantizer 4028, a second combiner 4030, a second long-term predictor 4034 (also referred to as a long-term predictor (Pl(z)), a second combiner or adder 4036, and a long-term filter 4038 (also referred to as a long-term filter Fl(z)).

Codec 4000 encodes a sampled input speech signal s(n) to produce a coded speech signal, and then decodes the coded speech signal to produce a reconstructed output speech signal sq(n), representative of the input speech signal s(n). Reconstructed speech signal sq(n) is associated with an overall coding noise r(n)=s(n) sq(n). In coding input speech signal s(n), predictors 4002 and 4012, combiners 4004, 4006, and 4010, and noise filter 4016 operate similarly to corresponding elements described above in connection with FIG. 3 having reference numerals decreased by "1000". Therefore, NF codec 4000 includes an outer or first stage NF loop comprising combiner 4014, short-term noise filter 4016, and combiner 4006. This outer NF loop spectrally shapes the coding noise associated with codec 4000 in accordance with filter 4016, to follow, for example, the short-term spectral characteristics of input speech signal s(n).

Predictive quantizer Q" (4008) operates within the outer NF loop mentioned above to predictively quantize predictive quantizer input signal v(n) to produce a predictively quantized output signal vq(n) (also referred to as a predictive quantizer output signal vq(n)) in the following exemplary manner. As mentioned above, predictive quantizer Q" has a structure corresponding to the basic NFC structure of codec 1000 depicted in FIG. 1. In operation, predictor 4022 long-term predicts predictive quantizer input signal v(n) to produce a predicted version pv(n) thereof. Combiner 4024 combines signals v(n) and pv(n) to produce an intermediate result signal i(n). Combiner 4026 combines intermediate result signal i(n) with a second noise feedback signal fq(n) to produce a quantizer input signal u(n). Quantizer 4028 quantizes input signal u(n) to produce a quantized output signal uq(n) (or quantizer output signal uq(n)) associated with a quantization error or noise signal q(n). Combiner 4036 combines (differences) signals u(n) and uq(n) to produce the quantization noise signal q(n). Long-term filter 4038 long-term filters the noise signal q(n) to produce feedback noise signal fq(n). Therefore, combiner 4036, long-term filter 4038 and combiner 4026 form an inner or second stage NF loop nested within the outer NF loop. This inner NF loop spectrally shapes the coding noise associated with codec 4000 in accordance with filter 4038, to follow, for example, the long-term spectral characteristics of input speech signal s(n).

Exiting quantizer 4028, combiner 4030 combines quantizer output signal uq(n) with a prediction pv(n)' of predictive quantizer input signal v(n). Long-term predictor 4034 long-term predicts signal v(n) (to produce predicted signal pv(n)') based on signal vq(n).

Exiting predictive quantizer Q" (4008), predictively quantized signal vq(n) is combined with a prediction ps(n)' of input speech signal s(n) to produce reconstructed speech signal sq(n). Predictor 4012 short term predicts input speech signal s(n) (to produce predicted signal ps(n)') based on reconstructed speech signal sq(n).

In the first exemplary arrangement of NF codec 4000 depicted in FIG. 4, predictors 4002 and 4012 are short-term predictors and NF filter 4016 is a short-term noise filter, while predictors 4022, 4034 are long-term predictors and noise filter 4038 is a long-term noise filter. In a second exemplary arrangement of NF codec 4000, predictors 4002, 4012 are long-term predictors and NF filter 4016 is a long-term noise filter (to spectrally shape the coding noise to follow, for example, the long-term characteristic of the input speech signal s(n)), while predictors 4022, 4034 are short-term predictors and noise filter 4038 is a short-term noise filter (to spectrally shape the coding noise to follow, for example, the short-term characteristic of the input speech signal s(n)).

In the first arrangement of codec 4000 depicted in FIG. 4, the dashed box labeled as Q" (predictive filter Q" (4008)) contains an NFC codec structure just like the structure of codec 1000 in FIG. 1, but the predictors 4022, 4034 and noise feedback filter 4038 are all long-term filters. Therefore, the quantization error qs(n) of the "predictive quantizer" Q" (4008) is simply the reconstruction error, or coding noise of the NFC structure inside the Q" dashed box 4008. Hence, from earlier equation, we have $$QS(z)=\frac{1-Fl(z)}{1-Pl(z)}Q(z).$$

Thus, the z-transform of the overall coding noise of codec 4000 in FIG. 4 is $$\begin{aligned}R(z)=S(z)-SQ(z)&=\frac{1-Fs(z)}{1-Ps(z)}QS(z)\\&=\frac{[1-Fs(z)]}{[1-Ps(z)]}\frac{[1-Fl(z)]}{[1-Pl(z)]}Q(z).\end{aligned}$$

This proves that the nested two-stage NFC codec structure 4000 in FIG. 4 indeed performs both short-term and long-term noise spectral shaping, in addition to short-term and long-term prediction.

One advantage of nested two-stage NFC structure 4000 as shown in FIG. 4 is that it completely decouples long-term noise feedback coding from short-term noise feedback coding. This allows us to use different codec structures for long-term NFC and short-term NFC, as the following examples illustrate.

3. Fifth Codec Embodiment—Two Stage Prediction with Two Stage Noise Feedback (Nested Two Stage Feedback Coding)

Due to the above mentioned "decoupling" between the long-term and short-term noise feedback coding, predictive quantizer Q" (4008) of codec 4000 in FIG. 4 can be replaced by codec 2000 in FIG. 2, thus constructing another example nested two-stage NFC structure 5000, depicted in FIG. 5 and described below.

FIG. 5 is a block diagram of a first exemplary arrangement of the example nested two-stage NFC structure or codec 5000, according to a fifth embodiment of the present invention. Codec 5000 includes the following functional elements: a first short-term predictor 5002 (also referred to as a short-term predictor Ps(z)); a first combiner or adder 5004; a second combiner or adder 5006; a predictive quantizer 5008 (also referred to as a predictive quantizer Q'''); a third combiner or adder 5010; a second short-term predictor 5012 (also referred to as a short-term predictor Ps(z)); a fourth combiner 5014; and a short-term noise feedback filter 5016 (also referred to as a short-term noise feedback filter Fs(z)).

Predictive quantizer Q''' (5008) includes a first combiner 5024, a second combiner 5026, either a scalar or a vector quantizer 5028, a third combiner 5030, a long-term predictor 5034 (also referred to as a long-term predictor (Pl(z)), a fourth combiner 5036, and a long-term filter 5038 (also referred to as a long-term filter Nl(z)−1).

Codec 5000 encodes a sampled input speech signal s(n) to produce a coded speech signal, and then decodes the coded speech signal to produce a reconstructed output speech signal sq(n), representative of the input speech signal s(n). Reconstructed speech signal sq(n) is associated with an overall coding noise r(n)=s(n)−sq(n). In coding input speech signal s(n), predictors 5002 and 5012, combiners 5004, 5006, and 5010, and noise filter 5016 operate similarly to corresponding elements described above in connection with FIG. 3 having reference numerals decreased by "2000". Therefore, NF codec 5000 includes an outer or first stage NF loop comprising combiner 5014, short-term noise filter 5016, and combiner 5006. This outer NF loop spectrally shapes the coding noise associated with codec 5000 according to filter 5016, to follow, for example, the short-term spectral characteristics of input speech signal s(n).

Predictive quantizer 5008 has a structure similar to the structure of NF codec 2000 described above in connection with FIG. 2. Predictive quantizer Q''' (5008) operates within the outer NF loop mentioned above to predictively quantize a predictive quantizer input signal v(n) to produce a predictively quantized output signal vq(n) (also referred to as predicted quantizer output signal vq(n)) in the following exemplary manner. Predictor 5034 long-term predicts input signal v(n) based on output signal vq(n), to produce a predicted signal pv(n) (i.e., representing a prediction of signal v(n)). Combiners 5026 and 5024 collectively combine signal pv(n) with a noise feedback signal fq(n) and with input signal v(n) to produce a quantizer input signal u(n). Quantizer 5028 quantizes input signal u(n) to produce a quantized output signal uq(n) (also referred to as a quantizer output signal uq(n)) associated with a quantization error or noise signal q(n). Combiner 5036 combines (i.e., differences) signals u(n) and uq(n) to produce the quantization noise signal q(n). Filter 5038 long-term filters the noise signal q(n) to produce feedback noise signal fq(n). Therefore, combiner 5036, long-term filter 5038 and combiners 5026 and 5024 form an inner or second stage NF loop nested within the outer NF loop. This inner NF loop spectrally shapes the coding noise associated with codec 5000 in accordance with filter 5038, to follow, for example, the long-term spectral characteristics of input speech signal s(n).

In a second exemplary arrangement of NF codec 5000, predictors 5002, 5012 are long-term predictors and NF filter 5016 is a long-term noise filter (to spectrally shape the coding noise to follow, for example, the long-term characteristic of the input speech signal s(n)), while predictor 5034 is a short-term predictor and noise filter 5038 is a short-term noise filter (to spectrally shape the coding noise to follow, for example, the short-term characteristic of the input speech signal s(n)).

FIG. 5A is a block diagram of an alternative but mathematically equivalent signal combining arrangement 5050 corresponding to the combining arrangement including combiners 5024 and 5026 of FIG. 5. Combining arrangement 5050 includes a first combiner 5024' and a second combiner 5026'. Combiner 5024' receives predictive quantizer input signal v(n) and predicted signal pv(n) directly from predictor 5034. Combiner 5024' combines these two signals to produce an intermediate signal i(n)'. Combiner 5026' receives intermediate signal i(n)' and feedback noise signal fq(n) directly from noise filter 5038. Combiner 5026' combines these two received signals to produce quantizer input signal u(n). Therefore, equivalent combining arrangement 5050 is similar to the combining arrangement including combiners 5024 and 5026 of FIG. 5.

4. Sixth Codec Embodiment—Two Stage Prediction with Two Stage Noise Feedback (Nested Two Stage Feedback Coding)

In a further example, the outer layer NFC structure in FIG. 5 (i.e., all of the functional blocks outside of predictive quantizer Q''' (5008)) can be replaced by the NFC structure 2000 in FIG. 2, thereby constructing a further codec structure 6000, depicted in FIG. 6 and described below.

FIG. 6 is a block diagram of a first exemplary arrangement of the example nested two-stage NF coding structure or codec 6000, according to a sixth embodiment of the present invention. Codec 6000 includes the following functional elements: a first combiner 6004; a second combiner 6006; predictive quantizer Q''' (5008) described above in connection with FIG. 5; a third combiner or adder 6010; a short-term predictor 6012 (also referred to as a short-term predictor Ps(z)); a fourth combiner 6014; and a short-term noise feedback filter 6016 (also referred to as a short-term noise feedback filter Ns(z)−1).

Codec 6000 encodes a sampled input speech signal s(n) to produce a coded speech signal, and then decodes the coded speech signal to produce a reconstructed output speech signal sq(n), representative of the input speech signal s(n). Reconstructed speech signal sq(n) is associated with an overall coding noise r(n)−s(n)−sq(n). In coding input speech signal s(n), an outer coding structure depicted in FIG. 6, including combiners 6004, 6006, and 6010, noise filter 6016, and predictor 6012, operates in a manner similar to corresponding codec elements of codec 2000 described above in connection with FIG. 2 having reference numbers decreased by "4000." A combining arrangement including combiners 6004 and 6006 can be replaced by an equivalent combining arrangement similar to combining arrangement 5050 discussed in connection with FIG. 5A, whereby a combiner 6004' (not shown) combines signals s(n) and ps(n)' to produce a residual signal d(n) (not shown), and then a combiner 6006' (also not shown) combines signals d(n) and fqs(n) to produce signal v(n).

Unlike codec 2000, codec 6000 includes a predictive quantizer equivalent to predictive quantizer 5008 (described above in connection with FIG. 5, and depicted in FIG. 6 for descriptive convenience) to predictively quantize a predictive quantizer input signal v(n) to produce a quantized output signal vq(n). Accordingly, codec 6000 also includes a first stage or outer noise feedback loop to spectrally shape the coding noise to follow, for example, the short-term characteristic of the input speech signal s(n), and a second stage or inner noise feedback loop nested within the outer loop to spectrally shape the coding noise to follow, for example, the long-term characteristic of the input speech signal.

In a second exemplary arrangement of NF codec 6000, predictor 6012 is a long-term predictor and NF filter 6016 is a long-term noise filter, while predictor 5034 is a short-term predictor and noise filter 5038 is a short-term noise filter.

There is an advantage for such a flexibility to mix and match different single-stage NFC structures in different parts of the nested two-stage NFC structure. For example, although the codec 5000 in FIG. 5 mixes two different types of single-stage NFC structures in the two nested layers, it is actually the preferred embodiment of the current invention, because it has the lowest complexity among the three systems 4000, 5000, and 6000, respectively shown in FIGS. 4, 5 and 6.

To see the codec 5000 in FIG. 5 has the lowest complexity, consider the inner layer involving long-term NFC first. To get better long-term prediction performance, we normally use a three-tap pitch predictor of the kind used by Atal and Schroeder in their 1979 paper, rather than a simpler one-tap pitch predictor. With Fl(z)=Pl(z/β), the long-term NFC structure inside the Q" dashed box has three long-term filters, each with three taps. In contract, by choosing the harmonic noise spectral shape to be the same as the frequency response of $$N(z)=1+\lambda z^{-p},$$

we have only a three-tap filter Pl(z) (5034) and a one-tap filter (5038) $N(z)-1=\lambda z^{-p}$ in the long-term NFC structure inside the Q'" dashed box (5008) of FIG. 5. Therefore, the inner layer Q'" (5008) of FIG. 5 has a lower complexity than the inner layer Q" (4008) of FIG. 4.

Now consider the short-term NFC structure in the outer layer of codec 5000 in FIG. 5. The short-term synthesis filter (including predictor 5012) to the right of the Q'" dashed box (5008) does not need to be implemented in the encoder (and all three decoders corresponding to FIGS. 4–6 need to implement it). The short-term analysis filter (including predictor 5002) to the left of the symbol d(n) needs to be implemented anyway even in FIG. 6 (although not shown there), because we are using d(n) to derive a weighted speech signal, which is then used for pitch estimation. Therefore, comparing the rest of the outer layer, FIG. 5 has only one short-term filter Fs(z) (5016) to implement, while FIG. 6 has two short-term filters. Thus, the outer layer of FIG. 5 has a lower complexity than the outer layer of FIG. 6.

5. Coding Method

Figure 6A:
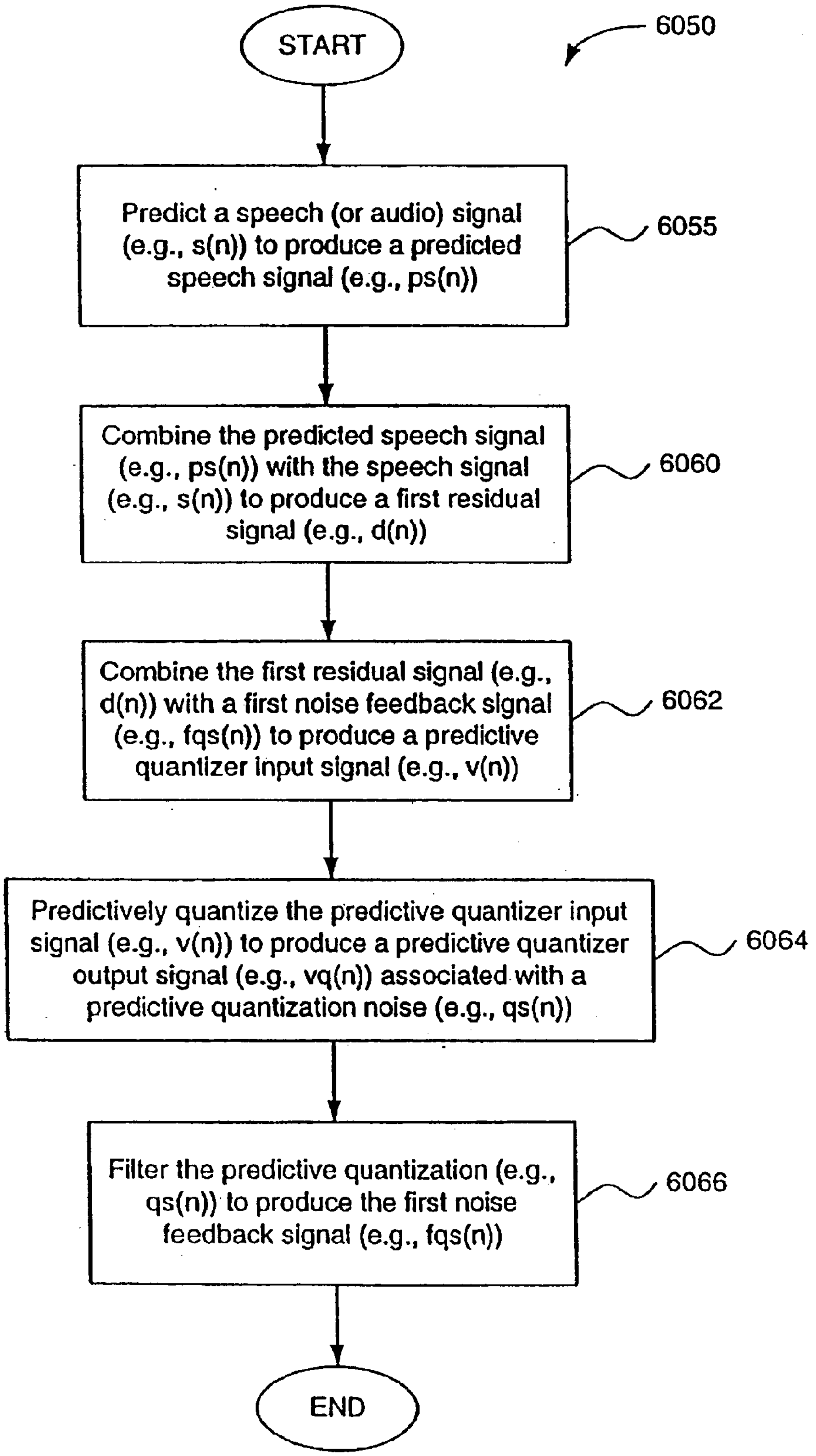
FIG. 6A is an example method of coding a speech or audio signal using any one of the codecs of FIGS. 3–6.

FIG. 6A is an example method 6050 of coding a speech or audio signal using any one of the example codecs 3000, 4000, 5000, and 6000 described above. In a first step 6055, a predictor (e.g., 3002 in FIG. 3, 4002 in FIG. 4, 5002 in FIG. 5, or 6012 in FIG. 6) predicts an input speech or audio signal (e.g., s(n)) to produce a predicted speech signal (e.g., ps(n) or ps(n)').

In a next step 6060, a combiner (e.g., 3004, 4004, 5004, 6004/6006 or equivalents thereof) combines the predicted speech signal (e.g., ps(n)) with the speech signal (e.g., s(n)) to produce a first residual signal (e.g., d(n)).

In a next step 6062, a combiner (e.g., 3006, 4006, 5006, 6004/6006 or equivalents thereof) combines a first noise feedback signal (e.g., fqs(n)) with the first residual signal (e.g., d(n)) to produce a predictive quantizer input signal (e.g., v(n)).

In a next step 6064, a predictive quantizer (e.g., Q', Q", or Q'") predictively quantizes the predictive quantizer input signal (e.g., v(n)) to produce a predictive quantizer output signal (e.g., vq(n)) associated with a predictive quantization noise (e.g., qs(n)).

In a next step 6066, a filter (e.g., 3016, 4016, or 5016) filters the predictive quantization noise (e.g., qs(n)) to produce the first noise feedback signal (e.g., fqs(n)).

Figure 6B:
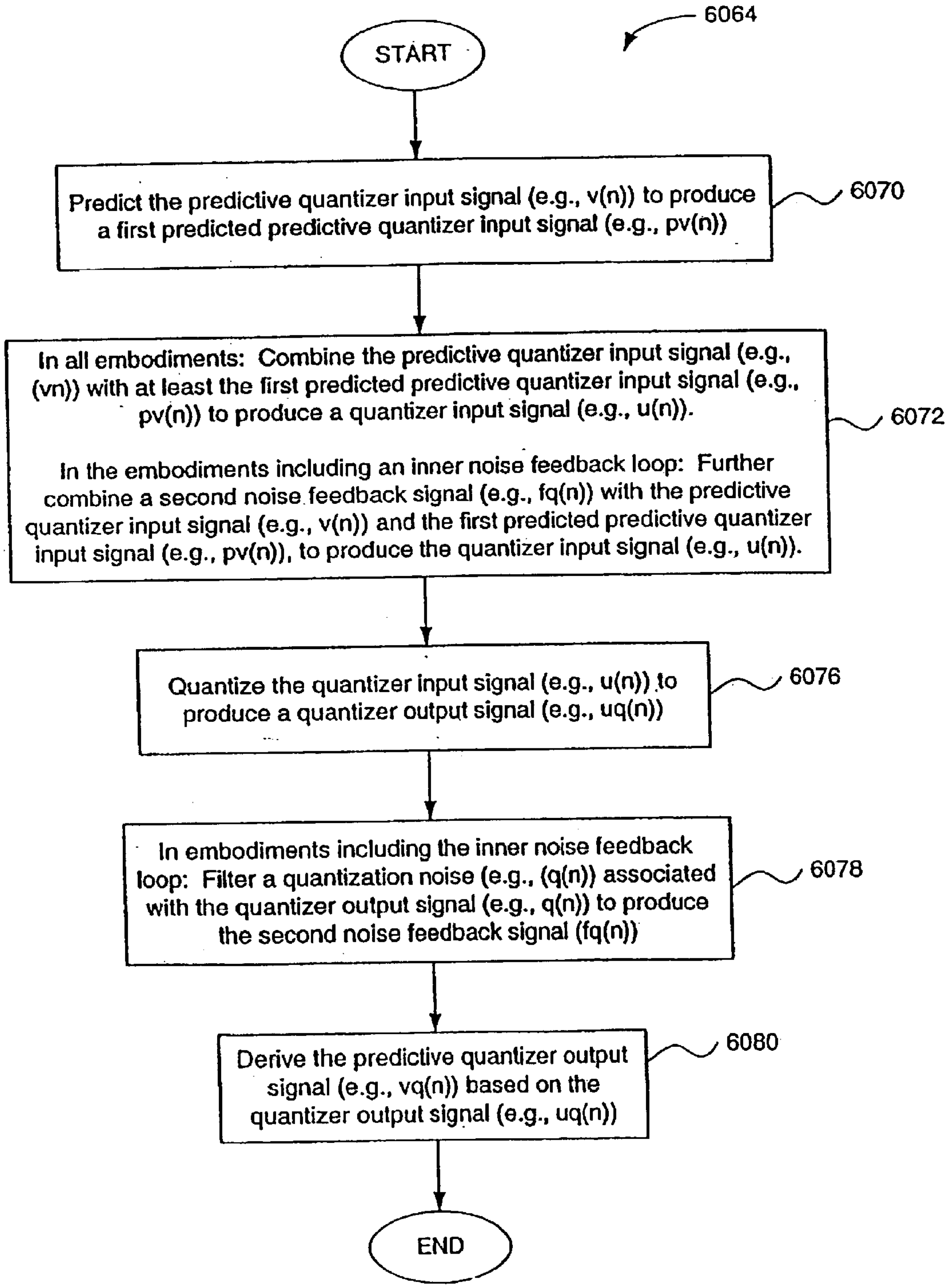
FIG. 6B is a detailed method corresponding to a predictive quantizing step of FIG. 6A.

FIG. 6B is a detailed method corresponding to predictive quantizing step 6064 described above. In a first step 6070, a predictor (e.g., 3034, 4022, or 5034) predicts the predictive quantizer input signal (e.g., v(n)) to produce a predicted predictive quantizer input signal (e.g., pv(n)).

In a next step 6072 used in all of the codecs 3000–6000, a combiner (e.g., 3024, 4024, 5024/5026 or an equivalent thereof, such as 5024') combines at least the predictive quantizer input signal (e.g., v(n)) with at least the first predicted predictive quantizer input signal (e.g., pv(n)) to produce a quantizer input signal (e.g., u(n)).

Additionally, the codec embodiments including an inner noise feedback loop (that is, exemplary codecs 4000, 5000, and 6000) use further combining logic (e.g., combiners 5026/5026' or 4026 or equivalents thereof)) to further combine a second noise feedback signal (e.g., fq(n)) with the predictive quantizer input signal (e.g., v(n)) and the first predicted predictive quantizer input signal (e.g., pv(n)), to produce the quantizer input signal (e.g., u(n)).

In a next step 6076, a scalar or vector quantizer (e.g., 3028, 4028, or 5028) quantizes the input signal (e.g., u(n)) to produce a quantizer output signal (e.g., uq(n)).

In a next step 6078 applying only to those embodiments including the inner noise feedback loop, a filter (e.g., 4038 or 5038) filters a quantization noise (e.g., q(n)) associated with the quantizer output signal (e.g., q(n)) to produce the second noise feedback signal (fq(n)).

In a next step 6080, deriving logic (e.g., 3034 and 3030 in FIG. 3, 4034 and 4030 in FIG. 4, and 5034 and 5030 in FIG. 5) derives the predictive quantizer output signal (e.g., vq(n)) based on the quantizer output signal (e.g., uq(n)).

II. Overview of Preferred Embodiment (Based on the Fifth Embodiment Above)

We now describe our preferred embodiment of the present invention. FIG. 7 shows an example encoder 7000 of the preferred embodiment. FIG. 8 shows the corresponding decoder. As can be seen, the encoder structure 7000 in FIG. 7 is based on the structure of codec 5000 in FIG. 5. The short-term synthesis filter (including predictor 5012) in FIG. 5 does not need to be implemented in FIG. 7, since its output is not used by encoder 7000. Compared with FIG. 5, only three additional functional blocks (10, 20, and 95) are added near the top of FIG. 7. These functional blocks (also singularly and collectively referred to as "parameter deriving logic") adaptively analyze and quantize (and thereby derive) the coefficients of the short-term and long-term filters. FIG. 7 also explicitly shows the different quantizer indices that are multiplexed for transmission to the communication channel. The decoder in FIG. 8 is essentially the same as the decoder of most other modern predictive codecs such as MPLPC and CELP. No postfilter is used in the decoder.

Coder 7000 and coder 5000 of FIG. 5 have the following corresponding functional blocks: predictors 5002 and 5034 in FIG. 5 respectively correspond to predictors 40 and 60 in FIG. 7; combiners 5004, 5006, 5014, 5024, 5026, 5030 and 5036 in FIG. 5 respectively correspond to combiners 45, 55, 90, 75, 70, 85 and 80 in FIG. 7; filters 5016 and 5038 in FIG. 5 respectively correspond to filters 50 and 65 in FIG. 7; quantizer 5028 in FIG. 5 corresponds to quantizer 30 in FIG. 7; signals vq(n), pv(n), fqs(n), and fq(n) in FIG. 5 respectively correspond to signals dq(n), ppv(n), stnf(n), and ltnf(n) in FIG. 7; signals sharing the same reference labels in FIG. 5 and FIG. 7 also correspond to each other. Accordingly, the operation of codec 5000 described above in connection with FIG. 5 correspondingly applies to codec 7000 of FIG. 7.

IV. Short-Term Linear Predictive Analysis and Quantization

We now give a detailed description of the encoder operations. Refer to FIG. 7. The input signal s(n) is buffered at block 10, which performs short-term linear predictive analysis and quantization to obtain the coefficients for the short-term predictor 40 and the short-term noise feedback filter 50. This block 10 is further expanded in FIG. 9. The processing blocks within FIG. 9 all employ well-known prior-art techniques.

Refer to FIG. 9. The input signal s(n) is buffered at block 11, where it is multiplied by an analysis window that is 20 ms in length. If the coding delay is not critical, then a frame size of 20 ms and a sub-frame size of 5 ms can be used, and the analysis window can be a symmetric window centered at the mid-point of the last sub-frame in the current frame. In our preferred embodiment of the codec, however, we want the coding delay to be as small as possible; therefore, the frame size and the sub-frame size are both selected to be 5 ms, and no look ahead is allowed beyond the current frame. In this case, an asymmetric window is used. The "left window" is 17.5 ms long, and the "right window" is 2.5 ins long. The two parts of the window concatenate to give a total window length of 20 ms. Let LWINSZ be the number of samples in the left window (LWINSZ=140 for 8 kHz sampling and 280 for 16 kHz sampling), then the left window is given by $$wl(n) = \frac{1}{2}\left[1 - \cos\left(\frac{n\pi}{LWINSZ+1}\right)\right], n = 1, 2, \ldots , LWINSZ.$$

Let RWINSZ be the number of samples in the right window. Then, RWINSZ=20 for 8 kHz sampling and 40 for 16 kHz sampling. The right window is given by $$wr(n) = \cos\left(\frac{(n-1)\pi}{2RWINSZ}\right), n = 1, 2, \ldots , RWINSZ.$$

The concatenation of wl(n) and wr(n) gives the 20 ms asymmetric analysis window. When applying this analysis window, the last sample of the window is lined up with the last sample of the current frame, so there is no look ahead.

After the 5 ms current frame of input signal and the preceding 15 ms of input signal in the previous three frames are multiplied by the 20 ms window, the resulting signal is used to calculate the autocorrelation coefficients r(i), for lags i=0, 1, 2, . . . , M, where M is the short-term predictor order, and is chosen to be 8 for both 8 kHz and 16 kHz sampled signals.

The calculated autocorrelation coefficients are passed to block 12, which applies a Gaussian window to the autocorrelation coefficients to perform the well-known prior-art method of spectral smoothing. The Gaussian window function is given by $$gw(i) = e^{-\frac{(2\pi i\sigma/f_s)^2}{2}}, i = 0, 1, 2, \ldots , M,$$

where $f_s$ is the sampling rate of the input signal, expressed in Hz, and σ is 40 Hz.

After multiplying r(i) by such a Gaussian window, block 12 then multiplies r(0) by a white noise correction factor of WNCF=1+ϵ, where ϵ=0.0001. In summary, the output of block 12 is given by $$\hat{r}(i) = \begin{cases} (1+\varepsilon)r(0), & i = 0 \\ gw(i)r(i), & i = 1, 2, \ldots , M \end{cases}$$

The spectral smoothing technique smoothes out (widens) sharp resonance peaks in the frequency response of the short-term synthesis filter. The white noise correction adds a white noise floor to limit the spectral dynamic range. Both techniques help to reduce ill conditioning in the Levinson-Durbin recursion of block 13.

Block 13 takes the autocorrelation coefficients modified by block 12, and performs the well-known prior-art method of Levinson-Durbin recursion to convert the autocorrelation coefficients to the short-term predictor coefficients $\hat{a}_i$, i=0, 1, . . . , M. Block 14 performs bandwidth expansion of the resonance spectral peaks by modifying $\hat{a}_i$ as $$a_i = \gamma^i \hat{a}_i,$$

for i=0, 1, . . . , M. In our particular implementation, the parameter γ is chosen as 0.96852.

Block 15 converts the $\{a_i\}$ coefficients to Line Spectrum Pair (LSP) coefficients $\{l_i\}$, which are sometimes also referred to as Line Spectrum Frequencies (LSFs). Again, the operation of block 15 is a well-known prior-art procedure.

Block 16 quantizes and encodes the M LSP coefficients to a pre-determined number of bits. The output LSP quantizer index array LSPI is passed to the bit multiplexer (block 95), while the quantized LSP coefficients are passed to block 17. Many different kinds of LSP quantizers can be used in block 16. In our preferred embodiment, the quantization of LSP is based on inter-frame moving-average (MA) prediction and multi-stage vector quantization, similar to (but not the same as) the LSP quantizer used in the ITU-T Recommendation G.729.

Block 16 is further expanded in FIG. 10. Except for the LSP quantizer index array LSPI, all other signal paths in FIG. 10 are for vectors of dimension M. Block 161 uses the unquantized LSP coefficient vector to calculate the weights to be used later in VQ codebook search with weighted mean-square error (WMSE) distortion criterion. The weights are determined as $$w_i = \begin{cases} 1/(l_2 - l_1), & i = 1 \\ 1/\min(l_i - l_{i-1}, l_{i+1} - l_i), & 1 < i < M \\ 1/(l_M - l_{M-1}), & i = M. \end{cases}$$

Basically, the i-th weight is the inverse of the distance between the i-th LSP coefficient and its nearest neighbor LSP coefficient. These weights are different from those used in G.729.

Block 162 stores the long-term mean value of each of the M LSP coefficients, calculated off-line during codec design phase using a large training data file. Adder 163 subtracts the LSP mean vector from the unquantized LSP coefficient vector to get the mean-removed version of it.

Block 164 is the inter-frame MA predictor for the LSP vector. In our preferred embodiment, the order of this MA predictor is 8. The 8 predictor coefficients are fixed and pre-designed off-line using a large training data file. With a frame size of 5 ms, this $8^{th}$-order predictor covers a time span of 40 ms, the same as the time span covered by the $4^{th}$-order MA predictor of LSP used in G.729, which has a frame size of 10 ms.

Block 164 multiplies the 8 output vectors of the vector quantizer block 166 in the previous 8 frames by the 8 sets of 8 fixed MA predictor coefficients and sum up the result. The resulting weighted sum is the predicted vector, which is subtracted from the mean-removed unquantized LSP vector by adder 165. The two-stage vector quantizer block 166 then quantizes the resulting prediction error vector.

The first-stage VQ inside block 166 uses a 7-bit codebook (128 codevectors). For the narrowband (8 kHz sampling)

codec at 16 kb/s, the second-stage VQ also uses a 7-bit codebook. This gives a total encoding rate of 14 bits/frame for the 8 LSP coefficients of the 16 kb/s narrowband codec. For the wideband (16 kHz sampling) codec at 32 kb/s, on the other hand, the second-stage VQ is a split VQ with a 3–5 split. The first three elements of the error vector of first-stage VQ are vector quantized using a 5-bit codebook, and the remaining 5 elements are vector quantized using another 5-bit codebook. This gives a total of (7+5+5)=17 bits/frame encoding rate for the 8 LSP-coefficients of the 32 kb/s wideband codec. The selected codevectors from the two VQ stages are added together to give the final output quantized vector of block 166.

During codebook searches, both stages of VQ within block 166 use the WMSE distortion measure with the weights $\{w_i\}$ calculated by block 161. The codebook indices for the best matches in the two VQ stages (two indices for 16 kb/s narrowband codec and three indices for 32 kb/s wideband codec) form the output LSP index array LSPI, which is passed to the bit multiplexer block 95 in FIG. 7.

The output vector of block 166 is used to update the memory of the inter-frame LSP predictor block 164. The predicted vector generated by block 164 and the LSP mean vector held by block 162 are added to the output vector of block 166, by adders 167 and 168, respectively. The output of adder 168 is the quantized and mean-restored LSP vector.

It is well known in the art that the LSP coefficients need to be in a monotonically ascending order for the resulting synthesis filter to be stable. The quantization performed in FIG. 10 may occasionally reverse the order of some of the adjacent LSP coefficients. Block 169 check for correct ordering in the quantized LSP coefficients, and restore correct ordering if necessary. The output of block 169 is the final set of quantized LSP coefficients $\{\tilde{l}_i\}$.

Now refer back to FIG. 9. The quantized set of LSP coefficients $\{\tilde{l}_i\}$ which is determined once a frame, is used by block 17 to perform linear interpolation of LSP coefficients for each sub-frame within the current frame. In a general coding scheme based on the current invention, there may be two or more sub-frames per frame. For example, the sub-frame size can stay at 5 ms, while the frame size can be 10 ms or 20 ms. In this case, the linear interpolation of LSP coefficients is a well-known prior art. In the preferred embodiment of the current invention, to keep the coding delay low, the frame size is chosen to be 5 ms, the same as the sub-frame size. In this degenerate case, block 17 can be omitted. This is why it is shown in dashed box.

Block 18 takes the set of interpolated LSP coefficients $\{l'_i\}$ and converts it to the corresponding set of direct-form linear predictor coefficients $\{\tilde{a}_i\}$ for each sub-frame. Again, such a conversion from LSP coefficients to predictor coefficients is well known in the art. The resulting set of predictor coefficients $\{\tilde{a}_i\}$ are used to update the coefficients of the short-term predictor block 40 in FIG. 7.

Block 19 performs further bandwidth expansion on the set of predictor coefficients $\{\tilde{a}_i\}$ using a bandwidth expansion factor of $\gamma_I$=0.75. The resulting bandwidth-expanded set of filter coefficients is given by $$a'_i=\gamma_I^i\tilde{a}_i, \text{ for } i=0, 1, 2, \ldots, M.$$

This bandwidth-expanded set of filter coefficients $\{a_i'\}$ are used to update the coefficients of the short-term noise feedback filter block 50 in FIG. 7 and the coefficients of the weighted short-term synthesis filter block 21 in FIG. 11 (to be discussed later). This completes the description of short-term predictive analysis and quantization block 10 in FIG. 7.

V. Short-Term Linear Prediction of Input Signal

Now refer to FIG. 7 again. Except for block 10 and block 95, whose operations are performed once a frame, the operations of most of the rest of the blocks in FIG. 7 are performed once a sub-frame, unless otherwise noted. The short-term predictor block 40 predicts the input signal sample s(n) based on a linear combination of the preceding M samples. The adder 45 subtracts the resulting predicted value from s(n) to obtain the short-term prediction residual signal, or the difference signal, d(n). Specifically, $$d(n) = s(n) - \sum_{i=1}^{M} \tilde{a}_i s(n-i).$$

VI. Long-Term Linear Predictive Analysis and Quantization

The long-term predictive analysis and quantization block 20 uses the short-term prediction residual signal {d(n)} of the current sub-frame and its quantized version {dq(n)} in the previous sub-frames to determine the quantized values of the pitch period and the pitch predictor taps. This block 20 is further expanded in FIG. 11.

Now refer to FIG. 11. The short-term prediction residual signal d(n) passes through the weighted short-term synthesis filter block 21, whose output is calculated as $$dw(n) = d(n) + \sum_{i=1}^{M} a_i' dw(n-i)$$

The signal dw(n) is basically a perceptually weighted version of the input signal s(n), just like what is done in CELP codecs. This dw(n) signal is passed through a low-pass filter block 22, which has a −3 dB cut off frequency at about 800 Hz. In the preferred embodiment, a $4^{th}$-order elliptic filter is used for this purpose. Block 23 down-samples the low-pass filtered signal to a sampling rate of 2 kHz. This represents a 4:1 decimation for the 16 kb/s narrowband codec or 8:1 decimation for the 32 kb/s wide-band codec.

The first-stage pitch search block 24 then uses the decimated 2 kHz sampled signal dwd(n) to find a "coarse pitch period", denoted as cpp in FIG. 11. A pitch analysis window of 10 ms is used. The end of the pitch analysis window is lined up with the end of the current sub-frame. At a sampling rate of 2 kHz, 10 ms correspond to 20 samples. Without loss of generality, let the index range of n=1 to n=20 correspond to the pitch analysis window for dwd(n). Block 24 first calculates the following correlation function and energy values $$c(k) = \sum_{n=1}^{20} dwd(n)dwd(n-k)$$

$$E(k) = \sum_{n=1}^{20} dwd(n-k)^2$$

for k=MINPPD−1 to k=MAXPPD 1, where MINPPD and MAXPPD are the minimum and maximum pitch period in the decimated domain, respectively.

For the narrowband codec, MINPPD=4 samples and MAXPPD=36 samples. For the wideband codec, MINPPD=2 samples and MAXPPD=34 samples. Block 24 then searches through the calculated {c(k)} array and identifies all positive local peaks in the {c(k)} sequence. Let $K_p$ denote the resulting set of indices $k_p$ where $c(k_p)$ is a positive local peak, and let the elements in $K_p$ be arranged in an ascending order.

If there is no positive local peak at all in the {c(k)} sequence, the processing of block 24 is terminated and the output coarse pitch period is set to cpp=MINPPD. If there is at least one positive local peak, then the block 24 searches through the indices in the set $K_p$ and identifies the index $k_p$ that maximizes $c(k_p)^2/E(k_p)$. Let the resulting index be $k^*_p$.

To avoid picking a coarse pitch period that is around an integer multiple of the true coarse pitch period, the following simple decision logic is used.

1. If $k^*_p$ corresponds to the first positive local peak (i.e. it is the first element of $K_p$), use $k^*_p$ as the final output cpp of block 24 and skip the rest of the steps.

2. Otherwise, go from the first element of $K_p$ to the element of $K_p$ that is just before the element $k^*_p$, find the first $k_p$ in $K_p$ that satisfies $c(k_p)^2/E(k_p)>T_l[c(k^*_p)^2/E(k^*_p)]$ where $T_l$=0.7. The first $k_p$ that satisfies this condition is the final output cpp of block 24.

3. If none of the elements of $K_p$ before $k^*_p$ satisfies the inequality in 2. above, find the first $k_p$ in $K_p$ that satisfies the following two conditions:

$c(k_p)^2/E(k_p)>T_2[c(k^*_p)^2/E(k^*_p)]$, where $T_2$=0.39, and $|k_p-cpp|\leqq T_3\, cpp'$, where $T_3$=0.25, and cpp' is the block 24 output cpp for the last sub-frame.

The first $k_p$ that satisfies these two conditions is the final output cpp of block 24.

4. If none of the elements of $K_p$ before $k^*_p$ satisfies the inequalities in 3. above, then use $k^*_p$ as the final output cpp of block 24.

Block 25 takes cpp as its input and performs a second-stage pitch period search in the undecimated signal domain to get a refined pitch period pp. Block 25 first converts the coarse pitch period cpp to the undecimated signal domain by multiplying it by the decimation factor DECF. (This decimation factor DECF=4 and 8 for narrowband and wideband codecs, respectively). Then, it determines a search range for the refined pitch period around the value cpp*DECF. The lower bound of the search range is lb=max(MINPP, cpp*DECF−DECF+1), where MINPP=17 samples is the minimum pitch period. The upper bound of the search range is ub=min(MAXPP, cpp*DECF+DECF 1), where MAXPP is the maximum pitch period, which is 144 and 272 samples for narrowband and wideband codecs, respectively.

Block 25 maintains a signal buffer with a total of MAXPP+1+SFRSZ samples, where SFRSZ is the sub-frame size, which is 40 and 80 samples for narrowband and wideband codecs, respectively. The last SFRSZ samples of this buffer are populated with the open-loop short-term prediction residual signal d(n) in the current sub-frame. The first MAXPP+1 samples are populated with the MAXPP+1 samples of quantized version of d(n), denoted as dq(n), immediately preceding the current sub-frame. For convenience of equation writing later, we will use dq(n) to denote the entire buffer of MAXPP+1+SFRSZ samples, even though the last SFRSZ samples are really d(n) samples. Again, without loss of generality, let the index range from n=1 to n=SFRSZ denotes the samples in the current sub-frame.

After the lower bound lb and upper bound ub of the pitch period search range are determined, block 25 calculates the following correlation and energy terms in the undecimated dq(n) signal domain for time lags k within the search range [lb, ub].

$$\tilde{c}(k)=\sum_{n=1}^{SFRSZ} dq(n)dq(n-k)$$

$$\tilde{E}(k)=\sum_{n=1}^{SFRSZ} dq(n-k)^2$$

The time lag k∈[lb,ub] that maximizes the ratio $\tilde{c}^2(k)/\tilde{E}(k)$ is chosen as the final refined pitch period. That is, $$pp=\max_{k\in[lb,ub]}{}^{-1}\left[\frac{\tilde{c}^2(k)}{\tilde{E}(k)}\right].$$

Once the refined pitch period pp is determined, it is encoded into the corresponding output pitch period index PPI, calculated as $$PPI=pp-17$$

Possible values of PPI are 0 to 127 for the narrowband codec and 0 to 255 for the wideband codec. Therefore, the refined pitch period pp is encoded into 7 bits or 8 bits, without any distortion.

Block 25 also calculates pptl, the optimal tap weight for a single-tap itch predictor, as follows $$pptl=\frac{\tilde{c}(pp)}{\tilde{E}(pp)}.$$

Block 27 calculates the long-term noise feedback filter coefficient λ as follows.

$$\lambda=\begin{cases} LTWF, & pptl\geq 1 \\ LTWF*pptl, & 0<pptl<1 \\ 0 & pptl\leq 0 \end{cases}$$

Pitch predictor taps quantizer block 26 quantizes the three pitch predictor taps to 5 bits using vector quantization. Rather than minimizing the mean-square error of the three taps as in conventional VQ codebook search, block 26 finds from the VQ codebook the set of candidate pitch predictor taps that minimizes the pitch prediction residual energy in the current sub-frame. Using the same dq(n) buffer and time index convention as in block 25, and denoting the set of three taps corresponding to the j-th codevector as $\{b_{j1}, b_{j2}, b_{j3}\}$, we can express such pitch prediction residual energy as $$E_j=\sum_{n=1}^{SFRSZ}\left[dq(n)-\sum_{i=1}^{3} b_{ji}dq(n-pp+2-i)\right]^2.$$

This equation can be re-written as $$E_j=\sum_{n=1}^{SFRSZ} dq^2(n)-p^T x_j,$$

where $$x_j=[2b_{j1},2b_{j2},2b_{j3},-2b_{j1}b_{j2},-2b_{j2}b_{j3},-2b_{j3}b_{j1},-b_{j1}^2,-b_{j2}^2,-b_{j3}^2]^T,$$
$$p^T=[v_1,v_2,v_3,\Phi_{12},\Phi_{23},\Phi_{31},\Phi_{11},\Phi_{22},\Phi_{33}],$$

$$v_i = \sum_{n=1}^{SFRSZ} dq(n)dq(n-pp+2-i),$$

and $$\phi_{ij} = \sum_{n=1}^{SFRSZ} dq(n-pp+2-i)dq(n-pp+2-j).$$

In the codec design stage, the optimal three-tap codebooks $\{b_{j1}, b_{j2}, b_{j3}\}$, j=0, 1, 2, . . . , 31 are designed off-line. The corresponding 9-dimensional codevectors $x_j$, j=0, 1, 2, . . . , 31 are calculated and stored in a codebook. In actual encoding, block 26 first calculates the vector $p^T$, then it calculates the 32 inner products $p^T x_j$ for j=0, 1, 2, . . . , 31. The codebook index j* that maximizes such an inner product also minimizes the pitch prediction residual energy $E_j$. Thus, the output pitch predictor taps index PPTI is chosen as $$PPTI = j^* = \max_j^{-1}(p^T x_j).$$

The corresponding vector of three quantized pitch predictor taps, denoted as ppt in FIG. 11, is obtained by multiplying the first three elements of the selected codevector $x_{j^*}$ by 0.5.

Once the quantized pitch predictor taps have been determined, block 28 calculates the open-loop pitch prediction residual signal e(n) as follows.

$$e(n) = dq(n) - \sum_{i=1}^{3} b_{j^*i} dq(n-pp+2-i)$$

Again, the same dq(n) buffer and time index convention of block 25 is used here. That is, the current sub-frame of dq(n) for n=1, 2, . . . , SFRSZ is actually the unquantized open-loop short-term prediction residual signal d(n).

This completes the description of block 20, long-term predictive analysis and quantization.

VII. Quantization of Residual Gain

The open-loop pitch prediction residual signal e(n) is used to calculate the residual gain. This is done inside the prediction residual quantizer block 30 in FIG. 7. Block 30 is further expanded in FIG. 12.

Refer to FIG. 12. Block 301 calculates the residual gain in the base-2 logarithmic domain. Let the current sub-frame corresponds to time indices from n=1 to n=SFRSZ. For the narrowband codec, the logarithmic gain (log-gain) is calculated once a sub-frame as $$lg = \log_2\left[\frac{1}{SFRSZ}\sum_{n=1}^{SFRSZ} e^2(n)\right].$$

For the wideband codec, on the other hand, two log-gains are calculated for each sub-frame. The first log-gain is calculated as $$lg(1) = \log_2\left[\frac{2}{SFRSZ}\sum_{n=1}^{SFRSZ/2} e^2(n)\right]$$

and the second log-gain is calculated as $$lg(2) = \log_2\left[\frac{2}{SFRSZ}\sum_{n=SFRSZ/2+1}^{SFRSZ} e^2(n)\right].$$

Lacking a better name, we will use the term "gain frame" to refer to the time interval over which a residual gain is calculated. Thus, the gain frame size is SFRSZ for the narrowband codec and SFRSZ/2 for the wideband codec. All the operations in FIG. 12 are done on a once-per-gain-frame basis.

The long-term mean value of the log-gain is calculated off-line and stored in block 302. The adder 303 subtracts this long-term mean value from the output log-gain of block 301 to get the mean-removed version of the log-gain. The MA log-gain predictor block 304 is an FIR filter, with order 8 for the narrowband codec and order 16 for the wideband codec. In either case, the time span covered by the log-gain predictor is 40 ms. The coefficients of this log-gain predictor are pre-determined off-line and held fixed. The adder 305 subtracts the output of block 304, which is the predicted log-gain, from the mean-removed log-gain. The scalar quantizer block 306 quantizes the resulting log-gain prediction residual. The narrowband codec uses a 4-bit quantizer, while the wideband codec uses a 5-bit quantizer here.

The gain quantizer codebook index GI is passed to the bit multiplexer block 95 of FIG. 7. The quantized version of the log-gain prediction residual is passed to block 304 to update the MA log-gain predictor memory. The adder 307 adds the predicted log-gain to the quantized log-gain prediction residual to get the quantized version of the mean-removed log-gain. The adder 308 then adds the log-gain mean value to get the quantized log-gain, denoted as qlg.

Block 309 then converts the quantized log-gain to the quantized residual gain in the linear domain as follows:

$$g = 2^{qlg/2}$$

Block 310 scales the residual quantizer codebook. That is, it multiplies all entries in the residual quantizer codebook by g. The resulting scaled codebook is then used by block 311 to perform residual quantizer codebook search.

The prediction residual quantizer in the current invention of TSNFC can be either a scalar quantizer or a vector quantizer. At a given bit-rate, using a scalar quantizer gives a lower codec complexity at the expense of lower output quality. Conversely, using a vector quantizer improves the output quality but gives a higher codec complexity. A scalar quantizer is a suitable choice for applications that demand very low codec complexity but can tolerate higher bit rates. For other applications that do not require very low codec complexity, a vector quantizer is more suitable since it gives better coding efficiency than a scalar quantizer.

In the next two sections, we describe the prediction residual quantizer codebook search procedures in the current invention, first for the case of scalar quantization in SQ-TSNFC, and then for the case of vector quantization in VQ-TSNFC. The codebook search procedures are very different for the two cases, so they need to be described separately.

VIII. Scalar Quantization of Linear Prediction Residual Signal

If the residual quantizer is a scalar quantizer, the encoder structure of FIG. 7 is directly used as is, and blocks 50 through 90 operate on a sample-by-sample basis. Specifically, the short-term noise feedback filter block 50 of FIG. 7 uses its filter memory to calculate the current sample of the short-term noise feedback signal stnf(n) as follows.

$$stnf(n)=\sum_{i=1}^{M} a_i' qs(n-i)$$

The adder 55 adds stnf(n) to the short-term prediction residual d(n) to get v(n).

$$v(n)=d(n)+stnf(n)$$

Next, using its filter memory, the long-term predictor block 60 calculates the pitch-predicted value as $$ppv(n)=\sum_{i=1}^{3} b_{j^*i} dq(n-pp+2-i),$$

and the long-term noise feedback filter block 65 calculates the long-term noise feedback signal as $$ltnf(n)=\lambda q(n-pp).$$

The adders 70 and 75 together calculates the quantizer input signal u(n) as $$u(n)=v(n)-[ppv(n)+ltnf(n)].$$

Next, Block 311 of FIG. 12 quantizes u(n) by simply performing the codebook search of a conventional scalar quantizer. It takes the current sample of the unquantized signal u(n), find the nearest neighbor from the scaled codebook provided by block 310, passes the corresponding codebook index CI to the bit multiplexer block 95 of FIG. 7, and passes the quantized value uq(n) to the adders 80 and 85 of FIG. 7.

The adder 80 calculates the quantization error of the quantizer block 30 as $$q(n)=u(n)-uq(n)$$

This q(n) sample is passed to block 65 to update the filter memory of the long-term noise feedback filter.

The adder 85 adds ppv(n) to uq(n) to get dq(n), the quantized version of the current sample of the short-term prediction residual.

$$dq(n)=uq(n)+ppv(n)$$

This dq(n) sample is passed to block 60 to update the filter memory of the long-term predictor.

The adder 90 calculates the current sample of qs(n) as $$qs(n)=v(n)-dq(n)$$

and then passes it to block 50 to update the filter memory of the short-term noise feedback filter. This completes the sample-by-sample quantization feedback loop.

We found that for speech signals at least, if the prediction residual scalar quantizer operates at a bit rate of 2 bits/sample or higher, the corresponding SQ-TSNFC codec output has essentially transparent quality.

IX. Vector Quantization of Linear Prediction Residual Signal

If the residual quantizer is a vector quantizer, the encoder structure of FIG. 7 cannot be used directly as is. An alternative approach and alternative structures need to be used. To see this, consider a conventional vector quantizer with a vector dimension K. Normally, an input vector is presented to the vector quantizer, and the vector quantizer searches through all codevectors in its codebook to find the nearest neighbor to the input vector. The winning codevector is the VQ output vector, and the corresponding address of that codevector is the quantizer out codebook index. If such a conventional VQ scheme is to be used with the codec structure in FIG. 7, then we need to determine K samples of the quantizer input u(n) at a time. Determining the first sample of u(n) in the VQ input vector is not a problem, as we have already shown how to do that in the last section. However, the second through the K-th samples of the VQ input vector cannot be determined, because they depend on the first through the (K−1)-th samples of the VQ output vector of the signal uq(n), which have not been determined yet.

The present invention avoids this chicken-and-egg problem by modifying the VQ codebook search procedure, as described below beginning with reference to FIG. 13A.

A. General VQ Search

1. High-Level Embodiment a. System

Figure 13A:
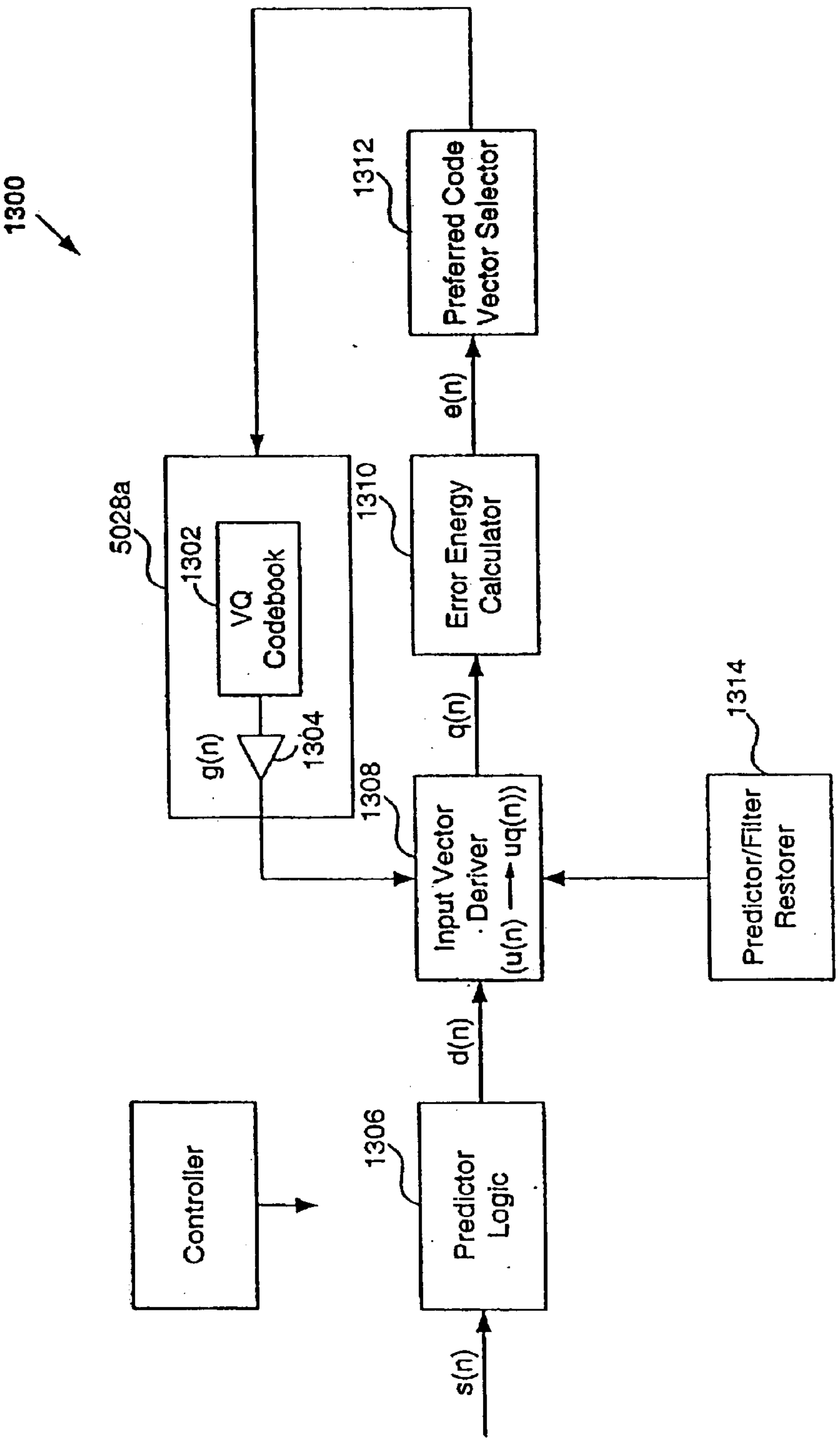
FIG. 13A is a block diagram of an example NFC system for searching through N VQ codevectors stored in a VQ codebook for a preferred one of the N VQ codevectors to be used for coding a speech or audio signal.

FIG. 13A is a block diagram of an example Noise Feedback Coding (NFC) system 1300 for searching through N VQ codevectors, stored in a scaled VQ codebook 5028*a*, for a preferred one of the N VQ codevectors to be used for coding a speech or audio signal s(n). System 1300 includes scaled VQ codebook 5028*a* including a VQ codebook 1302 and a gain scaling unit 1304. Scaled VQ codebook 5028*a* corresponds to quantizer 3028, 4028, 5028, or 30, described above in connection with FIG. 3, 4, 5, or 7, respectively.

VQ codebook 1302 includes N VQ codevectors. VQ codebook 1302 provides each of the N VQ codevectors stored in the codebook to gain scaling unit 1304. Gain scaling unit 1304 scales the codevectors, and provides scaled codevectors to an output of scaled VQ codebook 5028*a*. Symbol g(n) represents the quantized residual gain in the linear domain, as calculated in previous sections. The combination of VQ codebook 1302 and gain scaling unit 1304 (also labeled g(n)) is equivalent to a scaled VQ codebook.

System 1300 further includes predictor logic unit 1306 (also referred to as a predictor 1306), an input vector deriver 1308, an error energy calculator 1310, a preferred codevector selector 1312, and a predictor/filter restorer 1314. Predictor 1306 includes combining and predicting logic. Input vector deriver 1308 includes combining, filtering, and predicting logic, corresponding to such logic used in codecs 3000, 4000, 5000, 6000, and 7000, for example, as will be further described below. The logic used in predictor 1306, input vector deriver 1308, and quantizer 1508*a* operates sample-by-sample in the same manner as described above in connection with codecs 3000–7000. Nevertheless, the VQ systems and methods are described below in terms of performing operations on "vectors" instead of individual samples. A "vector" as used herein refers to a group of samples. It is to be understood that the VQ systems and methods described below process each of the samples in a vector (that is, in a group of samples) one sample at a time. For example, a filter filters an input vector in the following manner: a first sample of the input vector is applied to an input of the filter; the filter processes the first sample of the vector to produce a first sample of an output vector corresponding to the first sample of the input vector; and the process repeats for each of the next sequential samples of the input vector until there are no input vector samples left, whereby the filter sequentially produces each of the next samples of the output vector. The last sample of the output vector to be produced or output by the filter can remain at the filter output such that it is available for processing immediately or at some later sample time (for example, to be combined, or otherwise processed, with a sample associated with another vector). A predictor predicts an input vector in much the same way as the filter processes (that is, filters) the input vector. Therefore, the term "vector" is used herein as a convenience to describe a group of samples to be sequentially processed in accordance with the present invention.

b. Methods

A brief overview of a method of operation of system 1300 is now provided. In the modified VQ codebook search procedure of the current invention implemented using system 1300, we provide one VQ codevector at a time from scaled VQ codebook 5028*a*, perform all predicting, combining, and filtering functions of predictor 1306 and input vector deriving logic 1308 to calculate the corresponding VQ input vector of the signal u(n), and then calculate the energy of the quantization error vector of the signal q(n) using error energy calculator 1310. This process is repeated for N times for the N codevectors in scaled VQ codebook 5028*a*, with the filter memories in input vector deriving logic 1308 reset to their initial values before we repeat the process for each new codevector. After all the N codevectors have been tried, we have calculated N corresponding quantization error energy values of q(n). The VQ codevector that minimizes the energy of the quantization error vector is the winning codevector and is used as the VQ output vector. The address of this winning codevector is the output VQ codebook index CI that is passed to the bit multiplexer block 95.

The bit multiplexer block 95 in FIG. 7 packs the five sets of indices LSPI, PPI, PPTI, GI, and CI into a single bit stream. This bit stream is the output of the encoder. It is passed to the communication channel.

Figure 13B:
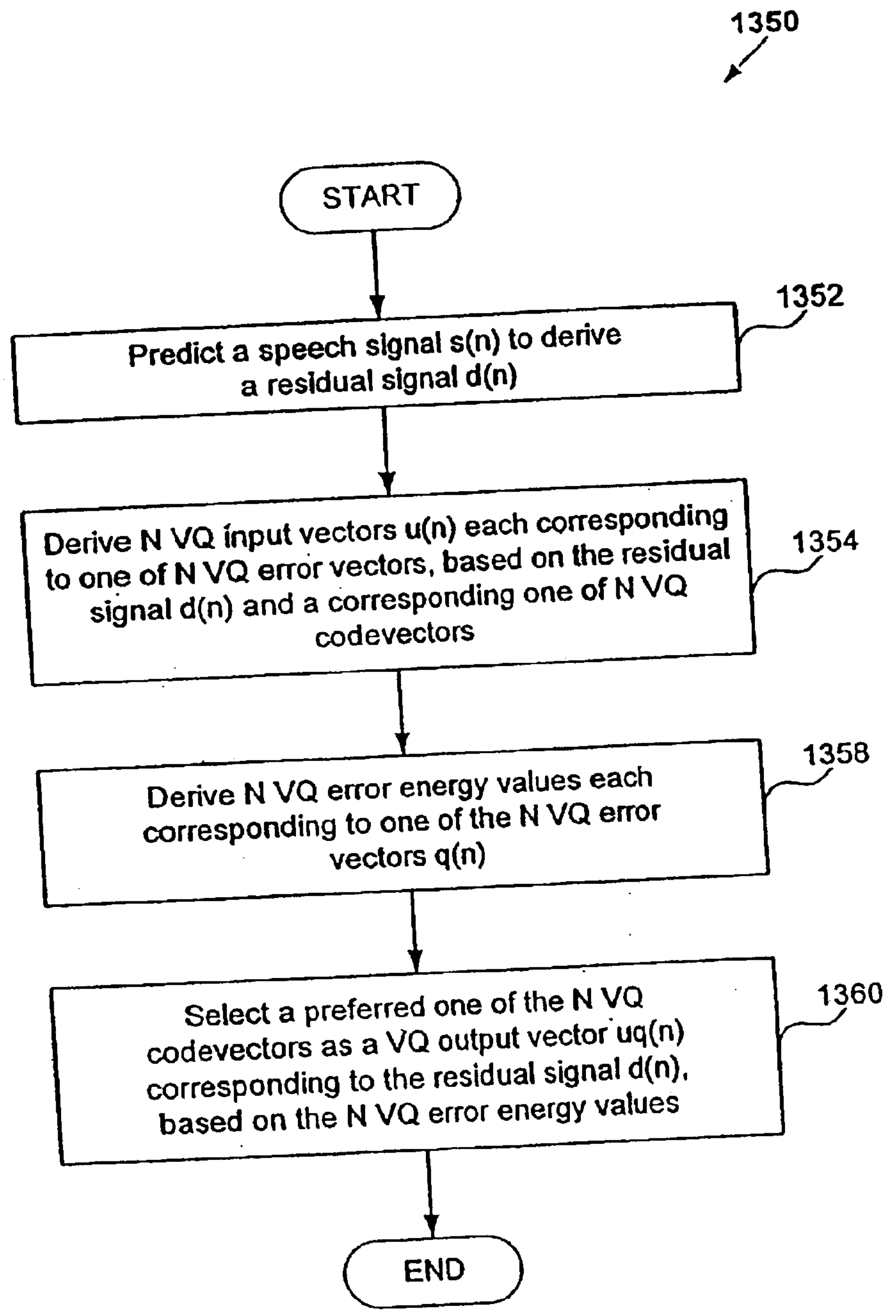
FIG. 13B is a flow diagram of an example method, corresponding to the NFC system of FIG. 13A, of searching N VQ codevectors stored in VQ codebook for a preferred one of the N VQ codevectors to be used in coding a speech or audio signal.

FIG. 13B is a flow diagram of an example method 1350 of searching the N VQ codevectors stored in VQ codebook 1302 for a preferred one of the N VQ codevectors to be used in coding a speech or audio signal (method 1350 is also referred to as a prediction residual VQ codebook search of an NFC).

Method 1350 is implemented using system 1300. With reference to FIGS. 13A and 13B, at a first step 1352, predictor 1306 predicts a speech signal s(n) to derive a residual signal d(n). Predictor 1306 can include a predictor and a combiner, such as predictor 5002 and combiner 5004 discussed above in connection with FIG. 5, for example.

At a next step 1354, input vector deriver 1308 derives N VQ input vectors u(n) each based on the residual signal d(n) and a corresponding one of the N VQ codevector stored in codebook 1302. Each of the VQ input vectors u(n) corresponds to one of N VQ error vectors q(n). Input vector deriver 1308 and step 1354 are described in further detail below.

At a next step 1358, error energy calculator 1310 derives N VQ error energy values e(n) each corresponding to one of the N VQ error vectors q(n) associated with the N VQ input vectors u(n) of step 1354. Error energy calculator 1310 performs a squaring operation, for example, on each of the error vectors q(n) to derive the energy values corresponding to the error vectors.

At a next step 1360, preferred codevector selector 1312 selects a preferred one of the N VQ codevectors as a VQ output vector uq(n) corresponding to the residual signal d(n), based on the N VQ error energy values e(n) derived by error energy calculator 1310.

Predictor/filter restorer 1314 initializes and restores (that is, resets) the filter states and predictor states of various filters and predictors included in system 1300, during method 1350, as will be further described below.

2. Example Specific Embodiment a. System

Figure 13C:
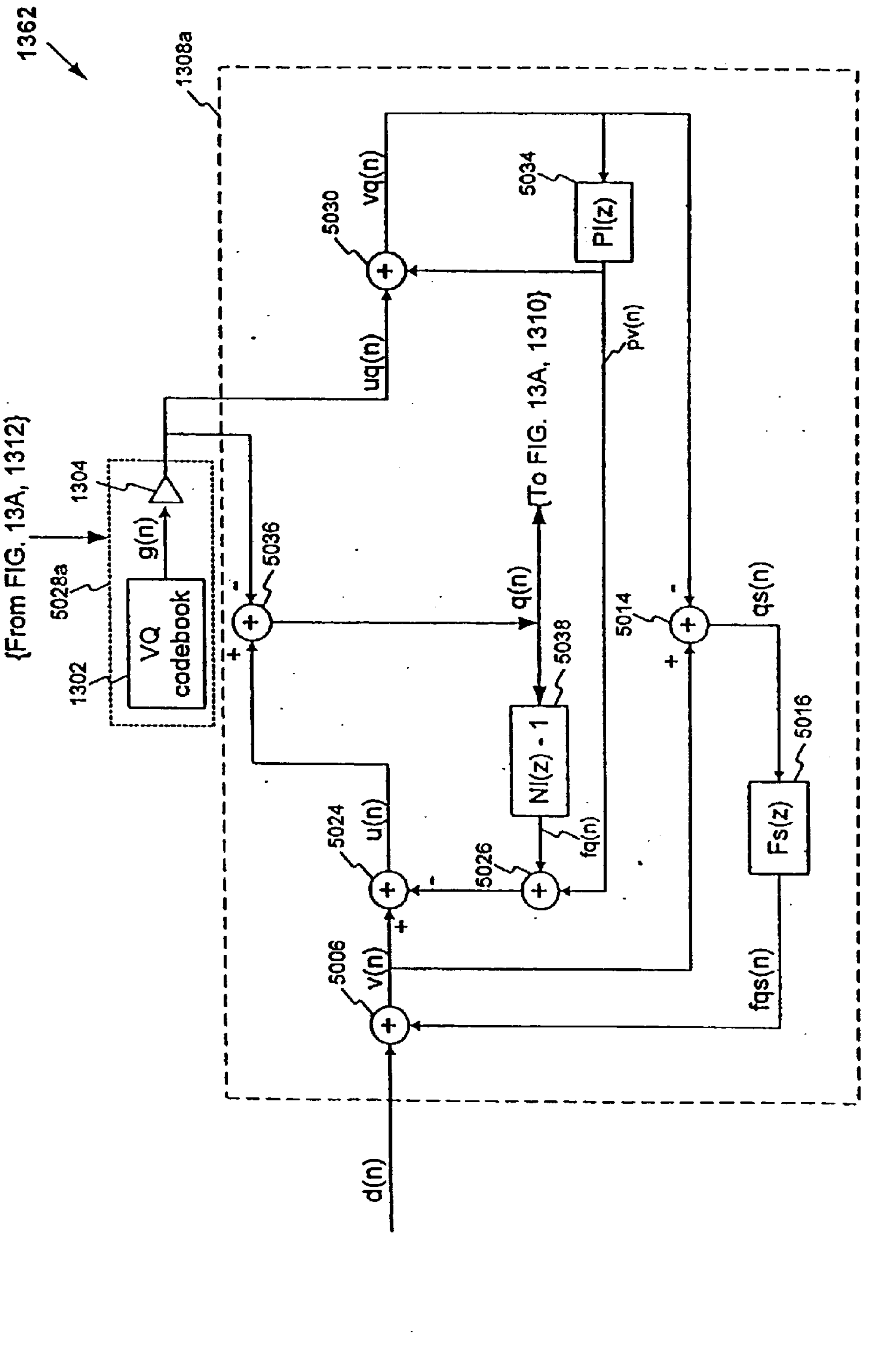
FIG. 13C is a block diagram of a portion of an example codec structure or system used in an example prediction residual VQ codebook search of the codec of FIG. 5.

FIG. 13C is a block diagram of a portion of an example codec structure or system 1362 used in a prediction residual VQ codebook search of TSNFC 5000 (discussed above in connection with FIG. 5). System 1362 includes scaled VQ codebook 5028*a*, and an input vector deriver 1308*a* (a specific embodiment of input vector deriver 1308) configured according to the embodiment of TSNFC 5000 of FIG. 5. Input vector deriver 1308*a* includes essentially the same feedback structure involved in the quantizer codebook search as in FIG. 7, except the shorthand z-transform notations of filter blocks in FIG. 5 are used. Input vector deriver 1308*a* includes an outer or first stage NF loop including NF filter 5016, and an inner or second stage NF loop including NF filter 5038, as described above in connection with FIG. 5. Also, all of the filter blocks and adders (combiners) in input vector deriver 1308*a* operate sample-by-sample in the same manner as described in connection with FIG. 5.

b. Methods

The method of operation of codec structure 1362 can be considered to encompass a single method. Alternatively, the method of operation of codec structure 1362 can be considered to include a first method associated with the inner NF loop of codec structure 1362 (mentioned above in connection with FIG. 13C), and a second method associated with the outer NF loop of the codec structure (also mentioned above). The first and second methods associated respectively with the inner and outer NF loops of codec structure 1362 operate concurrently, and in an inter-related manner (that is, together), with one another to form the single method. The aforementioned first and second methods (that is, the inner and outer NF loop methods, respectively) are now described in sequence below.

Figure 13D:
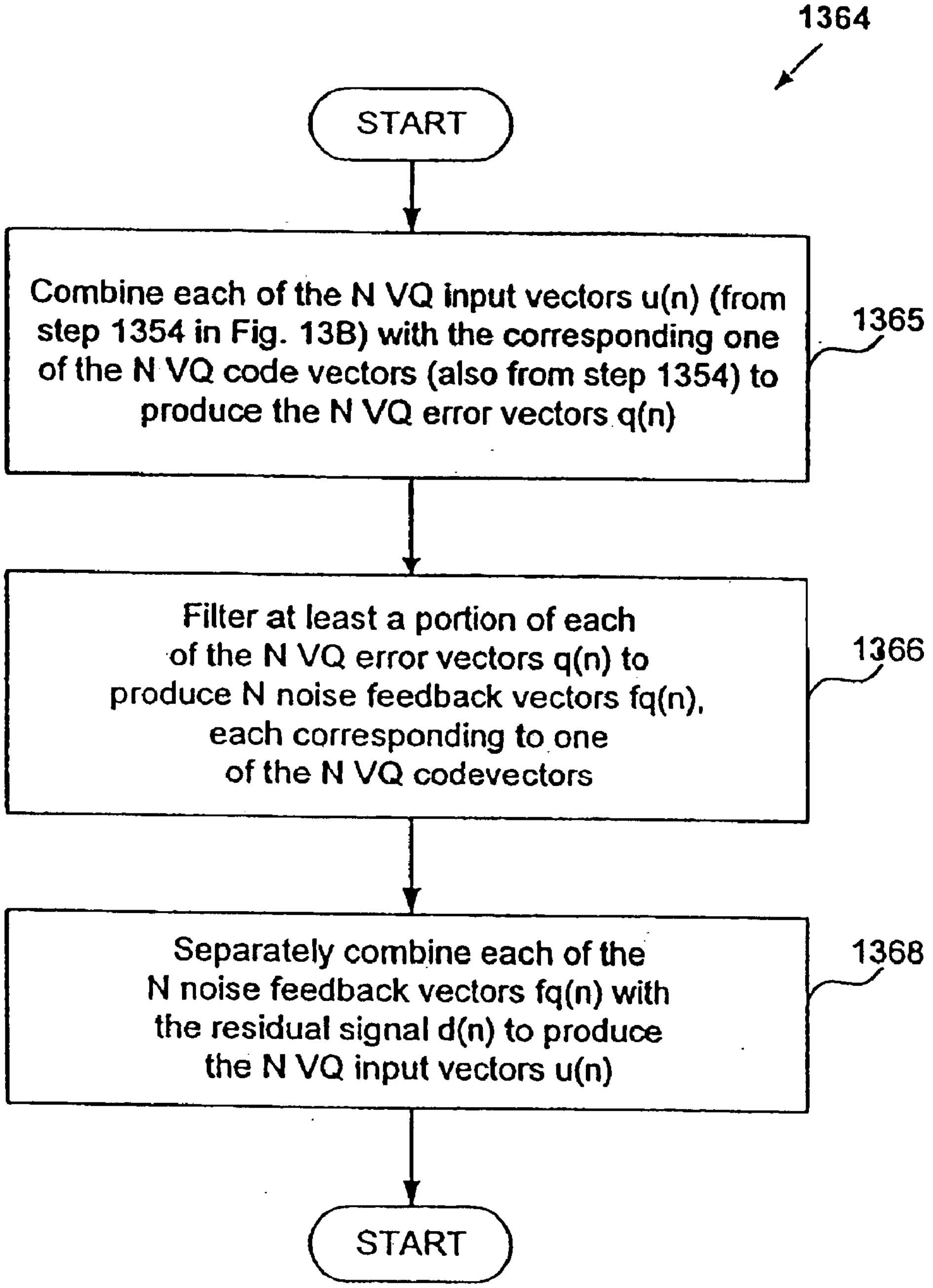
FIG. 13D is an example method implemented by the system of FIG. 13C.

FIG. 13D is an example first (inner NF loop) method 1364 implemented by system 1362 depicted in FIG. 13C. Method 1364 uses the inner NF loop of system 1362, as mentioned above. At a first step 1365, combiner 5036 combines each of the N VQ input vectors u(n) (mentioned above in connection with FIG. 13A) with the corresponding one of the N VQ codevectors from scaled VQ codebook 5028*a* to produce the N VQ error vectors q(n).

At a next step 1366, filter 5038 separately filters at least a portion of each of the N VQ error vectors q(n) to produce N noise feedback vectors fq(n) each corresponding to one of the N VQ codevectors. Filter 5038 can perform either long-term or short-term filtering. Filter 5038 filters each of the error vectors q(n) on a sample-by-sample basis (that is, the samples of each error vector q(n) are filtered sequentially, sample-by-sample). Filter 5038 filters each of the N VQ error vectors q(n) based on an initial filter state of the filter corresponding to a previous preferred codevector (the previous preferred codevector corresponds to a previous residual signal). Therefore, restorer 1314 restores filter 5038 to the initial filter state before the filter filters each of the N VQ codevectors. As would be apparent to one of ordinary skill in the speech coding art, the initial filter state mentioned above is typically established as a result of processing many, that is, one or more, previous preferred codevectors.

At a next step 1368, combining logic (5006, 5024, and 5026), separately combines each of the N noise feedback vectors fq(n) with the residual signal d(n) to produce the N VQ input vectors u(n).

Figure 13E:
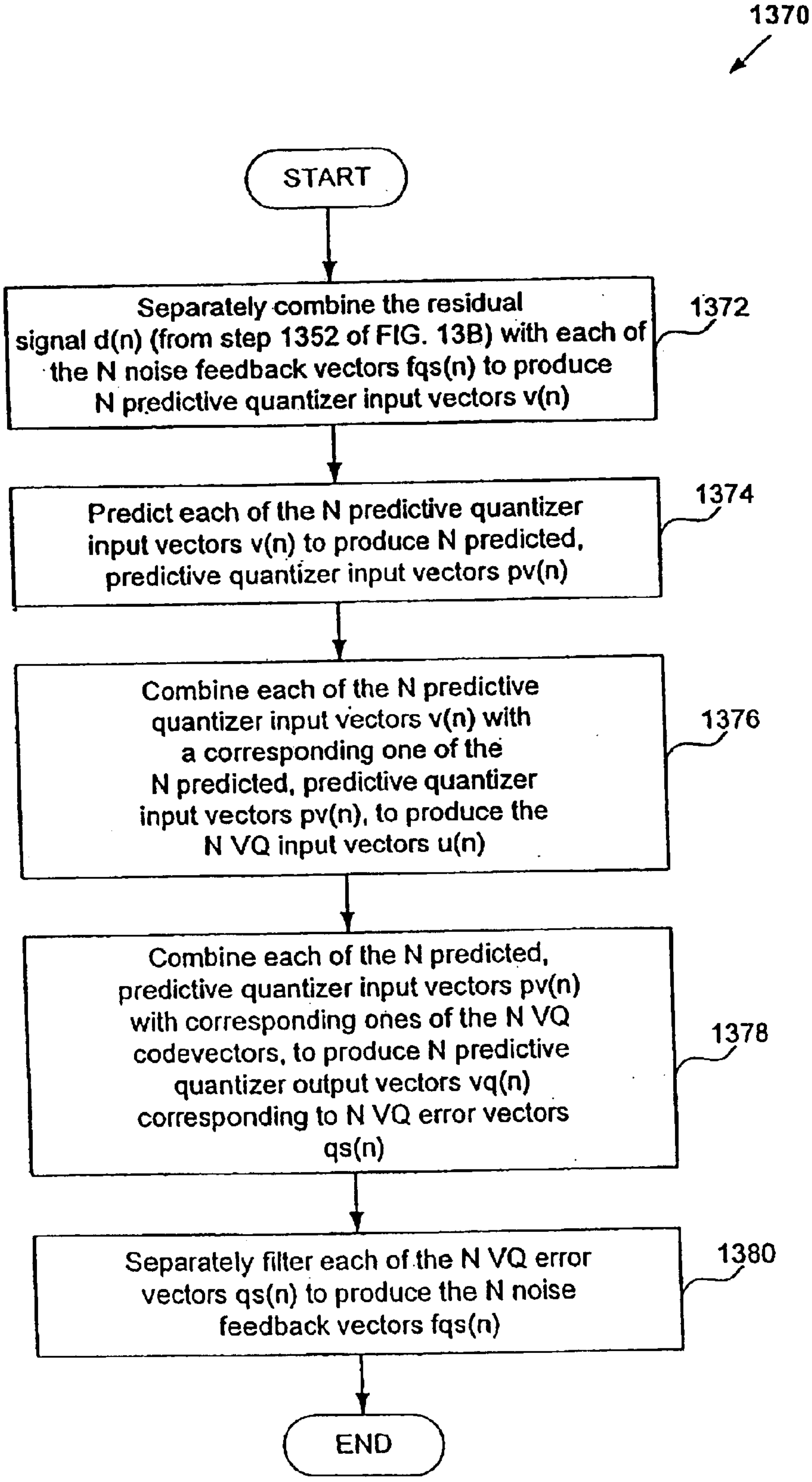
FIG. 13E is an example method executed concurrently with the method of FIG. 13D using the system of FIG. 13C.

FIG. 13E is an example second (outer NF loop) method 1370 executed concurrently and together with method 1364 by system 1362. Method 1370 uses the outer NF loop of system 1362, as mentioned above. At a first step 1372 of method 1370, combiner 5006 separately combines the residual signal d(n) with each of the N noise feedback vectors fqs(n) to produce N predictive quantizer input vectors v(n).

At a next step 1374, predictor 5034 predicts each of the N predictive quantizer input vectors v(n) to produce N predictive, predictive quantizer input vectors pv(n). Predictor 5034 predicts input vectors v(n) based on an initial predictor state of the predictor corresponding to (that is, established by) the previous preferred codevector. Therefore, restorer 1314 restores predictor 5034 to the initial predictor state before predictor 5034 predicts each of the N predictive quantizer input vectors v(n) in step 1374.

At a next step 1376, combining logic (e.g., combiners 5024, and 5026) separately combines each of the N predictive quantizer input vectors v(n) with a corresponding one of the N predicted, predictive quantizer input vectors pv(n) to produce the N VQ input vectors u(n).

At a next step 1378, a combiner (e.g. combiner 5030) combines each of the N predicted, predictive quantizer input vectors pv(n) with corresponding ones of the N VQ codevectors, to produce N predictive quantizer output vectors vq(n) corresponding to N VQ error vectors qs(n).

At a next step 1380, filter 5016 separately filters each of the N VQ error vectors qs(n) to produce the N noise feedback vectors fqs(n). Filter 5016 can perform either long-term or short-term filtering. Filter 5016 filters each of the N VQ error vectors qs(n) on a sample-by-sample basis, and based on an initial filter state of the filter corresponding to at least the previous preferred codevector (see predicting step 1374 above). Therefore, restorer 1314 restores filter 5016 to the initial filter state before filter 5016 filters each of the N VQ codevectors in step 1380.

Alternative embodiments of VQ search systems and corresponding methods, including embodiments based on codecs 3000, 4000, and 6000, for example, would be apparent to one of ordinary skill in designing speech codecs, based on the exemplary VQ search system and methods described above.

The fundamental ideas behind the modified VQ codebook search methods described above are somewhat similar to the ideas in the VQ codebook search method of CELP codecs. However, the feedback filter structures of input vector deriver 1308 (for example, input vector deriver 1308*a*, and so on) are completely different from the structure of a CELP codec, and it is not readily obvious to those skilled in the art that such a VQ codebook search method can be used to improve the performance of a conventional NFC codec or a two-stage NFC codec.

Our simulation results show that this vector quantizer approach indeed works, gives better codec performance than a scalar quantizer at the same bit rate, and also achieves desirable short-term and long-term noise spectral shaping. However, according to another novel feature of the current invention described below, this VQ codebook search method can be further improved to achieve significantly lower complexity while maintaining mathematical equivalence.

B. Fast VQ Search

A computationally more efficient codebook search method according to the present invention is based on the observation that the feedback structure in FIG. 13C, for example, can be regarded as a linear system with the VQ codevector out of scaled VQ codebook 5028*a* as its input signal, and the quantization error q(n) as its output signal. The output vector of such a linear system can be decomposed into two components: a ZERO-INPUT response vector qzi(n) and a ZERO-STATE response vector qzs(n). The ZERO-INPUT response vector qzi(n) is the output vector of the linear system when its input vector is set to zero. The ZERO-STATE response vector qzs(n) is the output vector of the linear system when its internal states (filter memories) are set to zero (but the input vector is not set to zero).

1. High-Level Embodiment a. System

Figure 14A:
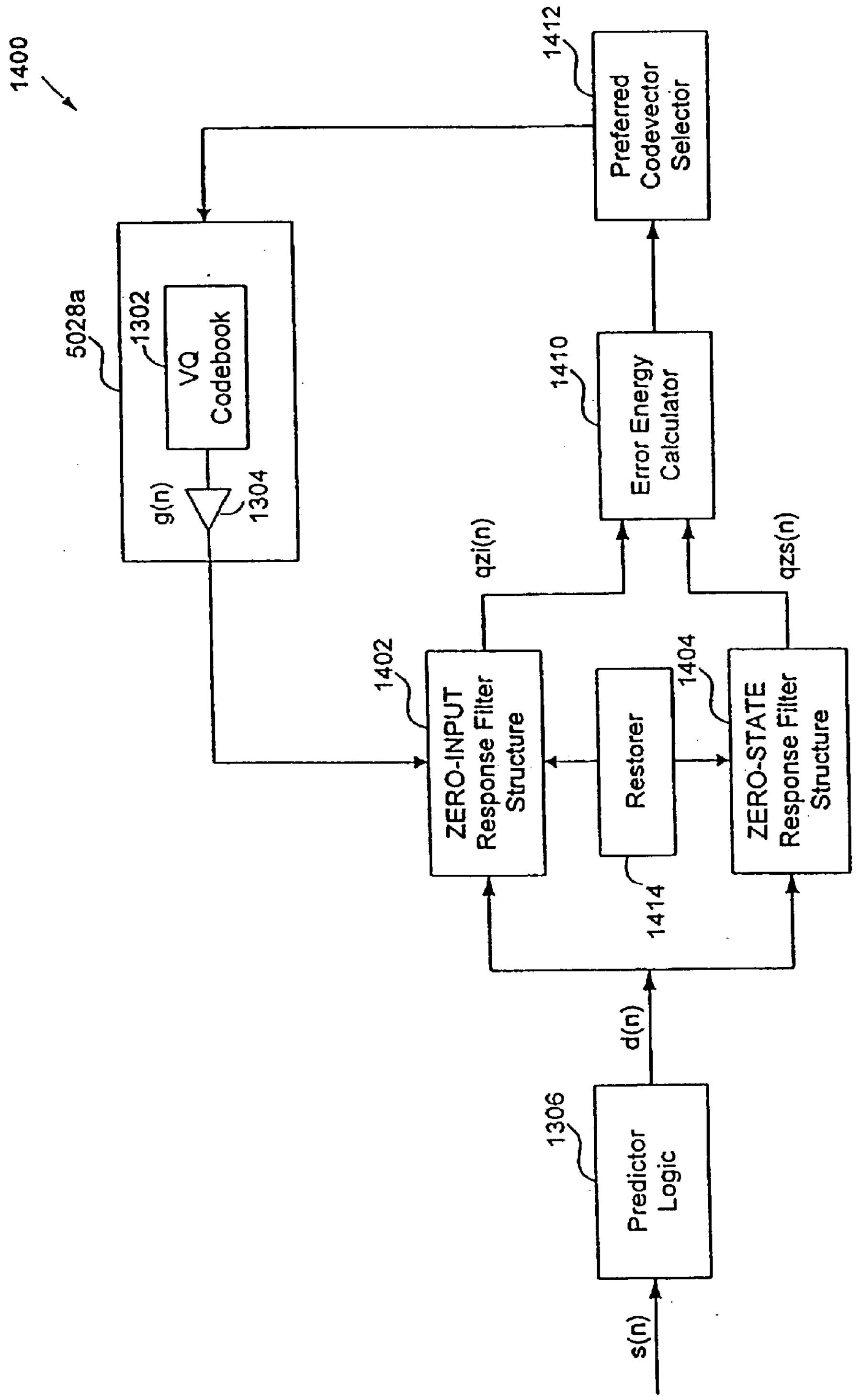
FIG. 14A is a block diagram of an example NFC system for efficiently searching through N VQ codevectors stored in a VQ codebook for a preferred one of the N VQ codevectors to be used for coding a speech or audio signal.

FIG. 14A is a block diagram of an example NFC system 1400 for efficiently searching through N VQ codevectors, stored in the VQ codebook 1302 of scaled VQ codebook 5028*a*, for a preferred one of the N VQ codevectors to be used for coding a speech or audio signal. System 1400 includes scaled VQ codebook 5028*a*, a ZERO-INPUT response filter structure 1402, a ZERO-STATE response filter structure 1404, a restorer 1414 similar to restorer 1314 in FIG. 13A, an error energy calculator 1410 similar to error energy calculator 1310 in FIG. 13A, and a preferred codevector selector 1412 similar to preferred codevector selector 1312 in FIG. 13A.

b. Methods

Figure 14B:
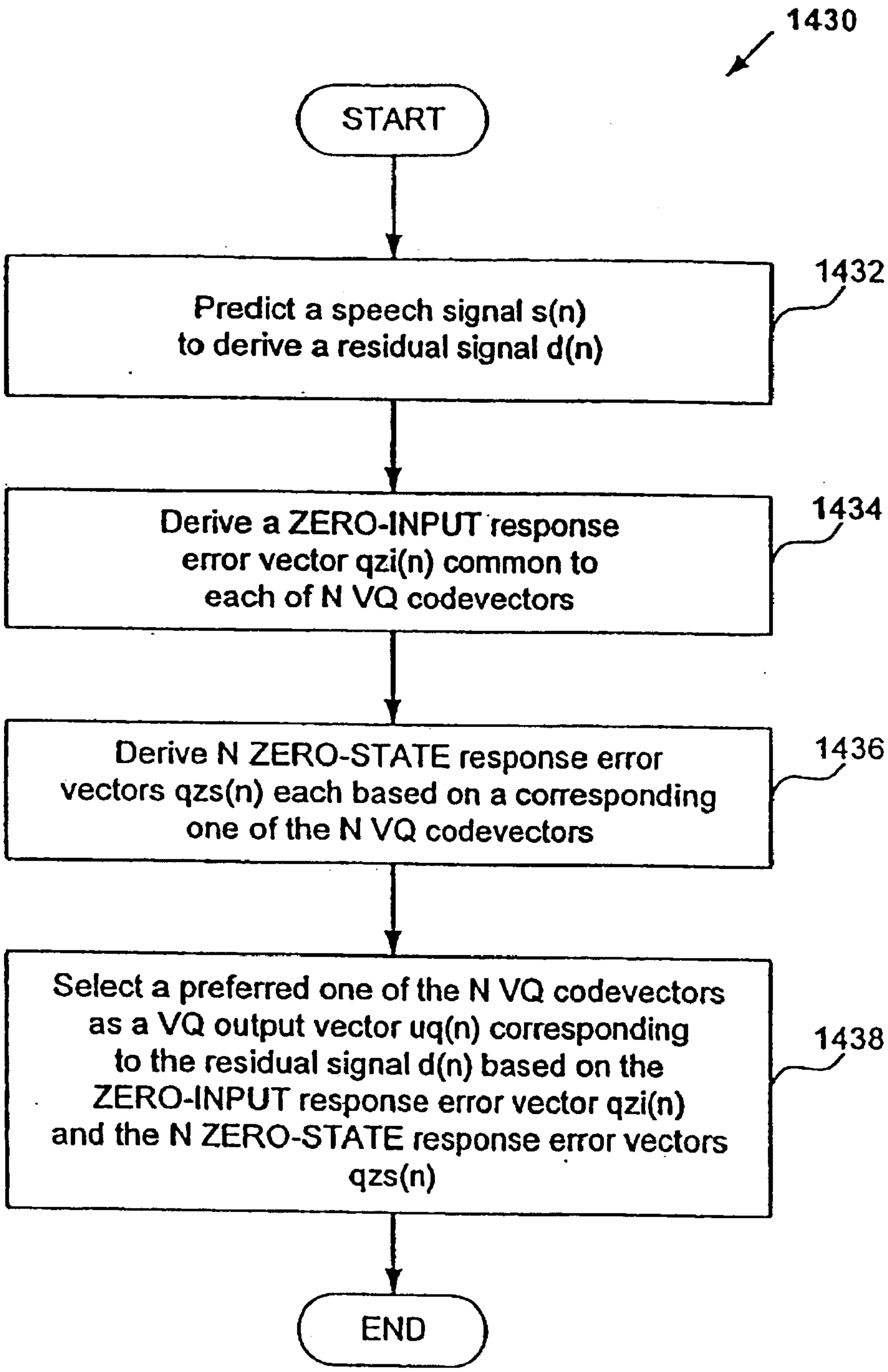
FIG. 14B is an example method implemented using the system of FIG. 14A.

FIG. 14B is an example, computationally efficient, method 1430 of searching through N VQ codevectors for a preferred one of the N VQ codevectors, using system 1400. In a first step 1432, predictor 1306 predicts speech signal s(n) to derive a residual signal d(n).

At a next step 1434, ZERO-INPUT response filter structure 1402 derives ZERO-INPUT response error vector qzi (n) common to each of the N VQ codevectors stored in VQ codebook 1302.

At a next step 1436, ZERO-STATE response filter structure 1404 derives N ZERO-STATE response error vectors qzs(n) each based on a corresponding one of the N VQ codevectors stored in VQ codebook 1302.

At a next step 1438, error energy calculator 1410 derives N VQ error energy values each based on the ZERO-INPUT response error vector qzi(n) and a corresponding one of the N ZERO-STATE response error vectors qzs(n). Preferred codevector selector 1412 selects the preferred one of the N VQ codevectors based on the N VQ error energy values derived by error energy calculator 1410.

The qzi(n) vector derived at step 1434 captures the effects due to (1) initial filter memories in ZERO-INPUT response filter structure 1402, and (2) the signal vector of d(n). Since the initial filter memories and the signal d(n) are both independent of the particular VQ codevector tried, there is only one ZERO-INPUT response vector, and it only needs to be calculated once for each input speech vector.

During the calculation of the ZERO-STATE response vector qzs(n) at step 1436, the initial filter memories and d(n) are set to zero. For each VQ codebook vector tried, there is a corresponding ZERO-STATE response vector qzs(n). Therefore, for a codebook of N codevectors, we need to calculate N ZERO-STATE response vectors qzs(n) for each input speech vector, in one embodiment of the present invention. In a more computationally efficient embodiment, we calculate a set of N ZERO-STATE response vectors qzs(n) for a group of input speech vectors, instead of for each of the input speech vectors, as is further described below.

2. Example Specific Embodiments a. ZERO-INPUT Response

Figure 14C:
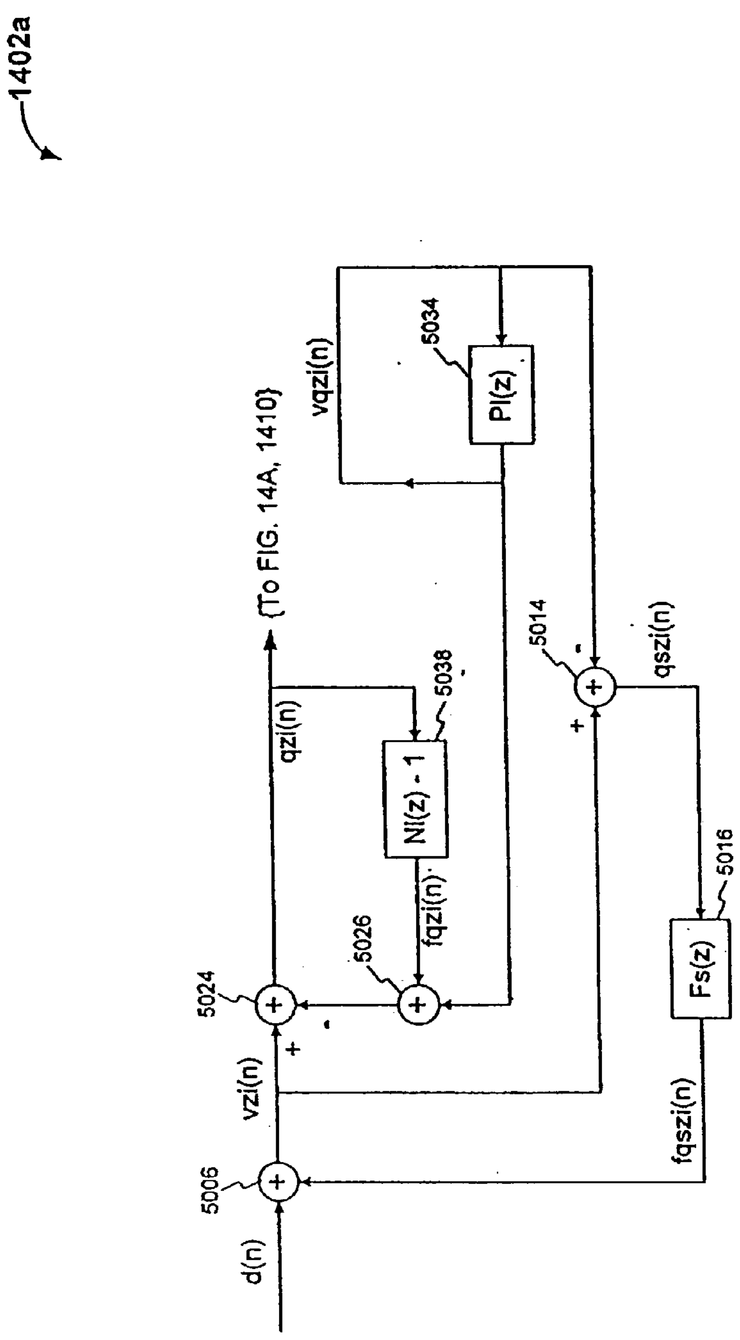
FIG. 14C is an example filter structure, during a calculation of a ZERO-INPUT response of a quantization error signal, used in the example prediction residual VQ codebook search corresponding to FIG. 13C.

FIG. 14C is a block diagram of an example ZERO-INPUT response filter structure 1402*a* (a specific embodiment of filter structure 1402) used during the calculation of the ZERO-INPUT response of q(n) of FIG. 13C. During the calculation of the ZERO-INPUT response vector qzi(n), certain branches in FIG. 13C can be omitted because the signals going through those branches are zero. The resulting structure is depicted in FIG. 14C. ZERO-INPUT response filter structure 1402*a* includes filter 5038 associated with an inner NF loop of the filter structure, and filter 5016 associated with an outer NF loop of the filter structure.

The method of operation of codec structure 1402*a* can be considered to encompass a single method. Alternatively, the method of operation of codec structure 1402*a* can be considered to include a first method associated with the inner NF loop of codec structure 1402*a*, and a second method associated with the outer NF loop of the codec structure. The first and second methods associated respectively with the inner and outer NF loops of codec structure 1402*a* operate concurrently, and together, with one another to form the single method. The aforementioned first and second methods (that is, the inner and outer NF loop methods, respectively) are now described in sequence below.

Figure 14D:
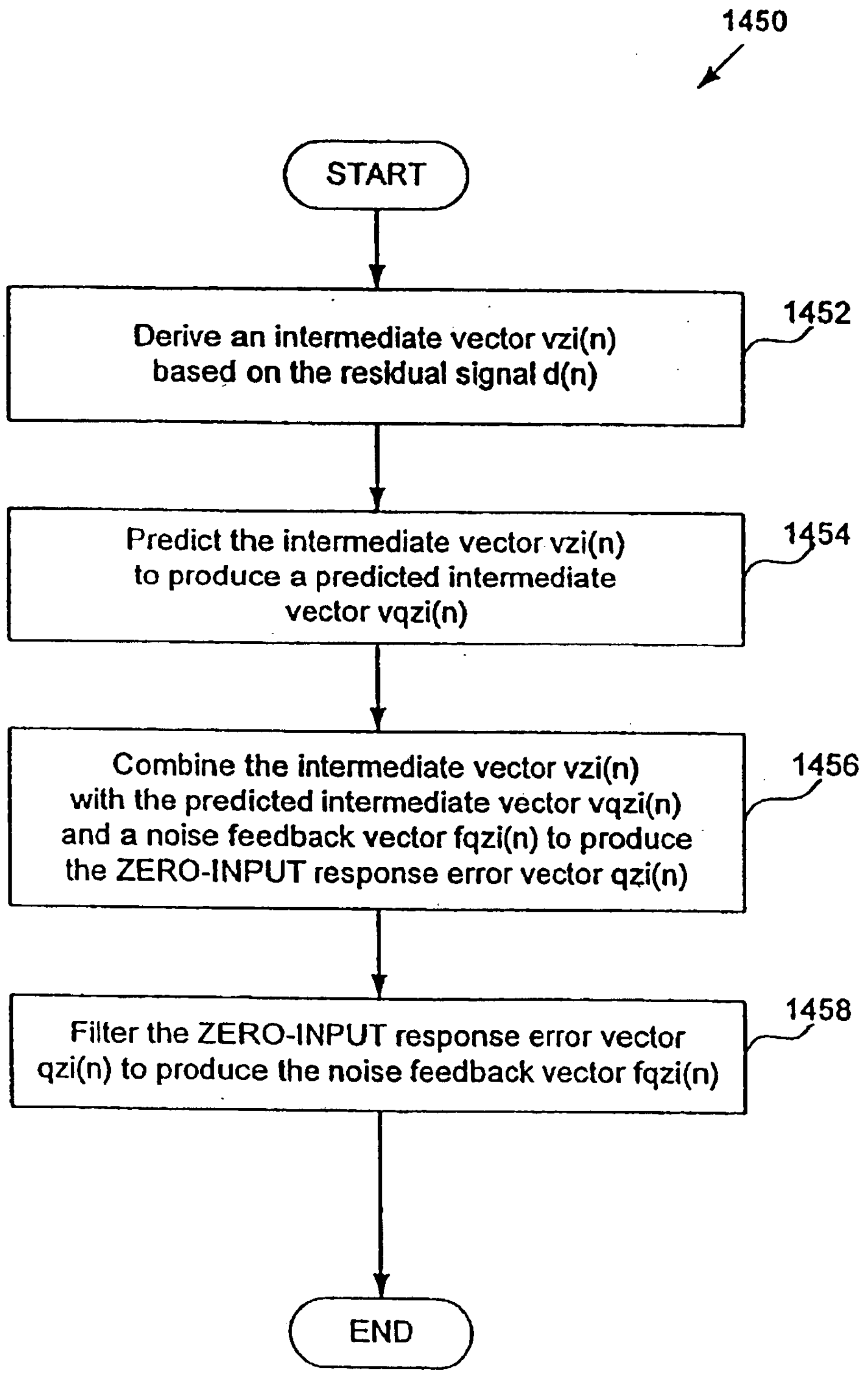
FIG. 14D is an example method of deriving a ZERO-INPUT response using the ZERO-INPUT response filter structure of FIG. 14C.

FIG. 14D is an example first (inner NF loop) method 1450 of deriving a ZERO-INPUT response using ZERO-INPUT response filter structure 1402*a* of FIG. 14C. Method 1450 includes operation of the inner NF loop of system 1402*a*.

In a first step 1452, an intermediate vector vzi(n) is derived based on the residual signal d(n).

In a next step 1454, the intermediate vector vzi(n) is predicted (using predictor 5034, for example) to produce a predicted intermediate vector vqzi(n). Intermediate vector vzi(n) is predicted based on an initial predictor state (of predictor 5034, for example) corresponding to a previous preferred codevector. As would be apparent to one of ordinary skill in the speech coding art, the initial filter state mentioned above is typically established as a result of a history of many, that is, one or more, previous preferred codevectors.

In a next step 1456, the intermediate vector vzi(n) and the predicted intermediate vector vqzi(n) are combined with a noise feedback vector fqzi(n) (using combiners 5026 and 5024, for example) to produce the ZERO-INPUT response error vector qzi(n).

In a next step 1458, the ZERO-INPUT response error vector qzi(n) is filtered (using filter 5038, for example) to produce the noise feedback vector fqzi(n). Error vector qzi(n) can be either long-term or short-term filtered. Also, error vector qzi(n) is filtered based on an initial filter state (of filter 5038, for example) corresponding to the previous preferred codevector (see predicting step 1454 above).

Figure 14E:
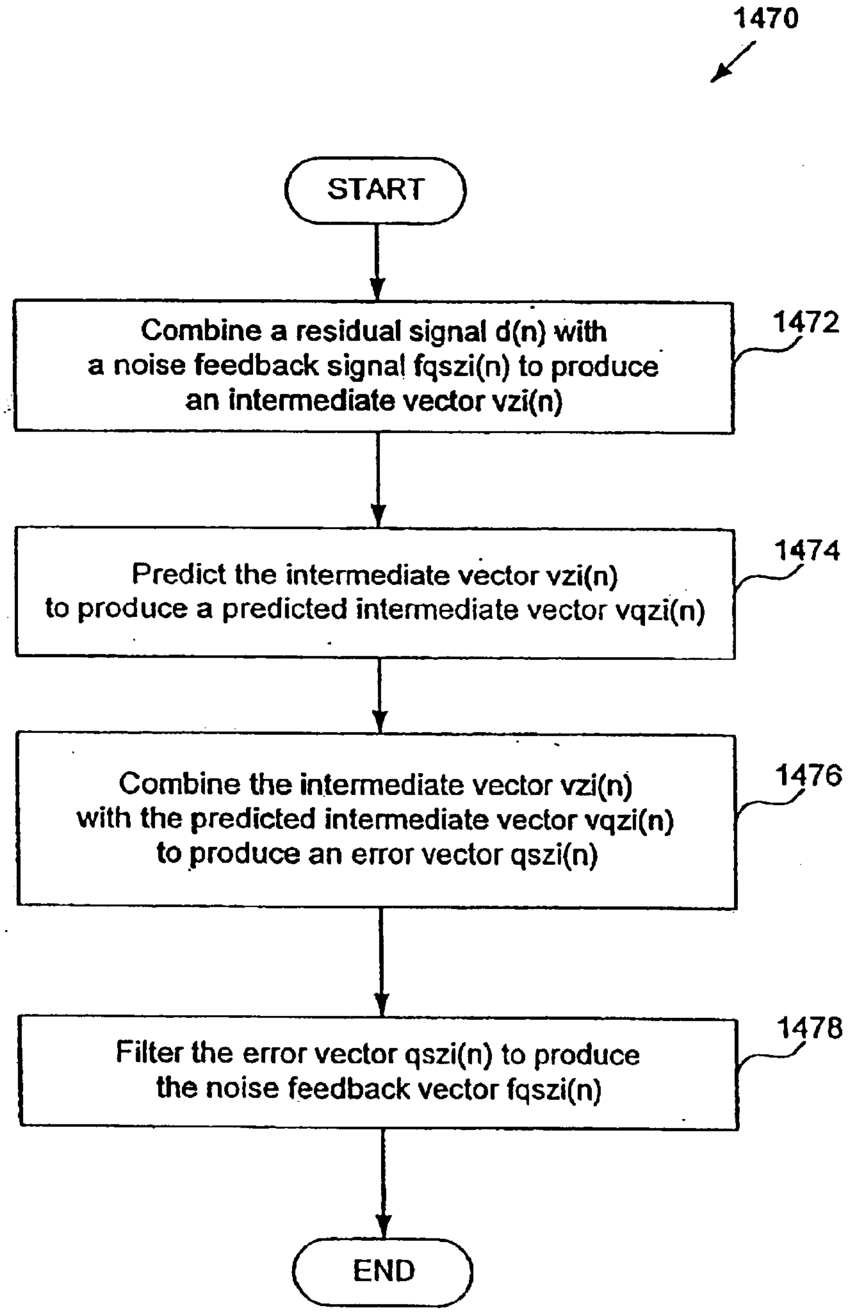
FIG. 14E is another example method of deriving a ZERO-INPUT response, executed concurrently with the method of FIG. 14D, using the ZERO-INPUT response filter structure of FIG. 14C.

FIG. 14E is an example second (outer NF loop) method 1470 of deriving a ZERO-INPUT response, executed concurrently with method 1450, using ZERO-INPUT response filter structure 1402*a*. Method 1470 includes operation of the outer NF loop of system 1402*a*. Method 1470 shares some method steps with method 1450, described above.

In a first step 1472, the residual signal d(n) is combined with a noise feedback signal fqszi(n) (using combiner 5006, for example) to produce an intermediate vector vzi(n).

At a next step 1474, the intermediate vector vzi(n) is predicted to produce a predicted intermediate vector vqzi(n).

At a next step 1476, the intermediate vector vzi(n) is combined with the predicted intermediate vector vqzi(n) (using combiner 5014, for example) to produce an error vector qszi(n).

At a next step 1478, the error vector qszi(n) is filtered (using filter 5016, for example) to produce the noise feedback vector fqszi(n). Error vector qszi(n) can be either long-term or short-term filtered. Also, error vector qszi(n) is filtered based on an initial filter state (of filter 5038, for example) corresponding to the previous preferred codevector (see predicting step 1454 above).

b. ZERO-STATE Response (1) ZERO-STATE Response—First Embodiment

Figure 15A:
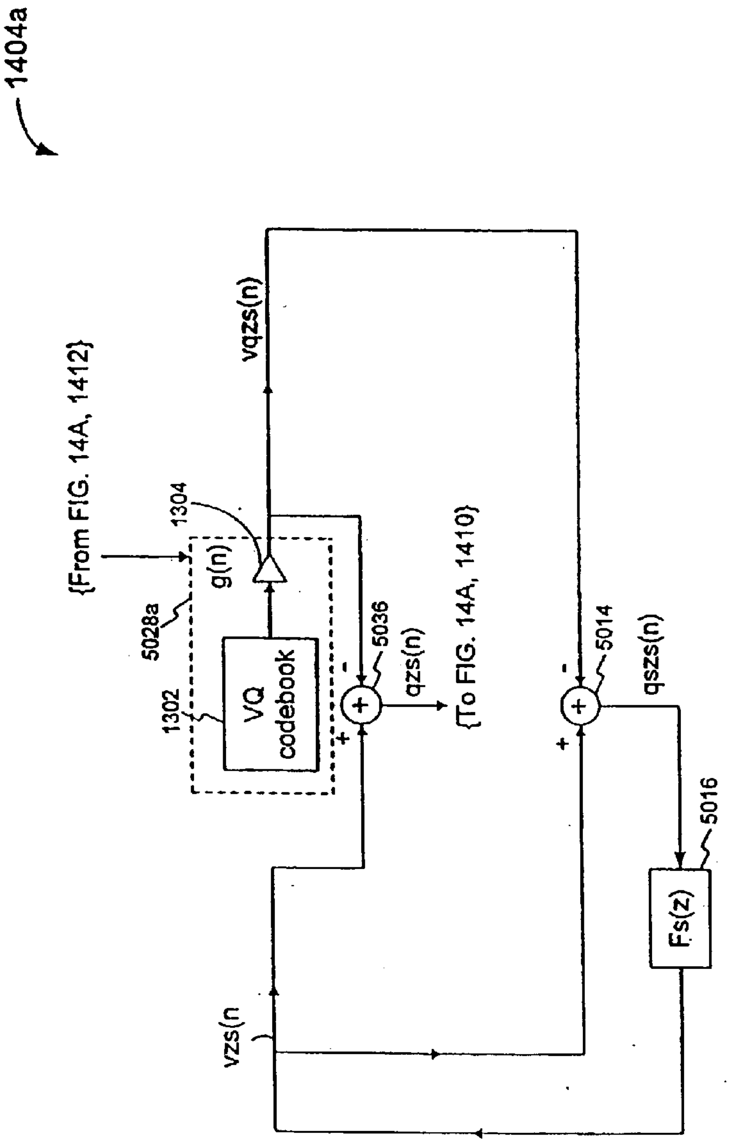
FIG. 15A is a block diagram of an example filter structure, during a calculation of a ZERO-STATE response of a quantization error signal, used in the example prediction residual VQ codebook search corresponding to FIGS. 13C and 14C.

FIG. 15A is a block diagram of an example ZERO-STATE response filter structure 1404*a* (a specific embodiment of filter structure 1404) used during the calculation of the ZERO-STATE response of q(n) in FIG. 13C.

If we choose the vector dimension to be smaller than the minimum pitch period minus one, or K<MINPP−1, which is true in our preferred embodiment, then with zero initial memory, the two long-term filters 5038 and 5034 in FIG. 13A have no effect on the calculation of the ZERO-STATE response vector. Therefore, they can be omitted. The resulting structure during ZERO-STATE response calculation is depicted in FIG. 15A.

Figure 15B:
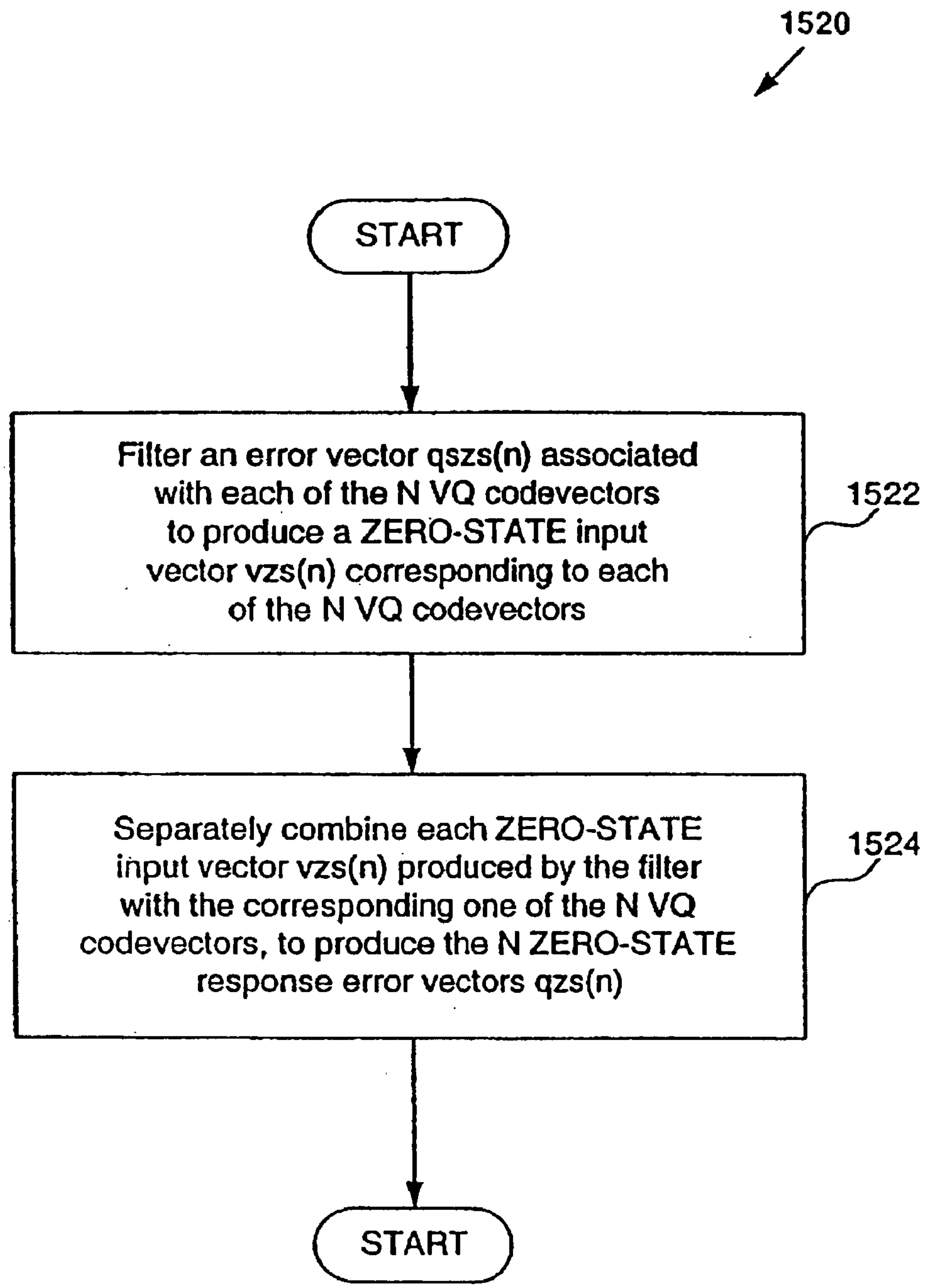
FIG. 15B is a flowchart of an example method of deriving a ZERO-STATE response using the filter structure of FIG. 15A.

FIG. 15B is a flowchart of an example method 1520 of deriving a ZERO-STATE response using filter structure 1404*a* depicted in FIG. 15A. In a first step 1522, an error vector qszs(n) associated with each of the N VQ codevectors stored in scaled VQ codebook 5028*a* is filtered (using filter 5016, for example) to produce a ZERO-STATE input vector vzs(n) corresponding to each of the N VQ codevectors. Each of the error vectors qszs(n) is filtered based on an initially zeroed filter state (of filter 5016, for example). Therefore, the filter state is zeroed (using restorer 1414, for example) to produce the initially zeroed filter state before each error vector qszs(n) is filtered.

In a next step 1524, each ZERO-STATE input vector vzs(n) produced in filtering step 1522 is separately combined with the corresponding one of the N VQ codevectors (using combiner 5036, for example), to produce the N ZERO-STATE response error vectors qzs(n).

(2) ZERO-STATE Response—Second Embodiment

Figure 16A:
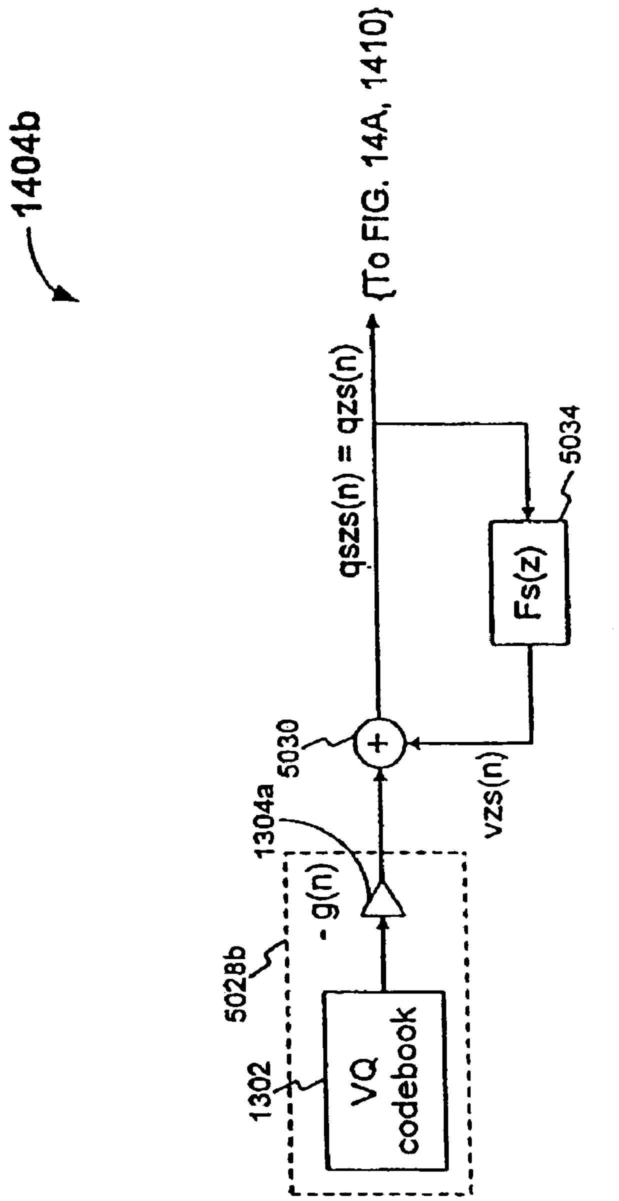
FIG. 16A is a block diagram of a filter structure according to another embodiment of the ZERO-STATE response filter structure of FIG. 4A.

Note that in FIG. 15A, qszs(n) is equal to qzs(n). Hence, we can simply use qszs(n) as the output of the linear system during the calculation of the ZERO-STATE response vector. This allows us to simplify FIG. 15A further into a simplified structure 1404*b* in FIG. 16A, which is no more than just scaling the VQ codevector by the negative gain −g(n), and then passing the result through a feedback filter structure with a transfer function of H(z)=1/[1−Fs(z)]. Therefore, FIG. 16A is a block diagram of filter structure 1404*b* according to a simplified embodiment of ZERO-STATE response filter structure 1404. Filter structure 1404*b* is equivalent to filter structure 1404*a* of FIG. 15A.

If we start with a scaled codebook (use g(in) to scale the codebook) as mentioned in the description of block 30 in an earlier section, and pass each scaled codevector through the filter H(z) with zero initial memory, then, subtracting the corresponding output vector from the ZERO-INPUT response vector of qzi(n) gives us the quantization error vector of q(n) for that particular VQ codevector.

Figure 16B:
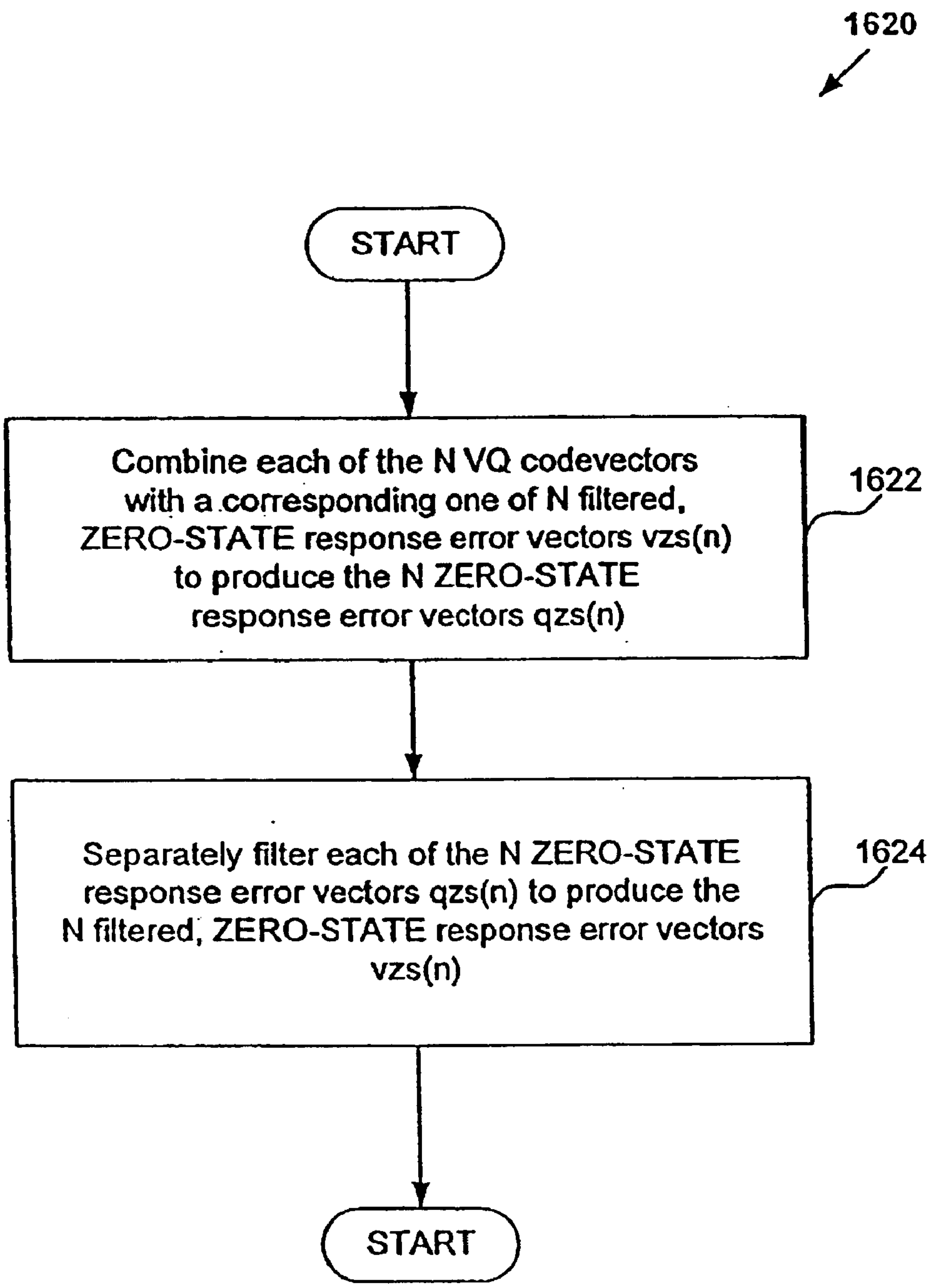
FIG. 16B is a flowchart of an example method of deriving a ZERO-STATE response using the filter structure of FIG. 16A.

FIG. 16B is a flowchart of an example method 1620 of deriving a ZERO-STATE response using filter structure 1404*b* of FIG. 16A. In a first step 1622, each of N VQ codevectors is combined with a corresponding one of N filtered, ZERO-STATE response error vectors vzs(n) to produce the N ZERO-STATE response error vectors qzs(n).

At a next step 1624, each of the N ZERO-STATE response error vectors qzs(n) is separately filtered to produce the N filtered, ZERO-STATE response error vectors vzs(n). Each of the error vectors qzs(n) is filtered based on an initially zeroed filter state. Therefore, the filter state is zeroed to produce the initially zeroed filter state before each error vector qzs(n) is filtered. The following enumerated steps represent an example of processing one VQ codevector CV(n) including four samples $CV(n)_{0 \ldots 3}$ sample-by-sample according to steps 1622 and 1624 using filter structure 1404*b*, to produce a corresponding ZERO-STATE error vector qzs(n) including four samples $qzs(n)_{0 \ldots 3}$:

1. combiner 5030 combines first codevector sample $CV(n)_0$ of codevector CV(n) with an initial zero state feedback sample $vzs(n)_i$ from filter 5034, to produce first error sample $qzs(n)_0$ of error vector qzs(n) (which corresponds to first codevector sample $CV(n)_0$) (part of step 1622);
2. filter 5034 filters first error sample $qzs(n)_0$ to produce a first feedback sample $vzs(n)_0$ of a feedback vector vzs(n) (part of step 1624);
3. combiner 5030 combines feedback sample $vzs(n)_0$ with second codevector sample $CV(n)_1$, to produce second error sample $qzs(n)_1$ (part of step 1622);
4. filter 5034 filters second error sample $qzs(n)_1$ to produce a second feedback sample $vzs(n)_1$ of feedback vector vzs(n) (part of step 1624);
5. combiner 5030 combines feedback sample $vzs(n)_1$ with third codevector sample $CV(n)_2$, to produce third error sample $qzs(n)_2$ (part of step 1622);
6. filter 5034 filters third error sample $qzs(n)_2$ to produce a third feedback sample $vzs(n)_2$ (part of step 1624); and
7. combiner 5030 combines feedback sample $vzs(n)_2$ with fourth (and last) codevector sample $CV(n)_3$, to produce fourth error sample $qzs(n)_3$, whereby the four samples of vector qzs(n) are produced based on the four samples of VQ codevector CV(n) (part of step 1622). Steps 1–7 described above are repeated for each of the N VQ codevectors in accordance with method 1620, to produce the N error vectors qzs(n).

This second approach (corresponding to FIGS. 16A and 16B) is computationally more efficient than the first (and more straightforward) approach (corresponding to FIGS. 15A and 15B). For the first approach, the short-term noise feedback filter takes KM multiply-add operations for each VQ codevector. For the second approach, only $K(K-1)/2$ multiply-add operations are needed if K<M. In our preferred embodiment, M=8, and K=4, so the first approach takes 32 multiply-adds per codevector for the short-term filter, while the second approach takes only 6 multiply-adds per codevector. Even with all other calculations included, the second codebook search approach still gives a very significant reduction in the codebook search complexity. Note that the second approach is mathematically equivalent to the first approach, so both approaches should give an identical codebook search result.

Again, the ideas behind this second codebook search approach are somewhat similar to the ideas in the codebook search of CELP codecs. However, the actual computational procedures and the codec structure used are quite different, and it is not readily obvious to those skilled in the art how the ideas can be used correctly in the framework of two-stage noise feedback coding.

Using a sign-shape structured VQ codebook can further reduce the codebook search complexity. Rather than using a B-bit codebook with $2^B$ independent codevectors, we can use a sign bit plus a (B−1)-bit shape codebook with $2^{B-1}$ independent codevectors. For each codevector in the (B−1)-bit shape codebook, the negated version of it, or its mirror image with respect to the origin, is also a legitimate codevector in the equivalent B-bit sign-shape structured codebook. Compared with the B-bit codebook with $2^B$ independent codevectors, the overall bit rate is the same, and the codec performance should be similar. Yet, with half the number of codevectors, this arrangement cut the number of filtering operations through the filter $H(z)=1/[1-Fs(z)]$ by half, since we can simply negate a computed ZERO-STATE response vector corresponding to a shape codevector in order to get the ZERO-STATE response vector corresponding to the mirror image of that shape codevector. Thus, further complexity reduction is achieved.

In the preferred embodiment of the 16 kb/s narrowband codec, we use 1 sign bit with a 4-bit shape codebook. With a vector dimension of 4, this gives a residual encoding bit rate of (1+4)/4=1.25 bits/sample, or 50 bits/frame (1 frame=40 samples=5 ms). The side information encoding rates are 14 bits/frame for LSPI, 7 bits/frame for PPI, 5 bits/frame for PPTI, and 4 bits/frame for GI. That gives a total of 30 bits/frame for all side information. Thus, for the entire codec, the encoding rate is 80 bits/frame, or 16 kb/s. Such a 16 kb/s codec with a 5 ms frame size and no look ahead gives output speech quality comparable to that of G.728 and G.729E.

For the 32 kb/s wideband codec, we use 1 sign bit with a 5-bit shape codebook, again with a vector dimension of 4. This gives a residual encoding rate of (1+5)/4=1.5 bits/sample=120 bits/frame (1 frame=80 samples=5 ms). The side information bit rates are 17 bits/frame for LSPI, 8 bits/frame for PPI, 5 bits/frame for PPTI, and 10 bits/frame for GI, giving a total of 40 bits/frame for all side information. Thus, the overall bit rate is 160 bits/frame, or 32 kb/s. Such a 32 kb/s codec with a 5 ms frame size and no look ahead gives essentially transparent quality for speech signals.

(3) Further Reduction in Computational Complexity

The speech signal used in the vector quantization embodiments described above can comprise a sequence of speech vectors each including a plurality of speech samples. As described in detail above, for example, in connection with FIG. 7, the various filters and predictors in the codec of the present invention respectively filter and predict various signals to encode speech signal s(n) based on filter and predictor (or prediction) parameters (also referred to in the art as filter and predictor taps, respectively). The codec of the present invention includes logic to periodically derive, that is, update, the filter and predictor parameters, and also the gain g(n) used to scale the VQ codebook entries, based on the speech signal, once every M speech vectors, where M is greater than one. Codec embodiments for periodically deriving filter, prediction, and gain scaling parameters were described above in connection with FIG. 7.

The present invention takes advantage of such periodic updating of the aforementioned parameters to further reduce the computational complexity associated with calculating the N ZERO-STATE response error vectors qzs(n), described above. With reference again to FIG. 16A, the N ZERO-STATE response error vectors qzs(n) derived using filter structure 1404*b* depend on only the N VQ codevectors, the gain value g(n), and the Filter parameters (taps) applied to filter 5034. Since the gain value g(n) and filter taps applied to filter 5034 are constant over M speech vectors, that is, between updates, and since the N VQ codevectors are also constant, the N ZERO-STATE response error vectors qzs(n) corresponding to the N VQ codevectors are correspondingly constant over the M speech vectors. Therefore, the N ZERO-STATE response error vectors qzs(n) need only be derived when the gain g(n) and/or filter parameters for filter 5034 are updated once every M speech vectors, thereby reducing the overall computational complexity associated with searching the VQ codebook for a preferred one of the VQ codevectors.

Figure 17:
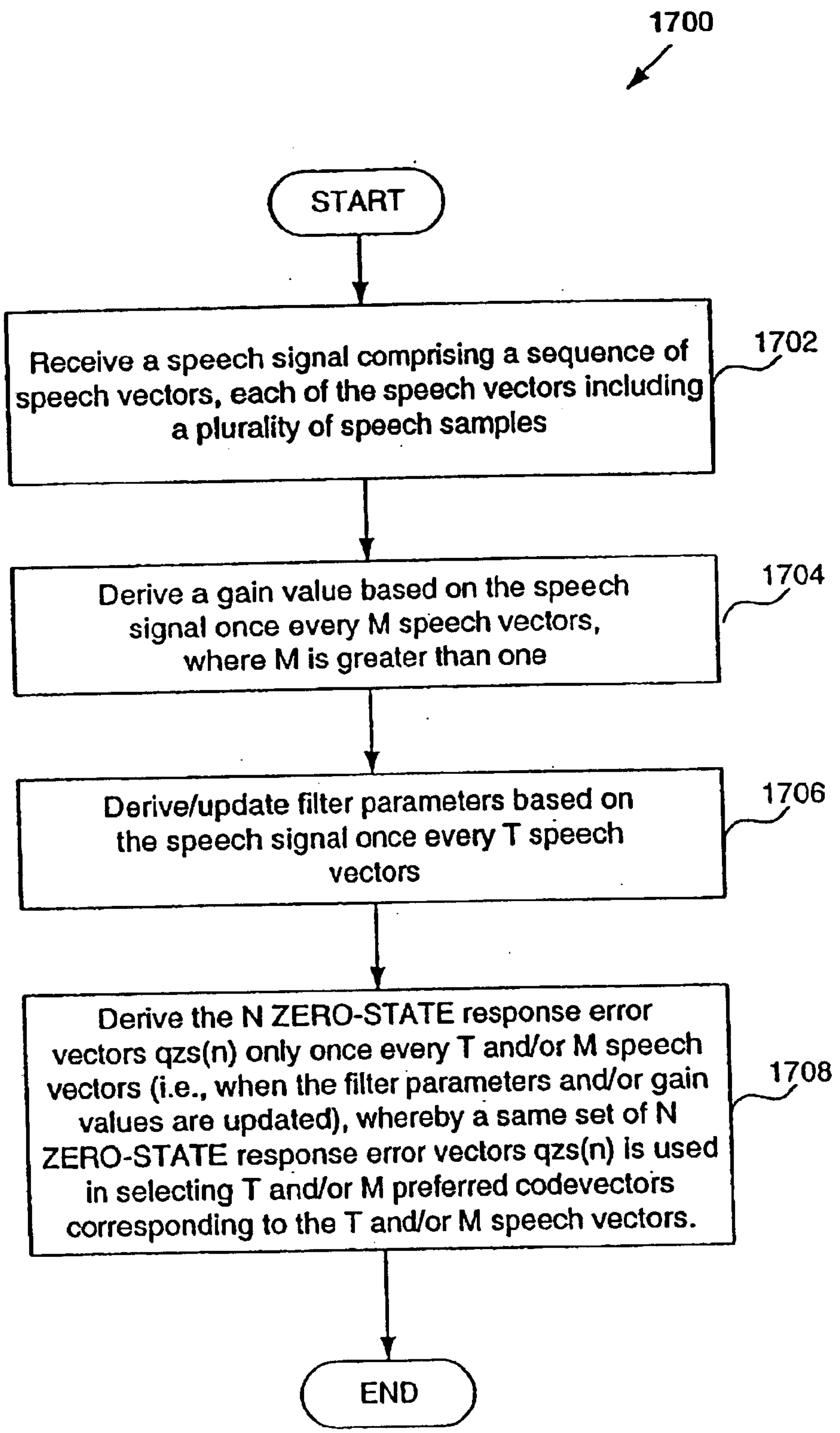
FIG. 17 is a flowchart of an example method of reducing the computational complexity associated with searching a VQ codebook.

FIG. 17 is a flowchart of an example method 1700 of further reducing the computational complexity associated with searching the VQ codebook for a preferred one of the VQ codevectors, in accordance with the above description. In a first step 1702, a speech signal is received. The speech signal comprises a sequence of speech vectors, each of the speech vectors including a plurality of speech samples.

At a next step 1704, a gain value is derived based on the speech signal once every M speech vectors, where M is an integer greater than 1.

At a next step 1706, filter parameters are derived/updated based on the speech signal once every T speech vectors, where T is an integer greater than one, and where T may, but does not necessarily, equal M.

At a next step 1708, the N ZERO-STATE response error vectors qzs(n) are derived once every T and/or M speech vectors (i.e., when the filter parameters and/or gain values are updated, respectively), whereby a same set of N ZERO-STATE response error vectors qzs(n) is used in selecting a plurality of preferred codevectors corresponding to a plurality of speech vectors.

Alternative embodiments of VQ search systems and corresponding methods, including embodiments based on codecs 3000, 4000, and 6000, for example, would be apparent to one of ordinary skill in designing speech codecs, based on the exemplary VQ search system and methods described above.

C. Further Fast VQ Search Embodiments

The present invention provides first and second additional efficient VQ search methods, which can be used independently or jointly. The first method (described below in Section IX.C.1.) provides an efficient VQ search method for a general VQ codebook, that is, no particular structure of the VQ codebook is assumed. The second method (described below in Section IX.C.2.) provides an efficient method for the excitation quantization in the case where a signed VQ codebook is used for the excitation.

The first method reduces the complexity of the excitation VQ in NFC by reorganizing the calculation of the energy of the error vector for each candidate excitation vector, also referred to as a codebook vector. The energy of the error vector is the cost function that is minimized during the search of the excitation codebook. The reorganization is obtained by:

1. Expanding the Mean Squared Error (MSE) term of the error vector;
2. Excluding the energy term that is invariant to the candidate excitation vector; and
3. Pre-computing the energy terms of the ZERO-STATE response of the candidate excitation vectors that are invariant to the sub-vectors of the subframe.

The second method represents an efficient way of searching the excitation codebook in the case where a signed codebook is used. The second method is obtained by reorganizing the calculation of the energy of the error vector in such a way that only half of the total number of codevectors is searched.

The combination of the first and second methods also provides an efficient search. However, there may be circumstances where the first and second methods are used separately. For example, if a signed codebook is not used, then the second invention does not apply, but the first invention may be applicable.

For mathematical convenience, the nomenclature used in Sections IX.C.1. and 2. below to refer to certain quantities differs from the nomenclature used in Section IX.B. above to refer the same or similar quantities. The following key serves as a guide to map the nomenclature used in Section IX.B. above to that used in the following sections.

In Section IX.B. above, quantization energy e(n) refers to a quantization energy derivable from an error vector q(n), where n is a time/sample position descriptor. Quantization energy e(n) and error vector q(n) are both associated with a VQ codevector in a VQ codebook.

Similarly, in Sections IX.C.1. and 2. below, quantization energy $E_n$ refers to a quantization energy derivable from an error vector $q_n(k)$, where k refers to the $k^{th}$ sample of the error vector, and where k=1 . . . K (that is, K is the total number of samples in the error vector). K is referred to as the error vector dimension. Quantization energy $E_n$ and error vector $q_n(k)$ are each associated with an $n^{th}$ VQ codevector of N VQ codevectors (where n=1 . . . N).

In Section IX.B. above, the ZERO-INPUT response error vector is denoted qzi(n), where n is the time index. In Sections IX.C.1. and 2. below, the ZERO-INPUT response error vector is denoted $q_{zi}(k)$, where k refers to the $k^{th}$ sample of the ZERO-INPUT response error vector.

In Section IX.B. above, the ZERO-STATE response error vector is denoted qzs(n), where n is the time index. In Sections IX.C.1. and 2. below, the ZERO-STATE response error vector is denoted $q_{zs,n}(k)$, where n denotes the $n^{th}$ VQ codevector of the N VQ codevectors, and k refers to the $k^{th}$ sample of the ZERO-STATE response error vector.

Also, Section IX.B. above, refers to "frames," for example 5 ms frames, each corresponding to a plurality of speech vectors. Also, multiple bits of side information and VQ codevector indices are transmitted by the coder in each of the frames. In the Sections below, the term "subframe" is taken to be synonymous with "frame" as used in the Sections above. Correspondingly, the term "sub-vectors" refers to vectors within a subframe.

1. Fast VQ Search of General (Unsigned) Excitation Codebook in NFC system a. Straightforward Method The energy, $E_n$, of the error vector, $q_n(k)$, of the $n^{th}$ codevector is given by $$E_n = \sum_{k=1}^{K} (q_n(k))^2, \tag{1}$$

and the optimal codevector, $n_{opt}$, is given by the codevector, n, that minimizes $E_n$, i.e.

$$n_{opt} = \operatorname*{argmin}_{n=1,\dots,N} \{E_n\}, \tag{2}$$

where N is the number of codevectors.

As discussed above in Section IX.B., the error vector, $q_n(k)$, of the $n^{th}$ codevector can be calculated as the superposition of the ZERO-INPUT response, $q_{zi}(k)$, and the ZERO-STATE response, $q_{zs,n}(k)$, of the $n^{th}$ codevector, i.e.

$$q_n(k)=q_{zi}(k)+q_{zs,n}(k). \tag{3}$$

Utilizing this expression, the energy of the error vector, $E_n$, is expressed as $$E_n = \sum_{k=1}^{K} (q_{zi}(k) + q_{zs,n}(k))^2. \tag{4}$$

For an NFC system where the dimension of the excitation VQ, K, is less than the master vector size, $K_M$ (where $K_M$ can be thought of as a frame size or dimension) there will be multiple excitation vectors to quantize per master vector (or frame). The master vector size, $K_M$, is typically the maximum number of samples for which other parameters of the NFC system remain constant. If the relation between the dimension of the VQ, K, and master vector size, $K_M$, is defined as $$L = \frac{K_M}{K}, \tag{5}$$

L VQs would be performed per master vector. According to the analysis and assumptions discussed in Section IX.B.2.b.3. above, the ZERO-STATE responses of the codevectors are unchanged for the L VQs and need only be calculated once (in the case where the gain and/or filter parameters are updated once every L VQs). The calculation of all error vector energies for all codevectors, for all VQs in a master vector will then require $$C_1 = L \cdot N \cdot K \cdot 2 \tag{6}$$

floating point operations, disregarding the calculation of the ZERO-INPUT and ZERO-STATE responses. For the example narrowband and wideband NFC systems described in Section IX.B. above, the parameters of Eq. 6 are L=10, N=32, K=4, and L=10, V=64, K=4, respectively. Consequently, according to Eq. 6 the number of floating point operations required would be $C_{1,nb}$=2560 and $C_{1,wb}$=5120, respectively. The example numbers are summarized in Table 1 below in comparison with the equivalent numbers for the present invention.

b. Fast VQ Search of General Excitation Codebook Using Correlation Technique

In the present first invention the energy of the error vector of a given codevector is expanded into $$\begin{aligned} E_n &= \sum_{k=1}^{K} \left(q_{zi}(k) + q_{zs,n}(k)\right)^2 \\ &= \sum_{k=1}^{K} \left(q_{zi}(k)^2 + q_{zs,n}(k)^2 + 2 \cdot q_{zi}(k) \cdot q_{zs,n}(k)\right) \\ &= \sum_{k=1}^{K} q_{zi}(k)^2 + \sum_{k=1}^{K} q_{zs,n}(k)^2 + 2 \cdot \sum_{k=1}^{K} q_{zi}(k) \cdot q_{zs,n}(k) \\ &= E_{q_{zi}} + E_{q_{zs},n} + R(q_{zi}, q_{zs,n}) \end{aligned} \tag{7}$$

where $$E_{q_{zi}} = \sum_{k=1}^{K} q_{zi}(k)^2, \tag{8}$$

$$E_{q_{zs},n} = \sum_{k=1}^{K} q_{zs,n}(k)^2, \text{ and} \tag{9}$$

$$R(q_{zi}, q_{zs,n}) = 2 \cdot \sum_{k=1}^{K} q_{zi}(k) \cdot q_{zs,n}(k). \tag{10}$$

In Eq. 7 the energy of the error vector is expanded into the energy of the ZERO-INPUT response, Eq. 8, the energy of the ZERO-STATE response, Eq. 9, and two times the cross-correlation between the ZERO-INPUT response and the ZERO-STATE response, Eq. 10.

The minimization of the energy of the error vector as a function of the codevector is independent of the energy of the ZERO-INPUT response since the ZERO-INPUT response is independent of the codevector. Consequently, the energy of the ZERO-INPUT response can be omitted when searching the excitation codebook. Furthermore, since the N energies of the ZERO-STATE responses of the codevectors are unchanged for the L VQs, the N energies need only be calculated once.

Consequently, the VQ operation can be expressed as:

$$\begin{aligned} n_{opt} &= \underset{n=1,\ldots,N}{\operatorname{argmin}} \{E_n\} \\ &= \underset{n=1,\ldots,N}{\operatorname{argmin}} \left\{ \sum_{k=1}^{K} \left(q_{zi}(k) + q_{zs,n}(k)\right)^2 \right\} \\ &= \underset{n=1,\ldots,N}{\operatorname{argmin}} \left\{ \sum_{k=1}^{K} \left(q_{zi}(k)^2 + q_{zs,n}(k)^2 + 2 \cdot q_{zi}(k) \cdot q_{zs,n}(k)\right) \right\} \\ &= \underset{n=1,\ldots,N}{\operatorname{argmin}} \left\{ E_{q_{zi}} + E_{q_{zs},n} + R(q_{zi}, q_{zs,n}) \right\} \\ &= \underset{n=1,\ldots,N}{\operatorname{argmin}} \left\{ E_{q_{zs},n} + R(q_{zi}, q_{zs,n}) \right\} \end{aligned} \tag{11}$$

In Eq. 11 only the cross-correlation term would be calculated inside the search loop. The N zero-response energies, $E_{q_{zs},n}$, n=1, . . . N, would be pre-computed prior to the L VQs as explained above. Using Eq. 9 through Eq. 11 to perform the L VQs would require $$C_2 = N \cdot K + L \cdot N \cdot (K+1) \tag{12}$$

floating point operations for the calculations needed to select codevectors for all L VQs in a master vector, disregarding the calculation of the ZERO-INPUT and ZERO-STATE responses. For the example narrowband and wideband NFC systems mentioned above this would result $C_{2,nb}$=1728 and $C_{2,wb}$=3456 floating point operations, respectively. The example numbers are summarized in Table 1.

For narrowband and wideband NFC systems, generally, a significant reduction in the number of floating point operations is obtained with the invention. However, it should be noted that the actual reduction depends on the parameters of the NFC system. In particular, it is obvious that if the VQ dimension is equal to the dimension of the master vector, i.e. $K=K_M \Leftrightarrow L=1$, there is only one VQ per master vector, and effectively the reuse of the energies of the ZERO-STATE responses is not an issue.

2. Fast VQ Search of Signed Excitation Codebook in NFC System

A second invention devises a way to reduce complexity in the case a signed codebook is used for the excitation VQ. In a signed codebook the code vectors are related in pairs, where the two code vectors in a pair only differ by the sign of the vector elements, i.e. a first and second code vector in a pair, $c_1$ and $c_2$, respectively, are related by $$c_1(k) = -c_2(k), \text{ for k=1, 2, . . . , K}, \tag{13}$$

where K is the dimension of the vectors. Consequently, for a codebook of N codevectors N/2 linear independent codevectors exist. The remaining N/2 codevectors are given by negating the N/2 linear independent codevectors as in Eq. 13. Typically, if B bits are used to represent the N codevectors, i.e. $B=\log_2(N)$, then the sign is represented by 1 bit, and the linear independent codevectors by B−1 bits.

It is only necessary to store the N/2 linear independent codevectors as the remaining N/2 codevectors are easily generated by simple negation. Furthermore, the ZERO-STATE responses of the remaining N/2 codevectors are given by a simple negation of the ZERO-STATE responses of the N/2 linear independent codevectors. Consequently, the complexity of generating the N ZERO-STATE responses is reduced with the use of a signed codebook.

The present second invention further reduces the complexity of searching a signed codebook by manipulating the minimization operation.

a. Straightforward Method

By calculating the energy of the error vectors according to the straightforward method, see Eq. 2 and Eq. 4, the search is given by $$\begin{aligned}(n_{opt}, s_{opt}) &= \underset{(n,s)\in\{1,\ldots,N/2\}\times\{+1,-1\}}{\operatorname{argmin}} \{E_{n,s}\} \\ &= \underset{(n,s)\in\{1,\ldots,N/2\}\times\{+1,-1\}}{\operatorname{argmin}} \left\{\sum_{k=1}^{K} (q_{zi}(k) + s \cdot q_{zs,n}(k))^2\right\} \\ &= \underset{(n,s)\in\{1,\ldots,N/2\}\times\{+1,-1\}}{\operatorname{argmin}} \left\{\sum_{k=1}^{K} (q_{zi}(k) \overset{s}{\pm} q_{zs,n}(k))^2\right\}\end{aligned} \tag{14}$$

where s is the sign and n∈{1, . . . , N/2} represents the N/2 linear independent codevectors. In practice both of the two signs are checked for every of the N/2 linear independent codevectors without applying the multiplication with the sign, which would unnecessarily increase the complexity. The number of floating point operations needed to calculate the energy of the error vector for all of the combined N codevectors for all of the L VQs, would remain as specified by Eq. 6, $$C_1 = L \cdot N \cdot K \cdot 2 \tag{15}$$

Note that this figure excludes the calculations of the ZERO-INPUT and ZERO-STATE responses. Nevertheless, once the ZERO-INPUT and ZERO-STATE responses are calculated the complexity of the remaining operations remains unchanged. The number of floating point operations for the narrowband and wideband example is, as above, $C_{1,nb}=2560$ and $C_{1,wb}=5120$, respectively.

b. Fast VQ Search of Signed Excitation Codebook Using Correlation Technique

Similar to the first invention the term of the energy of the error vector is expanded, except for the further incorporation of the property of a signed codebook.

$$\begin{aligned}E_{n,s} &= \sum_{k=1}^{K} (q_{zi}(k) \overset{s}{\pm} q_{zs,n}(k))^2 \\ &= \sum_{k=1}^{K} \left(q_{zi}(k)^2 + (\overset{s}{\pm} q_{zs,n}(k))^2 \overset{s}{\pm} 2 \cdot q_{zi}(k) \cdot q_{zs,n}(k)\right) \\ &= \sum_{k=1}^{K} q_{zi}(k)^2 + \sum_{k=1}^{K} q_{zs,n}(k)^2 \overset{s}{\pm} 2 \cdot \sum_{k=1}^{K} q_{zi}(k) \cdot q_{zs,n}(k) \\ &= E_{q_{zi}} + E_{q_{zs},n} \overset{s}{\pm} R(q_{zi}, q_{zs,n})\end{aligned} \tag{16}$$

where s is the sign and n∈{1, . . . ,N/2} represents the N/2 linear independent codevectors. In Eq. 16 the energy of the error vector is examined for a pair of codevectors in the signed codebook. According to Eq. 16 the energy of the error vector can be expanded into the energy of the ZERO-INPUT response, Eq. 8, the energy of the ZERO-STATE response, Eq. 9, and two times the cross-correlation between the ZERO-INPUT response and the ZERO-STATE response, Eq. 10. The sign of the cross-correlation term depends on the sign of the codevector. The minimization of the energy of the error vector as a function of the codevector is independent of the energy of the ZERO-INPUT response since the ZERO-INPUT response is independent of the codevector. Consequently, the energy of the ZERO-INPUT response can be omitted when searching the excitation codebook, and the search is given by $$\begin{aligned}(n_{opt}, s_{opt}) &= \underset{(n,s)\in\{1,\ldots,N/2\}\times\{+1,-1\}}{\operatorname{argmin}} \{E_{n,s}\} \\ &= \underset{(n,s)\in\{1,\ldots,N/2\}\times\{+1,-1\}}{\operatorname{argmin}} \left\{\sum_{k=1}^{K} (q_{zi}(k) + s \cdot q_{zs,n}(k))^2\right\} \\ &= \underset{(n,s)\in\{1,\ldots,N/2\}\times\{+1,-1\}}{\operatorname{argmin}} \left\{\sum_{k=1}^{K} (q_{zi}(k) \overset{s}{\pm} q_{zs,n}(k))^2\right\} \\ &= \underset{(n,s)\in\{1,\ldots,N/2\}\times\{+1,-1\}}{\operatorname{argmin}} \left\{E_{q_{zi}} + E_{q_{zs},n} \overset{s}{\pm} R(q_{zi}, q_{zs,n})\right\} \\ &= \underset{(n,s)\in\{1,\ldots,N/2\}\times\{+1,-1\}}{\operatorname{argmin}} \left\{E_{q_{zs},n} \overset{s}{\pm} R(q_{zi}, q_{zs,n})\right\}\end{aligned} \tag{17}$$

From Eq. 17 it is evident that if a pair of codevectors, i.e. s=±1, are considered jointly, the two minimization terms, $E_{n,s=+1}$ and $E_{n,s=-1}$ are given by $$E_{n,s=+1} = E_{q_{zs},n} + R(q_{zi}, q_{zs,n}), \text{ and} \tag{18}$$

$$E_{n,s=-1} = E_{q_{zs},n} - R(q_{zi}, q_{zs,n}), \tag{19}$$

respectively. Evidently, if the cross-correlation term $R(q_{zi}, q_{zs,n})$ is less than zero, the codevector with the positive sign will provide a smaller minimization term and only $E_{n,s=+1}$ needs to be computed and checked. Otherwise, if the cross-correlation term $R(q_{zi}, q_{zs,n})$ is greater than zero, the codevector with the negative sign will provide a smaller minimization term and only $E_{n,s=-1}$ needs to be computed and checked. If the cross-correlation term is zero, either of the two can be checked since the two signs will provide identical minimization terms. Consequently, the search can be specified as $$(n_{opt}, s_{opt}) = \underset{n\in\{1,\ldots,N/2\}}{\operatorname{argmin}} \begin{cases} \text{if } (R(q_{zi}, q_{zs,n}) < 0) & \{E_{n,s} = E_{q_{zs},n} + R(q_{zi}, q_{zs,n});\ s = +1;\} \\ \text{else} & \{E_{n,s} = E_{q_{zs},n} - R(q_{zi}, q_{zs,n});\ s = -1;\} \end{cases} \tag{20}$$

where the less-than sign is interchangeable with a less-than-or-equal sign. The number of floating point operations needed to calculate the energy of the error vector for all of the combined N codevectors for all of the L VQs according to the search specified by Eq. 20 is $$\begin{aligned}C_3 &= L \cdot N/2 \cdot (2 \cdot K + 1) \\ &= L \cdot N \cdot (K + 1/2)\end{aligned} \tag{21}$$

Again, disregarding the calculation of the ZERO-INPUT and ZERO-STATE responses. The number of floating point operations for the example narrowband and wideband NFC systems is $C_{3,nb}=1440$ and $C_{3,wb}=2880$, respectively. The example numbers are summarized in Table 1.

This method would also apply to a signed sub-codebook within a codebook, i.e. a subset of the code vectors of the codebook make up a signed codebook. It is then possible to apply the invention to the signed sub-codebook.

3. Combination of Efficient Search Methods

If the number of VQs per master vector, L, is greater than one, and a signed codebook (or sub-codebook) is used it is advantageous to combine the two methods above. In this case the energies of zero-responses, $E_{q_{zs},n}$, n=1, . . . N/2, in Eq. 20 remains unchanged for the L VQs and are precalculated according to the first method. The number of floating point operations needed to calculate the energy of the error vector for all of the combined N codevectors for all of the L VQs is $$C_4 = N/2 \cdot K + L \cdot N/2 \cdot (K+1) \quad (22)$$
$$= 1/2 \cdot (N \cdot K + L \cdot N \cdot (K+1)).$$

For the example narrowband and wideband NFC systems the number of floating point operations $C_{4,nb}$=864 and $C_{4,wb}$=1728, respectively. The example numbers are summarized in Table 1.

4. Method Flow Charts

The methods of the present invention, described in Sections IX.C.1. and 2., are used in an NFC system to quantize a prediction residual signal. More generally, the methods are used in an NFC system to quantize a residual signal. That is, the residual signal is not limited to a prediction residual signal, and thus, the residual signal may include a signal other than a prediction residual signal. The prediction residual signal (and more generally, the residual signal) includes a series of successive residual signal vectors. Each residual signal vector needs to be quantized. Therefore, the methods of the present invention search for and select a preferred one of a plurality of candidate codevectors corresponding to each residual vector. Each preferred codevector represents the excitation VQ of the corresponding residual signal vector.

Figure 18:
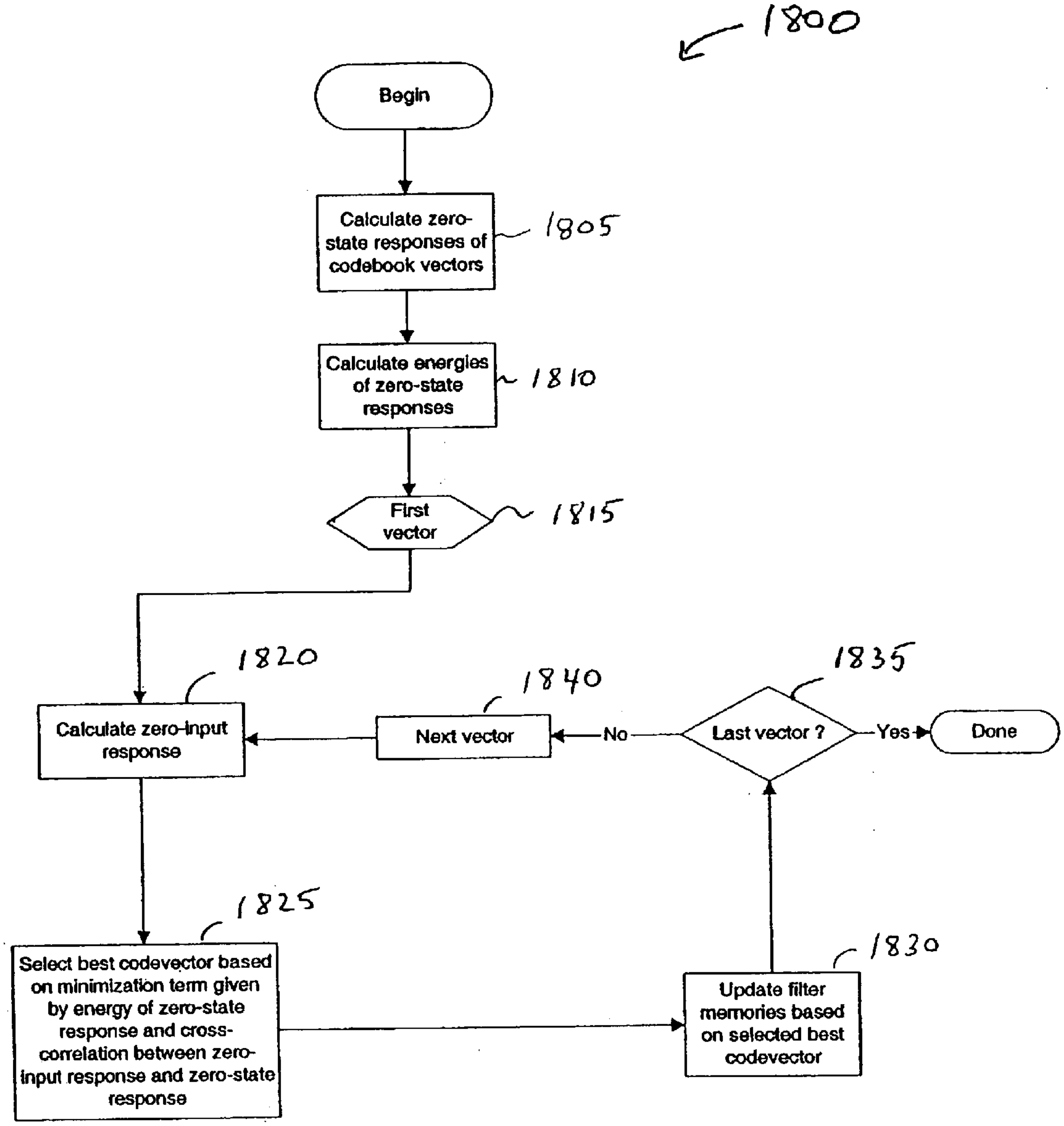
FIG. 18 is a flow chart of an example method of quantizing multiple vectors in a master vector using correlation techniques, according to the present invention.

FIG. 18 is a flow chart of an example method 1800 of quantizing multiple vectors, for example, residual signal vectors, in a master vector (or frame), according to the correlation techniques described in Sections IX.C.1 and IX.C.2. Method 1800 is implemented in an NFC system. For example, method 1800 is useable with the exemplary NFC systems, structures, and methods described in connection with FIGS. 1–17, to the extent excitation VQ is used in these systems, structures, and methods. Each of these NFC systems includes at least one noise feedback loop/filter to shape coding noise.

In one arrangement, method 1800 uses an unsigned or general VQ codebook including N unsigned candidate codevectors (see Section IX.C.1.b. above).

In another arrangement, method 1800 uses a signed VQ codebook including N signed candidate codevectors (see Section IX.C.2.b above). For example, the signed VQ codebook represents a product of:

- a shape code, $C_{shape}\{c_1, c_2, c_3, \ldots c_{N/2}\}$, including N/2 shape codevectors $c_n$, and
- a sign code, $C_{sign}=\{+1, -1\}$, including a pair of oppositely-signed sign values +1 and −1, such that a positive codevector and a negative codevector (referred to as the signed codevectors) associated with each shape codevector $c_n$ each represent a product of the shape codevector and a corresponding one of the sign values. Thus, the N/2 shape codevectors, when combined with the sign code, correspond to N signed codevectors. That is, first and second oppositely signed codevectors are associated with each on the shape codevectors.

Method 1800 assumes there are L vectors in the master vector (or frame) and that the ZERO-STATE responses of the N codevectors (which may be signed or unsigned, as mentioned above) are invariant over the L vectors, because gain and/or filter parameters in the NFC system are updated only once every L vectors.

At a first step 1805, N ZERO-STATE responses, each corresponding to a respective one of the N codebook vectors, are calculated. The N ZERO-STATE responses may be calculated using the NFC filter structures of FIGS. 15A and 16A, and associated methods, for example.

At a next step 1810, N ZERO-STATE energies, corresponding to the N ZERO-STATE responses of step 1805, are calculated.

At a next step 1815, an initial one of the L vectors in the frame to be quantized is identified.

Next, a loop including steps 1820, 1825, 1830, 1835 and 1840 is repeated for each of the vectors to be quantized in the frame. Each iteration of the loop produces an excitation VQ corresponding to a successive one of the vectors in the frame, beginning with the initial vector. At first step 1820 of the loop, a ZERO-INPUT response corresponding to the given (that is, identified) vector is calculated. For example, in the first iteration of the loop, a ZERO-INPUT response corresponding to the first vector in the frame is calculated. The ZERO-INPUT response may be calculated using the NFC filter structure described above in connection with FIG. 14C, and methods associated therewith, for example.

At a next step 1825, a best or preferred codevector is selected from among the N codevectors based on minimization terms. The minimization terms are derived based on the N ZERO-STATE energies from step 1810, and cross-correlations between the ZERO-INPUT response from step 1820 and ZERO-STATE responses from step 1805. In the arrangement of method 1800 using unsigned codevectors, step 1825 is governed by Eq. 11 of Section IX.C.1.b. above. In the arrangement of method 1800 using signed codevectors, step 1825 is governed by Eq. 20 of Section IX.C.2.b. above. Step 1825 is described further below in connection with FIGS. 19 and 20.

At a next step 1830, filter memories in the NFC system used to implement method 1800 are updated using the best or preferred codevector selected in step 1825.

At a decision step 1835, it is determined whether a last one of the vectors in the frame has been quantized. If yes, then the method is done. On the other hand, if further vectors in the frame remain to be quantized, flow proceeds to a step 1840, and a next one of the vectors to be quantized in the frame is identified. The quantization loop repeats for the next vector, and so on, for each of the L vectors in the frame.

Figure 19:
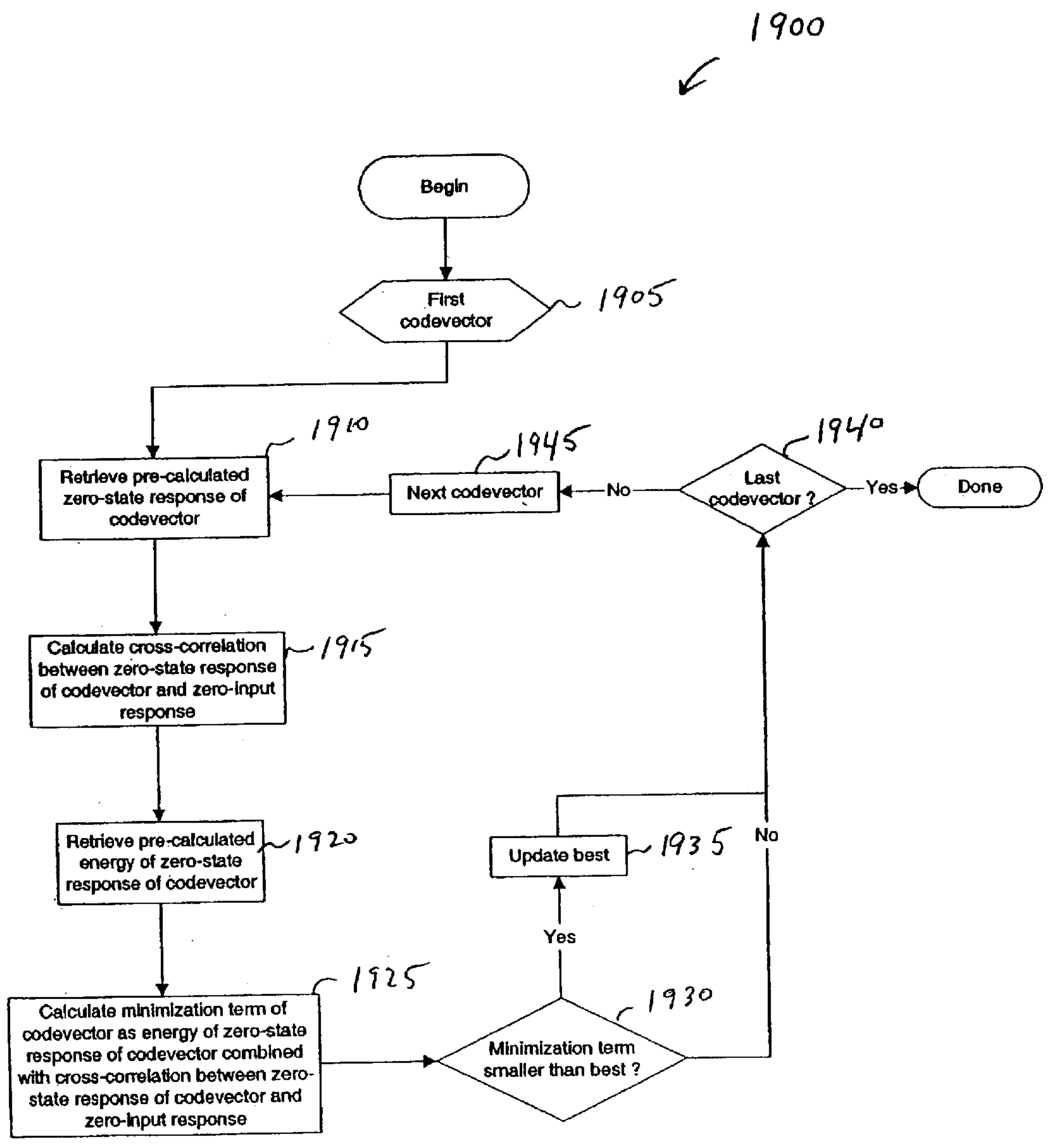
FIG. 19 is a flowchart of an example method using an unsigned VQ codebook, expanding on the method of FIG. 18.

FIG. 19 is a flowchart of an example method 1900 expanding on step 1825 of FIG. 18, using a general, or unsigned VQ codebook. In other words, method 1900 corresponds to a VQ search of an unsigned VQ codebook, as described in Section IX.C.1.b., above. Method 1900 represents a search of the N candidate codevectors in the codebook to select the preferred codevector to be used as the excitation quantization in step 1825. At a first step 1905, a first one of the N codevectors to be examined/tested is identified. Next, a search loop, including steps 1910 through 1945, is repeated for each of the N codevectors, beginning with the first codevector identified in step 1905.

At initial step 1910 of the loop, one of the ZERO-STATE responses calculated in step 1805 is retrieved. The retrieved ZERO-STATE response corresponds to the codevector being tested during the current iteration of the search loop. For example, the first time through the loop, the ZERO-STATE response corresponding to the first codevector is retrieved.

At a next step 1915, a cross-correlation between the ZERO-STATE response and the ZERO-INPUT response (from step 1820) is calculated. The cross-correlation produces a correlation term (also referred to as a "correlation result").

At a next step 1920, the ZERO-STATE energy, corresponding to the ZERO-STATE response of step 1910, is retrieved.

At a next step 1925, a minimization term, corresponding to the codevector being tested in the current iteration of the search loop, is calculated. The minimization term is based on the retrieved ZERO-STATE energy, and a cross-correlation between the ZERO-STATE response of the codevector being tested and the ZERO-INPUT response. The ZERO-STATE energy and the cross-correlation term are combined (for example, the ZERO-STATE energy and cross-correlation term are added as in Eq. 11, and as in Eq. 20 when the cross-correlation term is negative).

At next steps 1930 and 1935, the current minimization term (just calculated in step 1925) is compared to the minimization terms resulting from previous iterations through the search loop, to identify a current best minimization term from among all of the minimization terms calculated thus far. The codevector corresponding to this current best minimization term is also identified.

At a next step 1940, it is determined whether a last one of the N codevectors has been tested. If yes, then the method is done because the codebook has been searched, and a preferred codevector has been determined, however, if no, at step 1945, then a next one of the N codevectors to be tested is identified, and the search loop is repeated.

Assuming N iterations of the loop in method 1900 for each vector to be quantized, then method 1900 performs the following steps:

- deriving N correlation values using the NFC system (step 1915), each of the N correlation values corresponding to a respective one of the N VQ codevectors;
- combining each of the N correlation values with a corresponding one of N ZERO-STATE energies of the NFC system (step 1925), thereby producing N minimization values each corresponding to a respective one of the N VQ codevectors; and
- selecting a preferred one of the N VQ codevectors based on the N minimization values (steps 1930 and 1935), whereby the preferred VQ codevector is usable as an excitation quantization corresponding to a prediction residual signal (and more generally, to a residual signal) derived from a speech or audio signal.

Since the prediction residual signal (more generally, the residual signal) includes a series of prediction residual vectors (more generally, a series of residual vectors), and method 1900 is repeated for each of the residual vectors in accordance with method 1800, overall the method produces an excitation quantization corresponding to each of the prediction residual vectors (and more generally, to each of the residual vectors).

Figure 20:
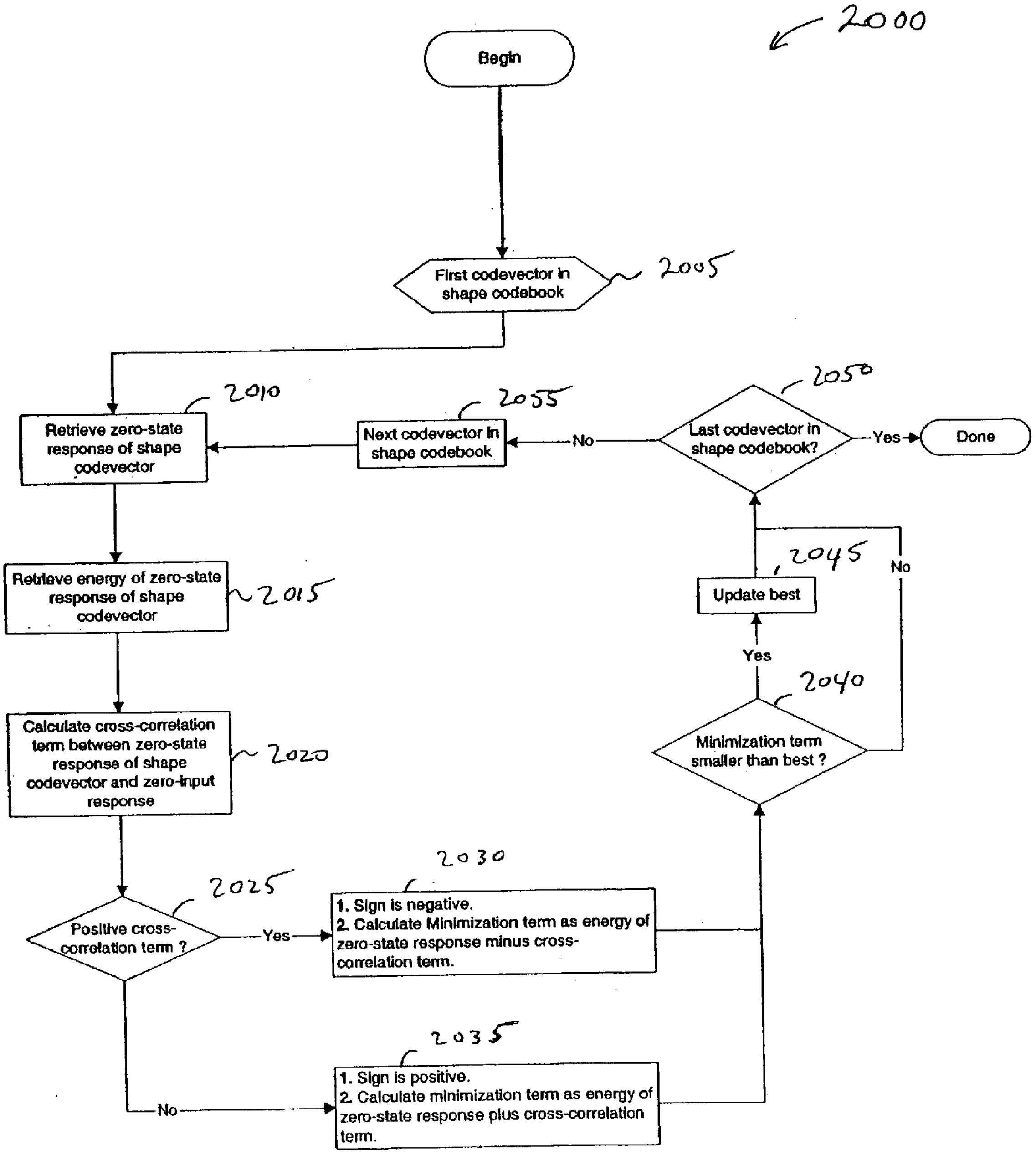
FIG. 20 is a flow chart of an example method using a signed VQ codebook, expanding on the method of FIG. 18.

FIG. 20 is a flow chart of an example method 2000 expanding on step 1825, using a signed VQ codebook. Therefore, method 2000 quantizes vectors according to the techniques described in Section IX.C.2.b. above, and thus corresponds to a VQ search of a signed codebook. Method 2000 reduces search complexity even in the case where there is only one vector per frame, that is, where L=1. In this case, the ZERO-STATE responses of the signed codevectors are calculated for each residual vector to be quantized, rather than once every several residual vectors (that is, when L is greater than 1).

In a first step 2005, a first shape codevector to be tested (for example, codevector $c_1$) in the shape codebook is identified.

At a next step 2010, the ZERO-STATE response of the shape codevector is retrieved.

At a next step 2015, the energy of the ZERO-STATE response of step 2010 is retrieved.

At a next step 2020, a cross-correlation term between the ZERO-STATE response of the shape codevector and the ZERO-INPUT response is calculated. The sign of the cross-correlation term may be a first value (for example, negative) or a second value (for example, positive).

At a next step 2025, the sign value of the cross-correlation term is determined. For example, it is determined whether the cross-correlation term is positive. If yes (the cross-correlation term is positive), then at step 2030, a minimization term is calculated as the energy of the ZERO-STATE response minus the cross-correlation term. In block 2030, the phrase "sign is negative" indicates block 2030 corresponds to the negative codevector. Thus, arriving at block 2030 indicates the negative codevector is the preferred one of the negative and positive codevectors corresponding to the current shape codevector (see Eq. 20 of Section IX.C.2.b. above).

On the other hand, if the cross-correlation term is negative, then at step 2035, the minimization term is calculated as the energy of the ZERO-STATE response plus the cross-correlation term. In block 2035, the phrase "sign is positive" indicates block 2035 corresponds to the positive codevector. Thus, arriving at block 2035 indicates the positive codevector is the preferred one of the negative and positive codevectors corresponding to the current shape codevector.

Next, steps 2040 and 2045 determine the best current minimization term among all of the minimization terms calculated so far, and also, identify the signed codevector associated with the best current minimization term.

At a next step 2050, it is determined whether the last codevector in the shape codebook has been tested. If yes, then the search is completed and the preferred shape codevector and its sign have been determined. If no, then at step 2055, the next shape codevector to be tested in the shape codebook is identified.

In an alternative arrangement of method 2000, it is not assumed that the ZERO-STATE responses and their corresponding energies have been precalculated. In this alternative arrangement, the ZERO-STATE response and ZERO-STATE energy corresponding to each shape codevector is calculated within each iteration of the search loop, using additional method steps.

Assuming N iterations of the loop in method 2000, method 2000 performs the following steps for each vector to be quantized:

for each shape codevector (a) deriving a correlation term corresponding to the shape codevector where at least one filter structure of the NFC system has been used to generate the signals for the correlation (step 2020);

(b) deriving a first minimization value corresponding to the positive codevector associated with the shape codevector when a sign of the correlation term is a first value (steps 2025 and 2030); and (c) deriving a second minimization value corresponding to the negative codevector associated with the shape codevector when a sign of the correlation term is a second value (steps 2025 and 2035); and selecting a preferred codevector from among the positive and negative codevectors corresponding to minimization values derived in steps (b) and (c) based on the minimization values (steps 2045 and 2040).

Example methods 1900 and 2000 each derive a minimization term corresponding to a codevector in each iteration of their respective search loops. In alternative arrangements of Methods 1900 and 2000, all of the minimization terms may be calculated in a single step, followed by a single step search through all of these minimization terms to select the preferred minimization term, and corresponding codevector.

5. Comparison of Search Method Complexities

This section provides a summary and comparison of the number of floating point operations that is required to perform the L VQs in a master vector for the different methods. The comparison assumes that the same techniques are used to obtain the ZERO-INPUT response and ZERO-STATE responses for the different methods, and thus, that the complexity associated herewith is identical for the different methods. Consequently, this complexity is omitted from the estimated number of floating point operations. The different methods are mathematically equivalent, i.e., all are equivalent to an exhaustive search of the codevectors. The comparison is provided in Table 1, which lists the expression for the number of floating point operations as well as the number of floating point operations for the example narrow-band and wideband NEC systems. In the table the first and second inventions are labeled "Pre-computation of energies of ZERO-STATE responses" and "signed codebook search", respectively.

TABLE 1

Comparison of the number of floating point operations for the different methods.

| Method | Application | Expression | Example narrowband L = 10, N = 32, K = 4 | Example wideband L = 10, N = 64, K = 4 |
|---|---|---|---|---|
| Straightforward Method | Any codebook | $C_1 = L \cdot N \cdot K \cdot 2$ | 2560 | 5120 |
| Pre-Computation of Energies of Zero-State Responses | Any codebook | $C_2 = N \cdot K + L \cdot N \cdot (K + 1)$ | 1728 | 3456 |
| Signed Codebook Search | Signed codebook | $C_3 = L \cdot N \cdot (K + 1/2)$ | 1440 | 2880 |
| Pre-Computation of Energies of Zero-State Responses Signed Codebook Search | Signed codebook | $C_4 = 1/2 \cdot (N \cdot K + L \cdot N \cdot (K + 1))$ | 864 | 1728 |

It should be noted that the sign of the cross-correlation term in Eq. 7, 11, 16, 17, 18, 19, and 20 is opposite in some NFC systems due to alternate sign definitions of the signals. It is to be understood that this does not affect the present invention fundamentally, but will simply result in proper sign changes in the equations and methods of the invention.

D. Further Embodiments Related to VQ Searching in NFC with Generalized Noise Shaping 1. Overview This Section (Section IX.D.) presents efficient methods related to excitation quantization in noise feedback coding where the short-term shaping of the coding noise is generalized. The methods are based in part on separating an NFC quantization error signal into ZERO-STATE and ZERO-INPUT response contributions. Additional new parts are developed and presented in order to accommodate a more general shaping of the coding noise while providing efficient excitation quantization. This includes an efficient method of calculating the ZERO-STATE response with the generalized noise shaping, and an efficient method for updating the filter memories of the noise feedback coding structure with the generalized noise shaping, as will be described below. Although the methods of this section are describe by way of example in connection with NFC system/coder 6000 of FIG. 6, they may be applied more generally to any NFC systems, or other coding systems.

The inventions in this section are described in connection with NFC "structures" or "systems" depicted in FIGS. 21–28. It is to be understood that such structures/systems also equivalently represent processes or methods, because the processing blocks or modules depicted in FIGS. 21–28, such as filters, adders, and so on, can be considered as process/method step descriptors. For example, filter and adder blocks can be considered as descriptors for method steps including filtering and adding of signals, as would be apparent to one of skill in the relevant art(s).

The NFC systems depicted in FIGS. 21–28 operate generally in a manner similar to that described in connection with previous Sections, and apparent to one of ordinary skill in the relevant art(s) after having read the present description. Thus, the operation of the NFC systems depicted in FIGS. 21–28 will not be described herein in detail.

Figure 21:
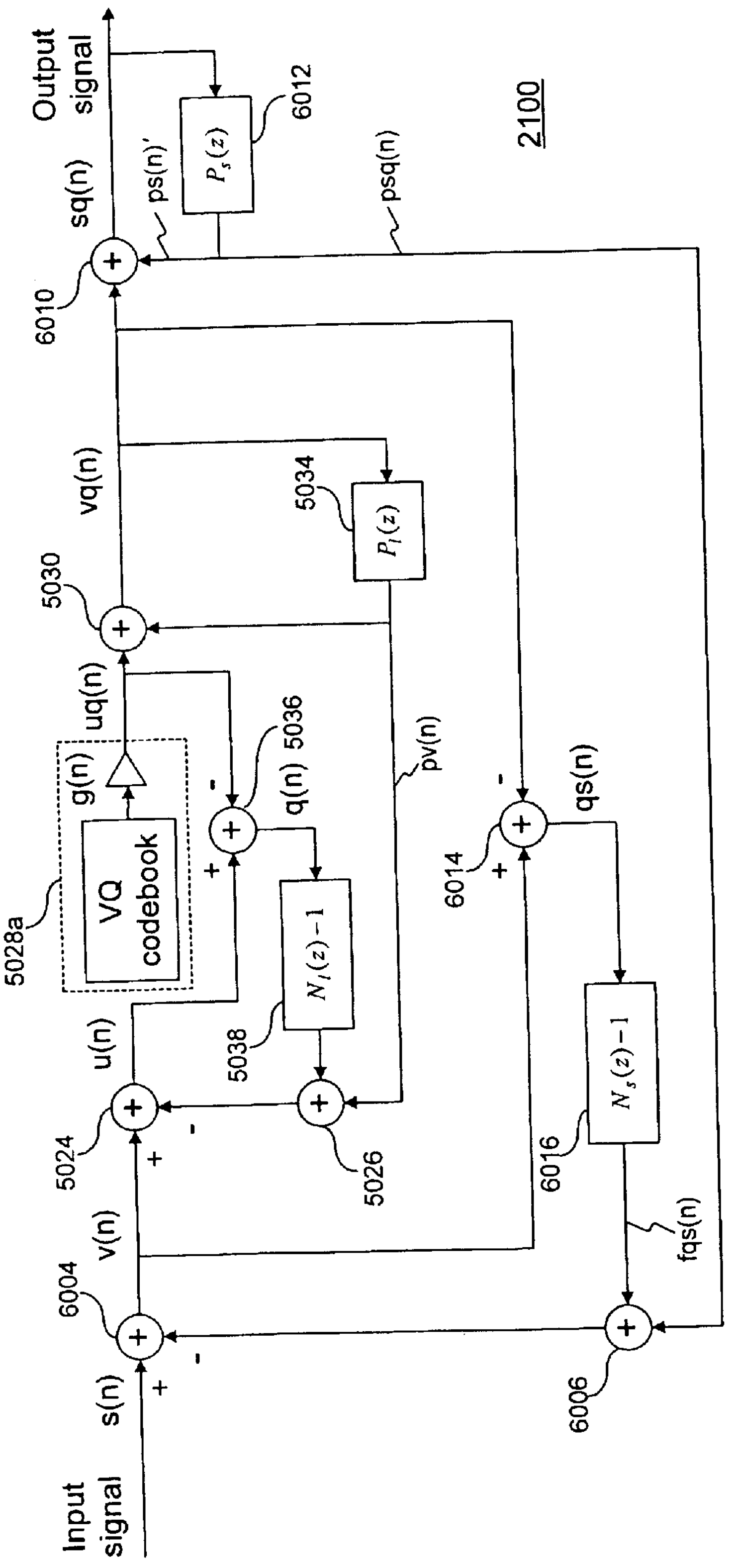
FIG. 21 is a diagram of an example NFC system used for excitation quantization corresponding to the NFC system of FIG. 6.

FIG. 21 is a diagram of an example NFC system/coder 2100 used for excitation quantization (for example, a VQ search) in NFC 6000 of FIG. 6. NFC system 2100 represents, and is also referred to herein as an NF filter structure 2100. NFC system 2100 includes short-term predictor/prediction, $P_s(z)$ (6012), long-term predictor/prediction, $P_l(z)$ (5034), short-term noise shaping filter, $N_s(z)$ (representing a portion of noise feedback filter 6016), and long-term noise shaping filter, $N_l(z)$ (representing a portion of noise feedback filter 5038).

For convenience, the description and mathematical analyses in this section identify/label filters in accordance with such labels as $P_s(z)$, $P_l(z)$, $N_s(z)$, $N_l(z)$, which also identify the corresponding filter responses or transfer functions of the filters. Filter labels include the subscripts "s" and "l" to indicate "short-term" and "long-term," respectively. This Section includes a slight change in the filter (and filter response) naming convention used in previous Sections. Namely, the "s" and "l" indicators were not subscripted in the FIGs. discussed in connection with previous Sections herein, but are subscripted in FIGS. 21–28 for consistency with the ensuing description directed to these FIGs. In other words filters $P_s(z)$, $P_l(z)$, $N_s(z)$ and $N_l(z)$ correspond to filters Ps(z), Pl(z), Ns(z) and Nl(z) described in previous Sections.

The short-term noise feedback filter, $$F_s(z)=N_s(z)-1 \text{ (where } F_s(z) \text{ is the response of filter } \mathbf{6016}), \quad (23)$$

will shape the coding noise, i.e. quantization error, according to the filter response of $N_s(z)$. This provides for a flexible control of the coding noise, where masking effects of the human auditory system can be exploited. The short-term noise shaping filter, $N_s(z)$, is specified as a pole-zero filter $$N_s(z) = \frac{T(z)}{U(z)}, \tag{24}$$

where the zero- and pole-sections are given by $$T(z) = \sum_{i=0}^{K_T} t_i \cdot z^{-i}, \tag{25}$$

and $$U(z) = \sum_{i=0}^{K_U} u_i \cdot z^{-i}, \tag{26}$$

respectively. The symbols $K_T$ and $K_U$ denote the filter orders of the zero- and pole-section, respectively, and $t_i$, i=0,1, . . . ,$K_T$, and $u_i$, i=0,1, . . . , $K_U$, denote the filter coefficients of the zero- and pole-section, respectively.

The short-term noise shaping filter, $N_s(z)$, can be effectively controlled by linking the pole- and zero-sections to the spectral envelope of the input signal by means of a short-term Linear Predictor Coefficient (LPC) analysis. The short-term LPC analysis results in a prediction error filter given by, $$A(z) = 1 - \sum_{i=1}^{N_{NFF}} a_i \cdot z^{-1}, \tag{27}$$

where $N_{NFF}$ is the order of the short-term LPC analysis, and $a_i$, i=1,2, . . . , $N_{NFF}$, are the prediction coefficients. The short-term noise shaping filter, $N_s(z)$, is specified as $$N_s(z) = \frac{A(z/\gamma_z)}{A(z/\gamma_P)}, \tag{28}$$

where $0 \leqq \gamma_z \leqq \gamma_P \leqq 1$ control the short-term noise shaping, example values are $\gamma_z=0.5$, $\gamma_p=0.85$. With the short-term noise shaping filter of Eq. 28, the short-term noise feedback filter takes the form (that is, has a filter response)

$$\begin{aligned} F_s(z) &= N_s(z) - 1 \\ &= \frac{A(z/\gamma_z)}{A(z/\gamma_P)} - 1 \\ &= \frac{A(z/\gamma_z) - A(z/\gamma_P)}{A(z/\gamma_P)} \\ &= \frac{\sum_{i=1}^{N_{NFF}} a_i \cdot (\gamma_p^i - \gamma_z^i) \cdot z^{-i}}{1 - \sum_{i=1}^{N_{NFF}} a_i \cdot \gamma_p^i \cdot z^{-i}} \\ &= \frac{F_{sz}(z)}{F_{sp}(z)} \end{aligned} \tag{29}$$

where the zero- and pole-sections are given by $$F_{sz}(z) = \sum_{i=1}^{N_{NFF}} a_i \cdot (\gamma_p^i - \gamma_z^i) \cdot z^{-i} \tag{30}$$

and $$F_{sp}(z) = 1 - \sum_{i=1}^{N_{NFF}} a_i \cdot \gamma_p^i \cdot z^{-i}, \tag{31}$$

respectively.

Figure 22:
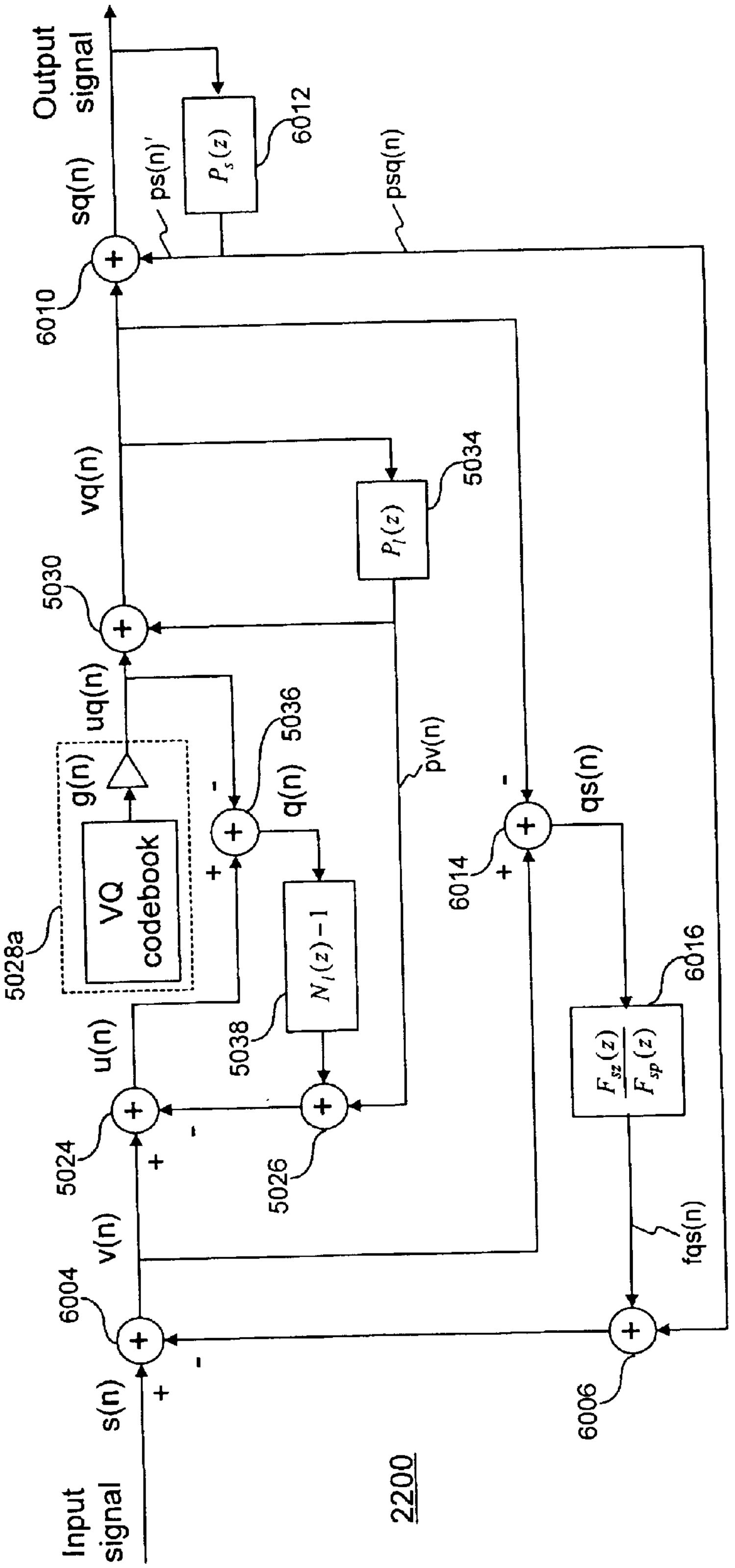
FIG. 22 is a diagram of an example NFC system corresponding to the NFC system of FIG. 21.

FIG. 22 is an example NFC system 2200 including such a short-term noise feedback filter (6016). The only difference between FIG. 21 and FIG. 22 is the different form of the filter response indicated inside the box corresponding to noise feedback filter 6016.

The efficient excitation quantization method described in this Section includes four steps:

1. a ZERO-STATE calculation;
2. a ZERO-INPUT calculation;
3. a Codebook search (VQ); and
4. a Filter memory update process.

2. ZERO-STATE Calculation

NFC system 2100 of FIG. 21 (and system 2200 of FIG. 22) is operable in a ZERO-STATE configuration and a ZERO-INPUT configuration. The ZERO-STATE configuration is obtained/derived by zeroing the contents of the memories of the filters in NFC system 2100. On the other hand, the ZERO-INPUT configuration is obtained by applying a null or zero VQ codevector to NFC system 2100.

Figure 23:
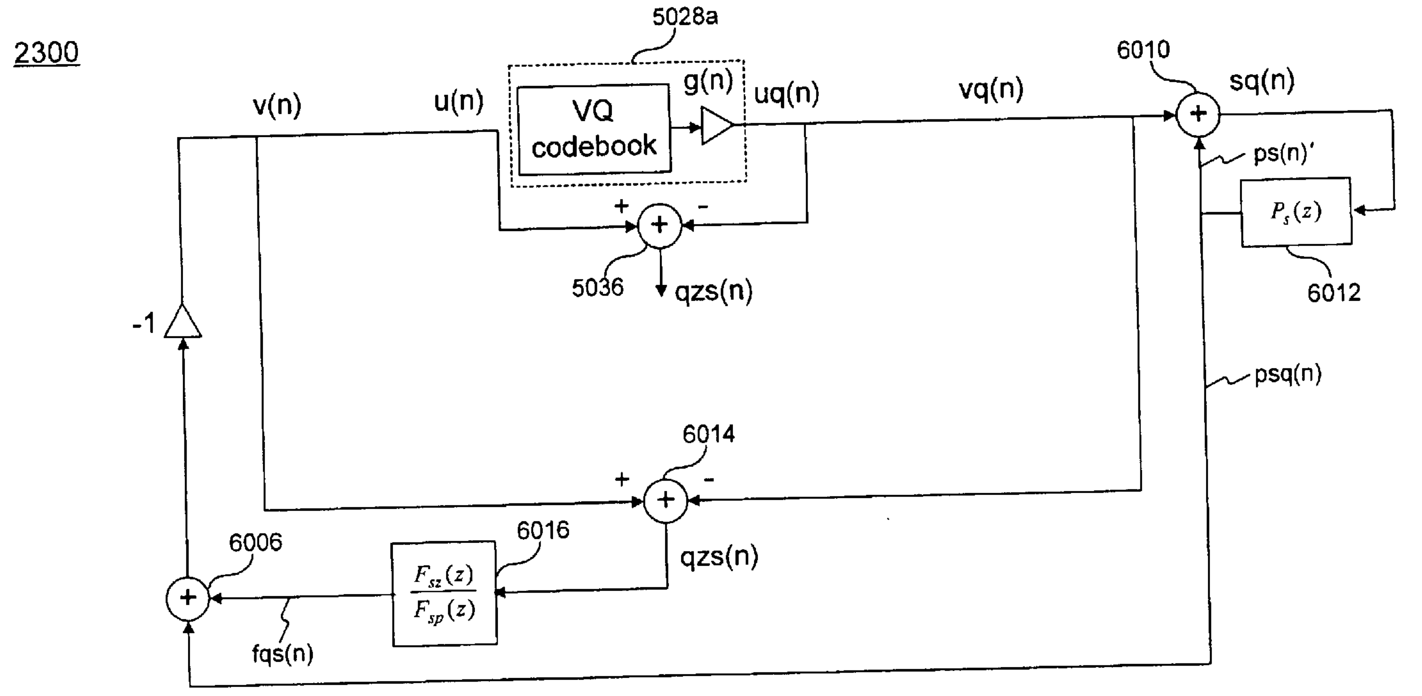
FIG. 23 is a diagram of an example ZERO-STATE filter structure corresponding to the NFC system of FIGS. 21 and 22.

FIG. 23 is an example ZERO-STATE configuration 2300 corresponding to NFC system 2100. This ZERO-STATE configuration is also equivalently referred to as a ZERO-STATE response filter structure 2300 and a ZERO-STATE filter structure 2300. ZERO-STATE filter structure 2300 is used to calculate the ZERO-STATE response, $q_{zs}(n)$, of NFC system 2100, for each of N VQ codevectors. The N VQ codevectors could be stored in a VQ codebook, or they could be a function of multiple contributions, e.g. a product code such as the sign-shape code/signed codebook of section IX.C. The complexity of calculating this ZERO-STATE response can be reduced using a ZERO-STATE filter structure 2400 depicted in FIG. 24. This is because ZERO-STATE filter structure 2300 can be reduced to the equivalent and less complex filter structure 2400, where $$\begin{aligned} H(z) &= -\frac{1}{N_s(z)\cdot(1-P_s(z))} \\ &= -\frac{A(z/\gamma_P)}{A(z/\gamma_z)\cdot A_q(z)} \\ &= -\frac{1 - \sum_{i=1}^{N_{NFF}} a_i \cdot \gamma_p^i \cdot z^{-i}}{\left(1 - \sum_{i=1}^{N_{NFF}} a_i \cdot \gamma_z^i \cdot z^{-i}\right)\cdot\left(1 - \sum_{i=1}^{N} \alpha_i \cdot z^{-i}\right)}, \end{aligned} \tag{32}$$

where $$\begin{aligned} A_q(z) &= 1 - P_s(z) \\ &= 1 - \sum_{i=1}^{N} \alpha_i \cdot z^{-i}, \end{aligned} \tag{33}$$

is the prediction error filter of the quantized LPC, and N is the order of the quantized LPC, which could be different from the order of the LPC for the short-term noise shaping filter, $N_{NFF}$. Using a ZERO-STATE filter structure (such as structure 2300 or 2400) to calculate a ZERO-STATE response corresponds to operating the NFC system (for example, NFC system 6000/2100) in the ZERO-STATE condition. In other words, NF system 6000/2100 is operable in the ZERO-STATE condition.

As mentioned above, the filter memories of the various filters of the ZERO-STATE filter structure 2300 are initialized to zero before calculation of the ZERO-STATE response of each VQ codevector , per definition, and the filter operation given by the ZERO-STATE filter structure 2300 can advantageously be transformed to an equivalent low order all-zero filter operation. In other words ZERO-STATE filter structure 2300 of FIG. 23, including multiple filters (for example, filters 6012 and 6016), is transformed to a filter structure 2400 of FIG. 24 including only a single finite order all-zero filter, namely, filter 2404. Filter structure 2400 has a substantially equivalent filter response to that of filter structure of FIG. 23. These two filter structures provide identical ZERO-STATE responses of the VQ codevectors:

The pole-zero filter H(z) of Eq. 32 (for example, filter 2404 in FIG. 24) is expressed as a mathematically equivalent all-zero IIR filter:

$$H(z)=\sum_{i=0}^{\infty} h_i \cdot z^{-1}, \tag{34}$$

and the z-transform of the ZERO-STATE response is given by $$Q_{zs}(z)=H(z)\cdot U_q(z) \tag{35}$$

In the time domain this filter operation is expressed as $$q_{zs}(n)=\sum_{i=0}^{\infty} h_i \cdot u_q(n-i). \tag{36}$$

Since $u_q(n)$ only has elements for n=0,1, . . . , K−1 and all filter memories are initialized to zero prior to filtering uq(n), the filter operation performed by filter 2404 can be reduced to $$q_{zs}(n)=\sum_{i=0}^{n} h_i \cdot u_q(n-i),\ n=0, 1, \ldots, K-1, \tag{37}$$

where K is the dimension of the VQ codevectors. Hence, only the first K coefficients of the all-zero IIR filter H(z) of Eq. 34 need to be determined. Thus, the response of this truncated version of the all-zero IIR filter is substantially equivalent to the response of the ZERO-STATE filter structure of FIG. 23. In fact, it is identical up to the truncation point. Furthermore, as is evident from Eq. 37 using the truncated all-zero filter results in identical ZERO-STATE responses as compared to using the infinite order all-zero filter or the original ZERO-STATE filter structure of FIG. 23.

The first K coefficients of the impulse response of the all-zero IIR filter are obtained by passing an impulse through the pole-zero filter given by Eq. 32 exploiting that all filter memories are initialized to zero. This is equivalent to filtering the impulse response of the zero section of H(z) in Eq. 32, $$h_{zero}(n)=\begin{cases}1 & n=0\\ -a_n\cdot\gamma_p^n & n=1, 2, \ldots, N_{NFF},\end{cases} \tag{38}$$

through the remaining all-pole part:

$$H_{pole}(z)=\frac{-1}{\left(1-\sum_{i=1}^{N_{NFF}} a_i\cdot\gamma_z^i\cdot z^{-i}\right)\cdot\left(1-\sum_{i=1}^{N}\alpha_i\cdot z^{-i}\right)}, \tag{39}$$

exploiting that only the first K samples of the output are needed. These first K samples of the output are the first K coefficients of the impulse response of the all-zero IIR filter.

Figure 24:
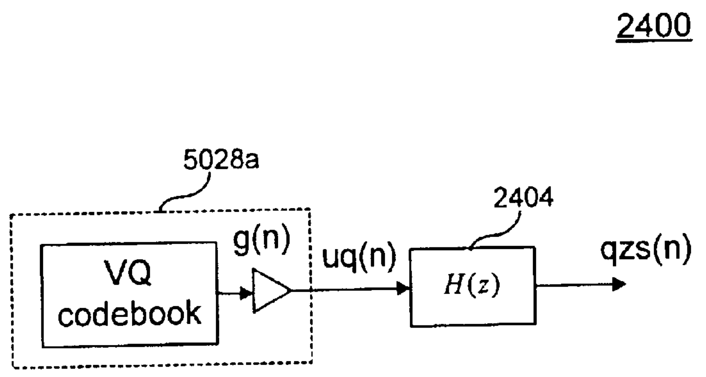
FIG. 24 is a diagram of a simplified ZERO-STATE filter structure corresponding to the filter structure of FIG. 23.

In summary, the ZERO-STATE responses of the VQ codevectors are efficiently obtained using the filter structure of FIG. 24 with the filter operation expressed in Eq. 37.

It should be noted that the gain-scaling step in FIG. 24, represented within block 5028*a* in FIG. 24, can advantageously be integrated into the all-zero filter by multiplying the all-zero filter coefficients with the gain. In other words, the gain-scaling represented in block 5028*a* can be moved to the all-zero filter, wherein a modified block 5028*a* produces non-scaled VQ codevectors, and the all-zero filter performs the gain-scaling instead. The ZERO-STATE responses of the VQ codevectors can then efficiently be obtained by passing the non-scaled VQ codevectors, simply the VQ codevectors, through the all-zero filter with the modified coefficients. Referring to FIG. 24 and Eq. 37, $u_q(n)$ would then represent the VQ codevector since the gain-scaling would be absent, and H(z) (h,i=,1,0 . . . ,K−1) would indirectly include the gain-scaling through the multiplication of the filter coefficients.

For simplicity both methods are referred as filtering a VQ codevector with the all-zero filter to obtain the ZERO-STATE reponse corresponding to the VQ codevector.

Also, the gain-scaling in FIGS. 21–24 can be integrated into the VQ codebook by multiplying all VQ codevectors with the gain prior to the excitation quantization hereby producing a modified VQ codebook. In this case the VQ codevectors of the modified VQ codebook would directly represent candidate excitation vectors and would in fact be gain-scaled VQ codevectors.

In the following, it is to be understood that the term "VQ codevectors" covers both non-scaled and gain-scaled VQ codevectors.

3. ZERO-INPUT Calculation

Figure 25:
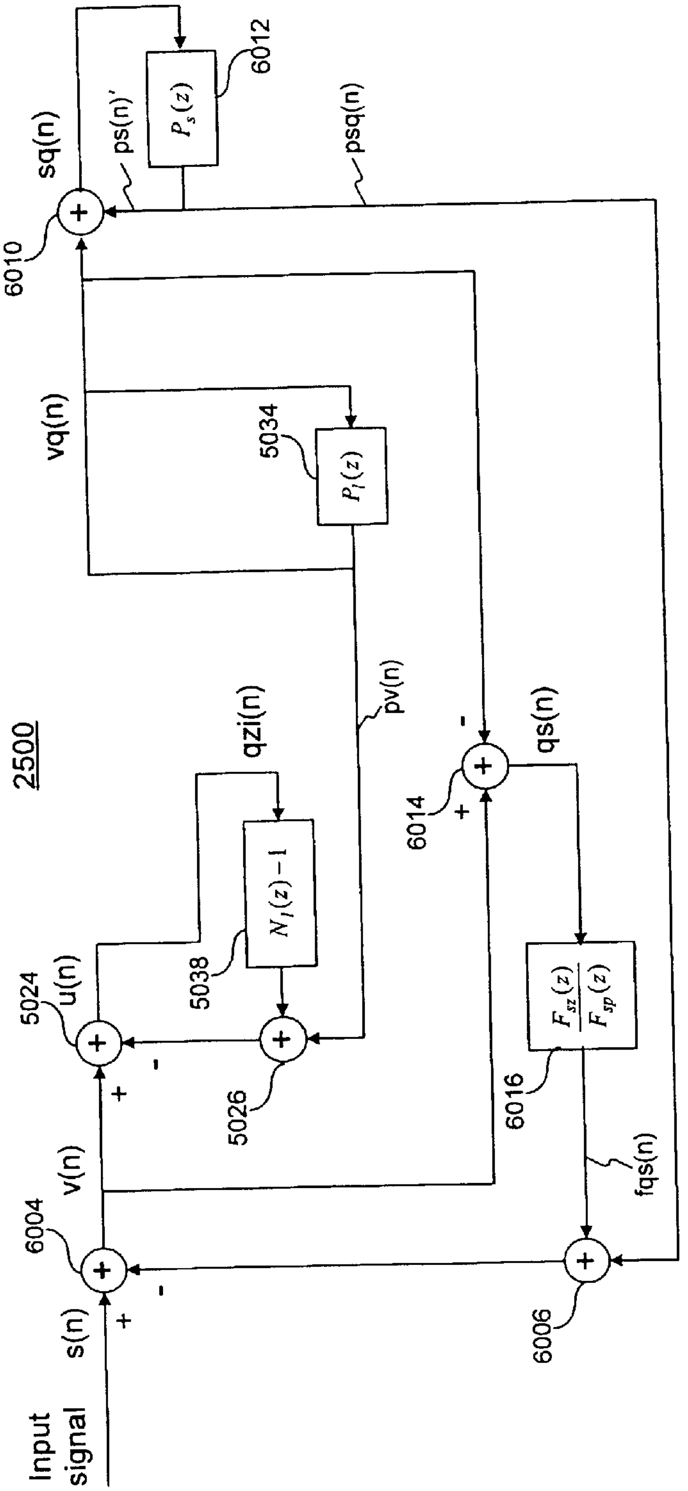
FIG. 25 is a diagram of an example ZERO-INPUT filter structure corresponding to the NFC filter structure of FIG. 22.

FIG. 25 is an example ZERO-INPUT filter configuration or structure 2500 corresponding to NFC structure 2200. The filter structure of FIG. 25 is used to calculate the ZERO-INPUT response, $q_{zi}(n)$, for the NFC system of FIG. 22. Calculating the ZERO-INPUT response, $q_{zi}(n)$, using the filter structure of FIG. 25 corresponds to operating NFC system 2100 in the ZERO-INPUT condition.

4. VQ Search

Based on the ZERO-STATE response of each candidate VQ codevector and the ZERO-INPUT response, the VQ codevector that minimizes $$\begin{aligned}E&=\sum_n q(n)^2\\&=\sum_n (q_{zs}(n)+q_{zi}(n))^2\end{aligned} \tag{40}$$

is selected and the quantized excitation vector is denoted $u_q(n)$.

5. Filter Memory Update Process

Figure 26:
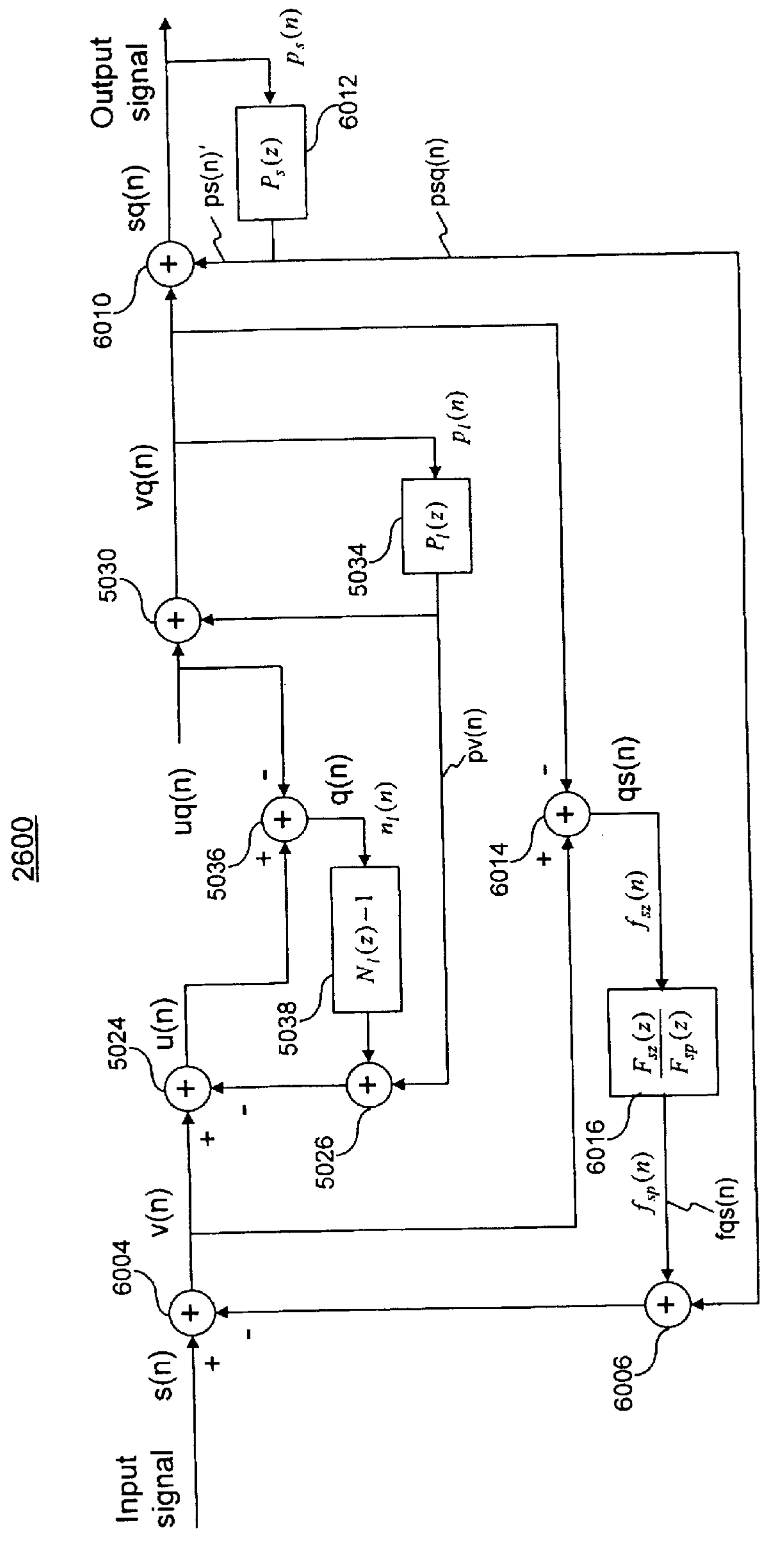
FIG. 26 is a diagram of an example NFC filter structure corresponding to the NFC system of FIGS. 21 and 22, and used for updating filter memories.
Figure 27:
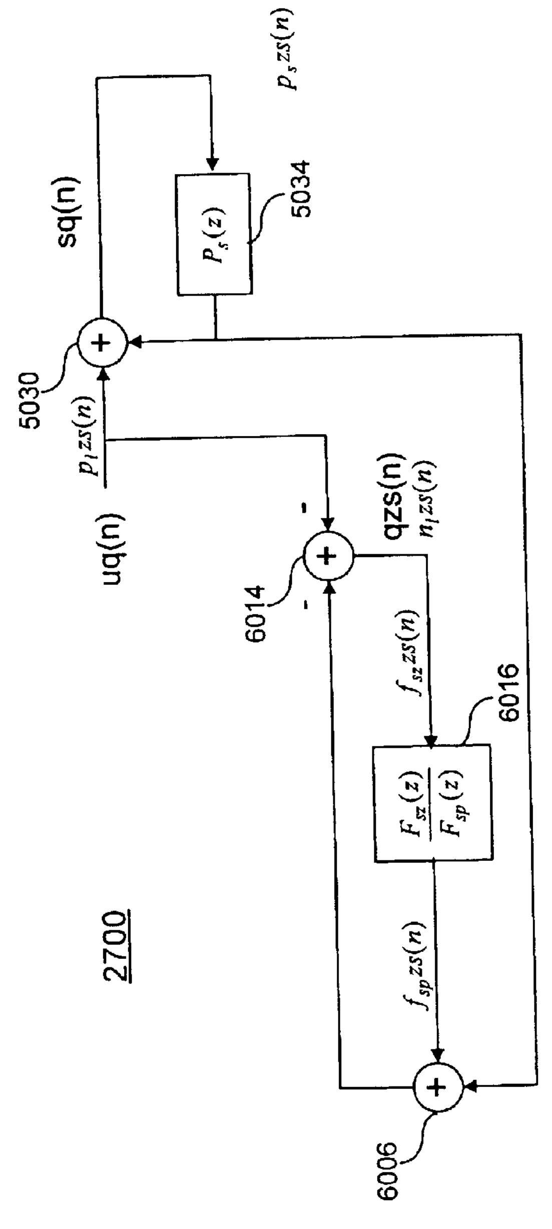
FIG. 27 is a diagram of an example ZERO-STATE NFC filter structure used for calculating ZERO-STATE contributions to filter memories in the NFC filter structure of FIG. 26.
Figure 28:
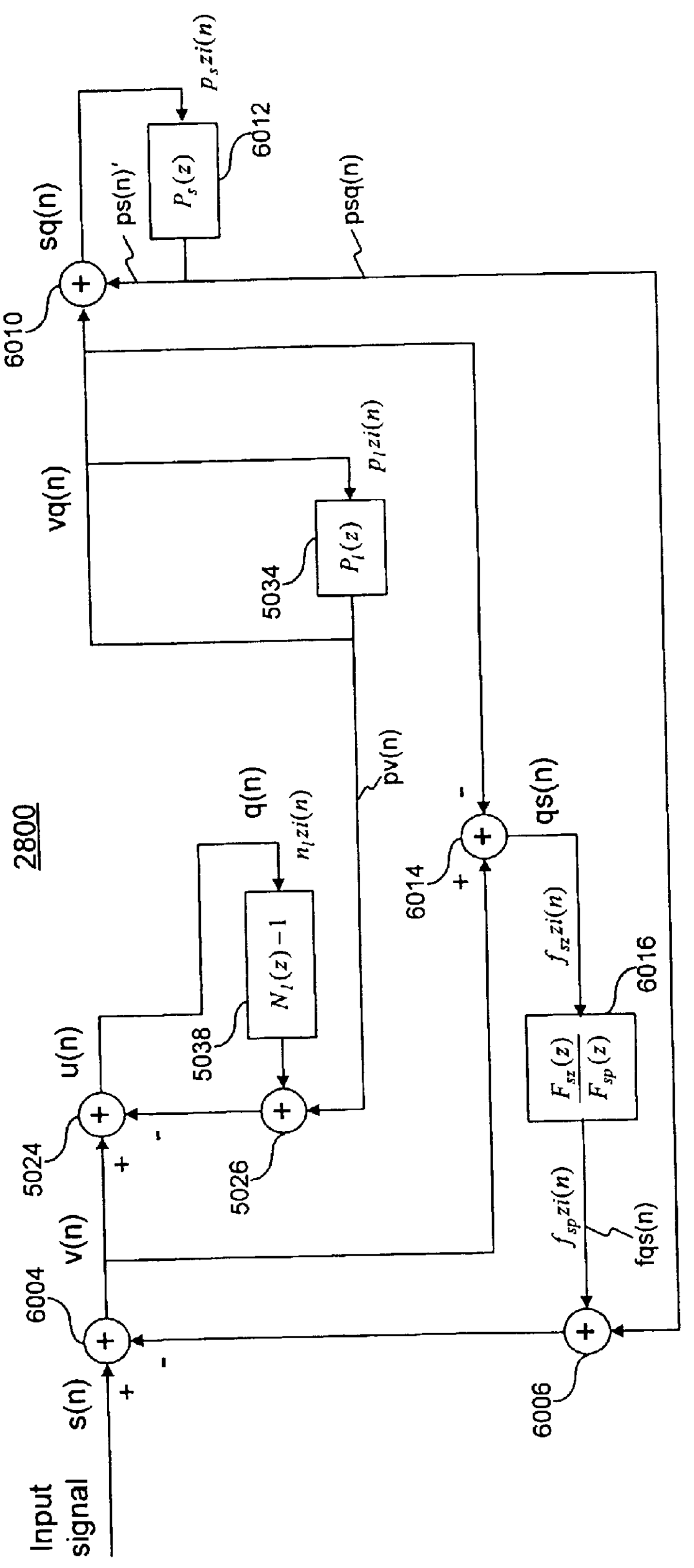
FIG. 28 is a diagram of an example ZERO-INPUT NFC filter structure used for calculating ZERO-INPUT contributions to filter memories in the NFC filter structure of FIG. 26.

In the following description and analyses it is to be understood that the term "memory update" refers to a signal that is shifted into, or feeds, a filter memory of a filter included in a filter structure. Consequently, past values of this signal are stored in the filter memory. In FIGS. 26, 27 and 28, the memory update signals feeding the various filters (that is, feeding the various filter memories) are indicated using duplicate labels, for purposes of descriptive convenience and clarity. That is, in FIGS. 26–28, each of these signals has a first label that is the same as the label used to identify the corresponding signal in the systems/structures of FIGS. 21–25, and a second label indicating the filter being fed by that signal. The second label is useful in describing the transformation of the filter structure of FIG. 26 into ZERO-STATE and ZERO-INPUT structures of FIGS. 27 and 28, respectively, for filter memory updates in the present invention. The second label also serves to emphasize that some of these signals are available as existing signals calculated during the ZERO-INPUT and ZERO-STATE response calculations prior to the codebook search.

An example basic structure to update the filter memories for the NFC system of FIG. 22 is depicted in FIG. 26. This includes 1. The memory update for the short-term predictor, denoted $p_s(n)$ 2. The memory update for the long-term predictor, denoted $p_l(n)$.

3. The memory update for the long-term noise feedback filter, denoted $n_l(n)$.

4. The memory update for the zero-section of the short-term noise feedback filter, denoted $f_{sz}(n)$.

5. The memory update for the pole-section of the short-term noise feedback filter, denoted $f_{sp}(n)$.

An alternative and more efficient method is to calculate the five filter memory updates as the superposition of the contributions to the filter memories from the ZERO-STATE and the ZERO-INPUT configurations (also referred to as ZERO-STATE and ZERO-INPUT components). The contributions from the ZERO-STATE component/configuration to the five filter memories are denoted $p_s zs(n)$, $p_l zs(n)$, $n_l zs(n)$, $f_{sz} zs(n)$, and $f_{sp} zs(n)$, respectively, and the contributions from the ZERO-INPUT component/configuration are denoted $p_s zi(n)$, $p_l zi(n)$, $n_l zi(n)$, $f_{sz} zi(n)$, and $f_{sp} zi(n)$, respectively.

The structure to calculate the contributions to the five filter memories from the ZERO-STATE component/configuration is depicted in FIG. 27. This structure is derived from FIG. 23 and FIG. 26. It can be seen that $$p_l zs(n)=u_q(n), \tag{41}$$

$$n_l zs(n)=q_{zs}(n), \tag{42}$$

and $$f_{sz} zs(n)=q_{zs}(n), \tag{43}$$

which are all available from the ZERO-STATE response calculation of the VQ codevector corresponding to $u_q(n)$ (the quantized excitation vector). The contribution to the filter memory update for the short-term predictor from the ZERO-STATE component/configuration, $p_s zs(n)$, must be calculated according to $$p_s zs(n) = u_q(n) + \sum_{i=1}^{N} \alpha_i \cdot p_s zs(n-i), \tag{44}$$

where it should be noted that $p_s zs(n)$ is zero for n<0. From FIG. 27 and Eq. 44 it is evident that this calculation is independent from any of the other filter memories. Furthermore, from FIG. 27 it can be shown that the contribution to the filter memory update for the pole-section of the short-term noise feedback filter from the ZERO-STATE component/configuration can be expressed as $$f_{sp} zs(n)=-q_{zs}(n)-p_s zs(n). \tag{45}$$

The structure to calculate the contributions to the five filter memories from the ZERO-INPUT component/configuration is depicted in FIG. 28. (Note that FIGS. 25 and 28 are the same, except duplicate signal labels are added in FIG. 28) However, referring to FIG. 25, it is evident that the ZERO-INPUT contributions to the five filter memories are all available from the previous calculation of the ZERO-INPUT response, $q_{zi}(n)$, prior to the codebook search, and consequently, no additional calculations are necessary.

From the contributions to the five filter memories from the ZERO-STATE and ZERO-INPUT components the final updates for the filter memories are calculated as $$\begin{aligned}
&p_s(n)=p_s zs(n)+p_s zi(n)\\
&p_l(n)=p_l zs(n)+p_l zi(n)\\
&n_l(n)=n_l zs(n)+n_l zi(n)\\
&{}_{sz}(n)=f_{sz} zs(n)+f_{sz} zi(n)\\
&f_{sp}(n)=f_{sp} zs(n)+f_{sp} zi(n)
\end{aligned} \tag{46}$$

In summary, the excitation quantization of each input vector, of dimension K, results in K new values being shifted into each filter memory during the filter memory update process. This is also apparent from the fact that the filter memory update process corresponds to filtering $u_p(n)$, n=0, 1, . . . , K−1, through the NFC system of FIG. 21, where $u_q(n)$, n=0,1, . . . , K−1, is the quantized excitation vector.

It should be noted that the two methods for updating the filter memories, i.e. the straightforward method shown in FIG. 26 and the efficient method described by Eq. 41 through Eq. 46 and FIGS. 27 and 28 are mathematically equivalent.

It should also be noted that alternate sign definitions of signals in the NFC coding systems/structure translate into proper sign changes in the derived equations and methods without departing from the scope and spirit of the invention.

6. Method Flow Charts a. ZERO-STATE Calculation

Figure 29:
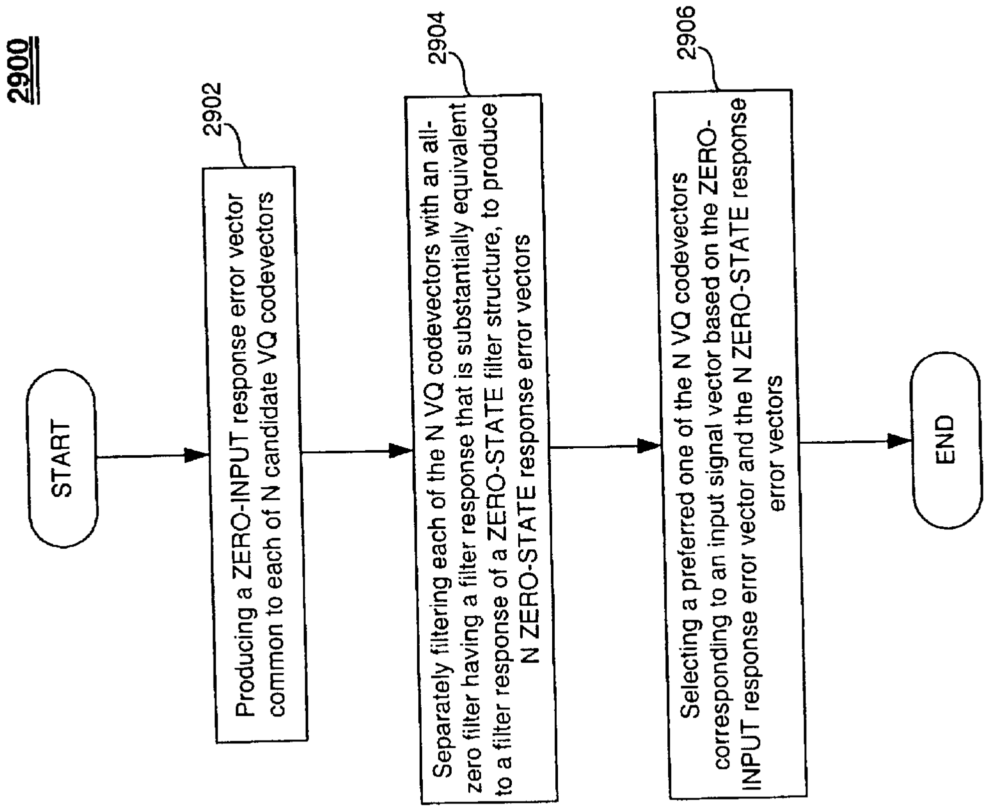
FIG. 29 is a flow chart of an example method of excitation quantization corresponding to an input vector, using a zero-state calculation based on a transformed ZERO-STATE NFC filter structure.

FIG. 29 is a flow chart of an example method 2900 of selecting a best VQ codevector representing the quantized excitation vector corresponding to an input vector, using a zero-state calculation as described in this Section. This corresponds to performing a VQ search of an NFC system, such as the NFC system of FIG. 21. The NFC system includes a NF filter in a NF path or loop of the NFC system. The NFC system is operable in a ZERO-STATE configuration, including the ZERO-STATE filter structure of FIG. 23, for example. The NFC system is operable in a ZERO-INPUT configuration, including the ZERO-INPUT filter structure of FIG. 25, for example. In an arrangement of the present invention, the various steps of method 2900, described below, are performed in accordance with the equations of this Section.

A first step 2902 includes producing a ZERO-INPUT response error vector common to each of N candidate VQ codevectors. For example, the ZERO-INPUT filter structure/NFC configuration of FIG. 25 can be used to calculate the ZERO-INPUT response error vector (e.g., error vector qzi(n)).

A next step 2904 includes separately filtering each of the N VQ codevectors with an all-zero filter (e.g., filter 2404) having a filter response that is substantially equivalent to a filter response of the ZERO-STATE filter structure, to produce N ZERO-STATE response error vectors (e.g., N error vectors qzs(n)).

A next step 2906 includes selecting a preferred one of the N VQ codevectors representing the quantized excitation vector corresponding to the input signal vector based on the ZERO-INPUT response error vector and the N ZERO-STATE response error vectors. This step may be performed in accordance with Eq. 40, and uses efficient correlation techniques similar to those described above in Sections IX.C.2.–IX.C.5.

Method 2900 may also include a filter transformation step before step 2904. The filter transformation step includes transforming the ZERO-STATE filter structure (e.g., of FIG. 23) to a filter structure (e.g. of FIG. 24) including only the all-zero filter (e.g., filter 2404).

Figure 30:
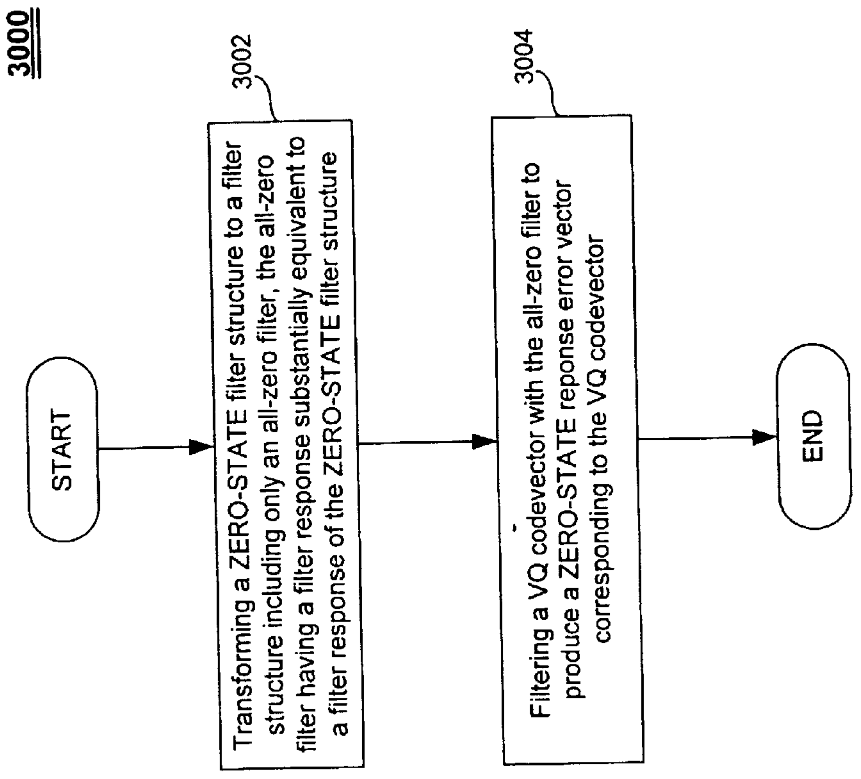
FIG. 30 is a flow chart of an example method performed in a noise feedback coder with a corresponding ZERO-STATE filter structure, where the ZERO-STATE filter structure includes multiple filters.

FIG. 30 is a flow chart of an example method 3000 of efficiently performing a ZERO-STATE calculation in an NFC system having a corresponding initial or first ZERO-STATE filter structure (e.g., the structure of FIG. 23), where the ZERO-STATE filter structure includes multiple filters (e.g., filters 6016 and 6012). Method 3000 efficiently produces a ZERO-STATE response error vector for the NFC system, useable in other methods related to excitation quantization, for example.

A first step 3002 includes transforming the first ZERO-STATE filter structure (e.g., of FIG. 23) having multiple filters to a second, simpler ZERO-STATE filter structure (e.g., of FIG. 24) including only a single filter, for example, an all-zero filter (e.g., filter 2404). The all-zero filter has a filter response substantially equivalent to a filter response of the first ZERO-STATE filter structure.

A next step 3004 includes filtering a VQ codevector with the all-zero filter to produce a ZERO-STATE response error vector corresponding to the VQ codevector. Typically, the VQ codevector is one of N VQ codevectors, and method 3000 further includes filtering the remaining N−1 VQ codevectors with the all-zero filter to produce N ZERO-STATE response error vectors corresponding to the N VQ codevectors.

b. Filter Memory Update Process

Figure 31:
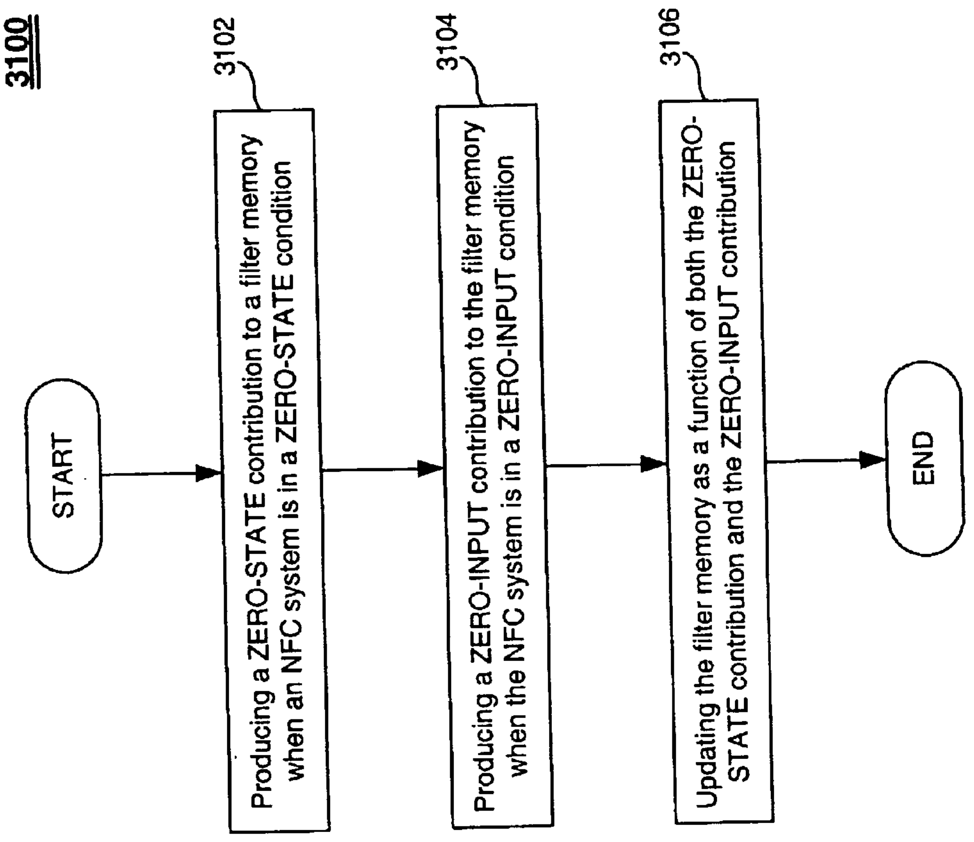
FIG. 31 is a flow chart of an example method of updating one or more filter memories in a noise feedback coder, such as the noise feedback coder of FIG. 21.

FIG. 31 is a flow chart of an example method 3100 for updating one or more filter memories in an NFC system, such as the NFC system of FIG. 2100. The NFC system is operable in a ZERO-STATE condition (wherein the NFC system is in a ZERO-STATE configuration) and a ZERO-INPUT condition (wherein the NFC is in a ZERO-INPUT configuration), and includes at least one filter (e.g., filter 6016) having a filter memory. In an arrangement of the present invention, the various steps of method 3000, described below, may be performed in accordance with the equations of this Section.

A first step 3102 includes producing a ZERO-STATE contribution (e.g., $f_{sz}zs(n)$) to the filter memory, when the NFC system is in the ZERO-STATE condition. For example, the structure of FIG. 27 may be used to produce the ZERO-STATE contribution. "Producing" may include calculating, or alternatively, retrieving/accessing previously calculated values.

A next step 3104 includes producing a ZERO-INPUT contribution (e.g., $f_{sz}zi(n)$) to the filter memory, when the NFC system is in the ZERO-INPUT condition. For example, the structure of FIG. 28 may be used to calculate the ZERO-INPUT contribution. In an alternative arrangement of method 3100, the order of steps 3102 and 3104 is reversed. That is, step 3104 precedes step 3102.

A next step includes updating the filter memory as a function of both the ZERO-STATE contribution and the ZERO-INPUT contribution. For example, the filter memory is updated with the sum or superposition of the ZERO-INPUT and ZERO-STATE contributions (e.g., memory update $f_{sz}(n)=f_{sz}zs(n)+f_{sz}zi(n)$).

Method 3100 is typically, though not necessarily, performed in the context of excitation quantization, that is, a VQ search. In the context of the VQ search, method 3100 includes, prior to step 3102, a step of searching N VQ codevectors associated with the NFC system for a best VQ codevector representing a quantized excitation vector. Then, step 3102 comprises producing the ZERO-STATE contribution, as mentioned above, corresponding to the best VQ codevector.

In this section, the methods and structures of the present invention have been described by way of example in the context of NFC system 6000, depicted in FIG. 6. It is to be understood that the methods and structures of the present invention are not limited to this example, and thus extend to the NFC systems 3000, 4000 and 5000, and other coding systems.

X. Decoder Operations

The decoder in FIG. 8 is very similar to the decoder of other predictive codecs such as CELP and MPLPC. The operations of the decoder are well-known prior art.

Refer to FIG. 8. The bit de-multiplexer block 100 unpacks the input bit stream into the five sets of indices LSPI, PPI, PPTI, GI, and CL The long-term predictive parameter decoder block 110 decodes the pitch period as pp=17+PPI. It also uses PPTI as the address to retrieve the corresponding codevector from the 9-dimensional pitch tap codebook and multiplies the first three elements of the codevector by 0.5 to get the three pitch predictor coefficients $\{b_{j*1}, b_{1*2}, b_{j*3}\}$. The decoded pitch period and pitch predictor taps are passed to the long-term predictor block 140.

The short-term predictive parameter decoder block 120 decodes LSPI to get the quantized version of the vector of LSP inter-frame MA prediction residual. Then, it performs the same operations as in the right half of the structure in FIG. 10 to reconstruct the quantized LSP vector, as is well known in the art. Next, it performs the same operations as in blocks 17 and 18 to get the set of short-term predictor coefficients $\{\tilde{a}_i\}$, which is passed to the short-term predictor block 160.

The prediction residual quantizer decoder block 130 decodes the gain index GI to get the quantized version of the log-gain prediction residual. Then, it performs the same operations as in blocks 304, 307, 308, and 309 of FIG. 12 to get the quantized residual gain in the linear domain. Next, block 130 uses the codebook index CI to retrieve the residual quantizer output level if a scalar quantizer is used, or the winning residual VQ codevector is a vector quantizer is used, then it scales the result by the quantized residual gain. The result of such scaling is the signal uq(n) in FIG. 8.

The long-term predictor block 140 and the adder 150 together perform the long-term synthesis filtering to get the quantized version of the short-term prediction residual dq(n) as follows.

$$dq(n) = uq(n) + \sum_{i=1}^{3} b_{j^*i} dq(n - pp + 2 - i)$$

The short-term predictor block 160 and the adder 170 then perform the short-term synthesis filtering to get the decoded output speech signal sq(n) as $$sq(n) = dq(n) + \sum_{i=1}^{M} \tilde{a}_i sq(n - i).$$

This completes the description of the decoder operations.

XI. Hardware and Software Implementations

Figure 32:
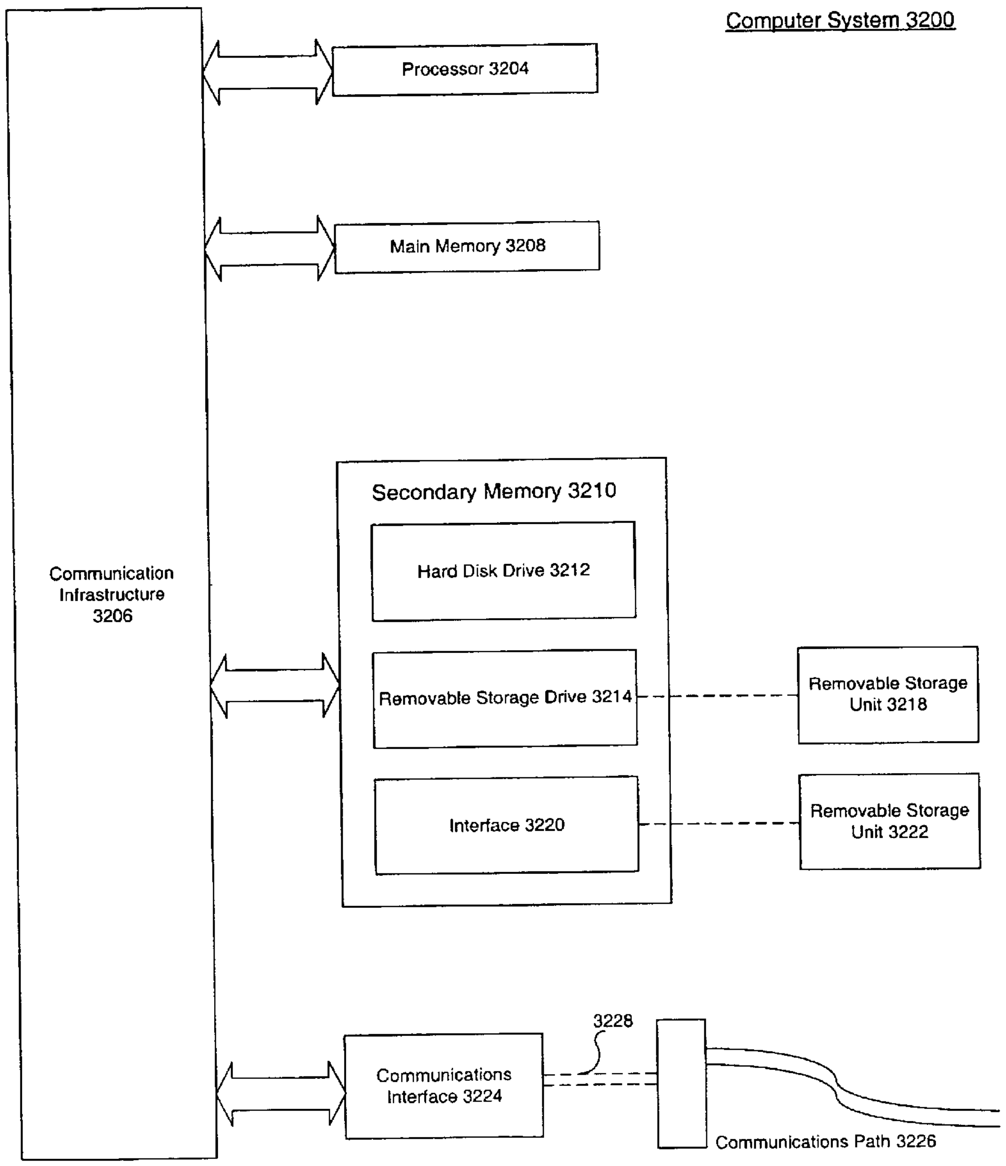
FIG. 32 is a block diagram of a computer system on which the present invention can be implemented.

The following description of a general purpose computer system is provided for completeness. The present invention can be implemented in hardware, or as a combination of software and hardware. Consequently, the invention may be implemented in the environment of a computer system or other processing system. An example of such a computer system 3200 is shown in FIG. 32. In the present invention, all of the signal processing blocks of codecs 1050, 2050, 3000–7000, and 2100–2800, for example, can execute on one or more distinct computer systems 3200, to implement the various methods of the present invention. The computer system 3200 includes one or more processors, such as processor 3204. Processor 3204 can be a special purpose or a general purpose digital signal processor. The processor 3204 is connected to a communication infrastructure 3206 (for example, a bus or network). Various software implementations are described in terms of this exemplary computer system. After reading this description, it will become apparent to a person skilled in the relevant art how to implement the invention using other computer systems and/or computer architectures.

Computer system 3200 also includes a main memory 3208, preferably random access memory (RAM), and may also include a secondary memory 3210. The secondary memory 3210 may include, for example, a hard disk drive 3212 and/or a removable storage drive 3214, representing a floppy disk drive, a magnetic tape drive, an optical disk drive, etc. The removable storage drive 3214 reads from and/or writes to a removable storage unit 3218 in a well known manner. Removable storage unit 3218, represents a floppy disk, magnetic tape, optical disk, etc. which is read by and written to by removable storage drive 3214. As will be appreciated, the removable storage unit 3218 includes a computer usable storage medium having stored therein computer software and/or data.

In alternative implementations, secondary memory 3210 may include other similar means for allowing computer programs or other instructions to be loaded into computer system 3200. Such means may include, for example, a removable storage unit 3222 and an interface 3220. Examples of such means may include a program cartridge and cartridge interface (such as that found in video game devices), a removable memory chip (such as an EPROM, or PROM) and associated socket, and other removable storage units 3222 and interfaces 3220 which allow software and data to be transferred from the removable storage unit 3222 to computer system 3200.

Computer system 3200 may also include a communications interface 3224. Communications interface 3224 allows software and data to be transferred between computer system 3200 and external devices. Examples of communications interface 3224 may include a modem, a network interface (such as an Ethernet card), a communications port, a PCMCIA slot and card, etc. Software and data transferred via communications interface 3224 are in the form of signals 3228 which may be electronic, electromagnetic, optical or other signals capable of being received by communications interface 3224. These signals 3228 are provided to communications interface 3224 via a communications path 3226. Communications path 3226 carries signals 3228 and may be implemented using wire or cable, fiber optics, a phone line, a cellular phone link, an RF link and other communications channels.

In this document, the terms "computer program medium" and "computer usable medium" are used to generally refer to media such as removable storage drive 3214, a hard disk installed in hard disk drive 3212, and signals 3228. These computer program products are means for providing software to computer system 3200.

Computer programs (also called computer control logic) are stored in main memory 3208 and/or secondary memory 3210. Computer programs may also be received via communications interface 3224. Such computer programs, when executed, enable the computer system 3200 to implement the present invention as discussed herein. In particular, the computer programs, when executed, enable the processor 3204 to implement the processes of the present invention, such as the methods implemented using the various codec structures described above, such as methods 6050, 1350, 1364, 1430, 1450, 1470, 1520, 1620, 1700, 1800, 1900, 2000, and 2900–3100, for example. Accordingly, such computer programs represent controllers of the computer system 3200. By way of example, in the embodiments of the invention, the processes performed by the signal processing blocks of codecs/structures 1050, 2050, 3000–7000, 1300, 1362, 1400, 1402*a*, 1404*a*, 1404*b*, 2100–2800, can be performed by computer control logic. Where the invention is implemented using software, the software may be stored in a computer program product and loaded into computer system 3200 using removable storage drive 3214, hard drive 3212 or communications interface 3224.

In another embodiment, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

XII. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. In a Noise Feedback Coding (NFC) system having a corresponding ZERO-STATE filter structure, the ZERO-STATE filter structure including multiple filters, a method of producing a ZERO-STATE response error vector, comprising:

(a) transforming the ZERO-STATE filter structure including multiple filters to a ZERO-STATE filter structure including only an all-zero filter, the all-zero filter having a filter response substantially equivalent to a filter response of the ZERO-STATE filter structure including multiple filters; and (b) filtering a VQ codevector with the all-zero filter to produce the ZERO-STATE response error vector corresponding to the VQ codevector.

2. The method of claim 1, wherein at least one of the multiple filters is a noise feedback (NF) filter of the form:

$$F(z)=N(z)-1$$

where N(z) is a noise shaping (NS) filter of the form:

$$N(z)=\frac{\sum_{i=0}^{K_T} t_i\cdot z^{-i}}{\sum_{i=0}^{K_U} u_i\cdot z^{-i}}$$

where $t_i$ and $u_i$ are $i^{th}$ filter coefficients of an all-zero section and an all-pole section of the NS filter, respectively, and $K_T$ and $K_U$ are the orders of the all-zero section and the all-pole section, respectively.

3. The method of claim 2, wherein the filter coefficients $t_i$ and $u_i$ are related to prediction coefficients, $a_i$, according to:

$$t_i=\begin{cases}1 & i=0\\ -a_i\cdot(\gamma_z)^i & i=1,2,\ldots,N_{NFF}\end{cases}$$

$$u_i=\begin{cases}1 & i=0\\ -a_i\cdot(\gamma_p)^i & i=1,2,\ldots,N_{NFF}\end{cases}$$

where $\gamma_z^{\,i}$ and $\gamma_p^{\,i}$ are bandwidth expansion factors of the all-zero and all-pole sections, respectively, and $N_{NFF}$ is the order of the NS filter.

4. The method of claim 1, wherein the filter response of the all-zero filter is substantially equivalent to $$H(z)=-\frac{1}{N(z)\cdot(1-P_s(z))}$$

where N(z) is the noise shaping filter, and $P_s(z)$ is the short-term predictor.

5. The method of claim 1, wherein the all-zero filter is of the form:

$$H(z)=\sum_{i=0}^{\infty} h_i\cdot z^{-i}$$

where $h_i$ is an $i^{th}$ filter coefficient.

6. The method of claim 5, wherein the all-zero filter is of finite order.

7. The method of claim 1, wherein the all-zero filter is of the form:

$$H(z)=\sum_{i=0}^{K-1} h_i\cdot z^{-i}$$

where $h_i$ is an $i^{th}$ filter coefficient and K−1 is the filter order.

8. The method of claim 7, wherein step (b) comprises producing the ZERO-STATE response error vector, denoted $q_{zs}(n)$, corresponding to a VQ codevector, denoted $u_q(n)$, where n=0,1, . . . K−1, according to:

$$q_{zs}(n)=\sum_{i=0}^{n} h_i\cdot u_q(n-i),\ n=0,1,\ldots K-1.$$

9. The method of claim 8, wherein $u_q(n)$ is a gain-scaled VQ codevector and $h_i$, i=0,1, . . . K−1 excludes the gain-scaling.

10. The method of claim 8, wherein $u_q(n)$ is a non-scaled VQ codevector and $h_i$, i=0,1, . . . K−1 includes the gain-scaling.

11. The method of claim 1, further comprising performing excitation quantization corresponding to an input vector using the ZERO-STATE response error vector.

12. The method of claim 1, wherein the VQ codevector is one VQ codevector among N VQ codevectors, the method further comprising:

(c) repeating step (b) for each of the remaining N−1 VQ codevectors, to produce N ZERO-STATE response error vectors;

(d) producing a ZERO-INPUT response error vector common to each of the N VQ codevectors; and (e) selecting a one of the N VQ codevectors corresponding to an input signal vector based on the ZERO-INPUT response error vector and the N ZERO-STATE response error vectors.

13. In a Noise Feedback Coding (NFC) system having a corresponding ZERO-STATE filter structure, the ZERO-STATE filter structure including a noise feedback (NF) loop, the NF loop including a NF filter, a method of excitation quantization corresponding to an input signal vector, comprising:

(a) separately filtering each of N VQ codevectors with an all-zero filter having a filter response that is substantially equivalent to a filter response of the ZERO-STATE filter structure including the noise feedback filter, to produce N ZERO-STATE response error vectors;

(b) producing a ZERO-INPUT response error vector common to each of N VQ codevectors; and (c) selecting a one of the N VQ codevectors corresponding to the input signal vector based on the ZERO- INPUT response error vector and the N ZERO-STATE response error vectors.

14. The method of claim 13, further comprising:

prior to step (a), transforming the ZERO-STATE filter structure to a filter structure including only the all-zero filter.

15. The method of claim 13, wherein step (b) comprises producing the ZERO-INPUT response error vector using a ZERO-INPUT Filter structure corresponding to the NFC system.

* * * * *